US012736296B2

(12) United States Patent
Plemons et al.

(10) Patent No.: US 12,736,296 B2
(45) Date of Patent: Sep. 15, 2026

(54) METHODS FOR INCREASING THE NUMBER OF COUNTERMEASURE EXPENDABLES FOR DISPENSING SYSTEMS

(71) Applicant: BAE Systems Information and Electronic Systems Integration Inc., Nashua, NH (US)

(72) Inventors: Danny L. Plemons, Austin, TX (US); Mark J. Dube, McDade, TX (US); Daniel M. Gilbert, Austin, TX (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 19/180,739

(22) Filed: Apr. 16, 2025

(65) Prior Publication Data

US 2025/0277641 A1 Sep. 4, 2025

Related U.S. Application Data

(62) Division of application No. 17/345,551, filed on Jun. 11, 2021, now Pat. No. 12,287,166.

(51) Int. Cl.

| | |
|---|---|
| ***F41A 19/68*** | (2006.01) |
| ***B64D 1/02*** | (2006.01) |
| ***F41A 19/70*** | (2006.01) |
| ***F41F 7/00*** | (2006.01) |
| ***F42B 5/15*** | (2006.01) |

(52) U.S. Cl.

CPC .............. *F41A 19/68* (2013.01); *F41A 19/70* (2013.01); *F41F 7/00* (2013.01); *F42B 5/15* (2013.01); *B64D 1/02* (2013.01)

(58) Field of Classification Search

CPC .......... F41A 19/65; F41A 19/68; F41A 19/70; F42B 5/15; F42B 12/70

See application file for complete search history.

(56) References Cited

U.S. PATENT DOCUMENTS

| | | | | |
|---|---|---|---|---|
| 3,808,940 A * | 5/1974 | Schillreff | F41F 3/042 | 89/1.51 |
| 4,063,485 A * | 12/1977 | Carter | F41F 3/04 | 89/1.51 |
| 4,135,455 A * | 1/1979 | Wallace | F42B 5/035 | 102/505 |
| 4,313,379 A * | 2/1982 | Wallace | F41A 19/65 | 102/217 |

(Continued)

OTHER PUBLICATIONS

EP Search Report, EP 22821012.6, mailed Apr. 16, 2025, 7 pages.

(Continued)

*Primary Examiner* — Gabriel J. Klein

(74) *Attorney, Agent, or Firm* — Scott J. Asmus; Sand, Sebolt & Wernow LPA; Gary McFaline

(57) ABSTRACT

Various systems and methods for leveraging legacy countermeasure dispensing systems (CMDSs). The legacy CMDSs are leveraged through the expansion of breechplates and magazines in a CMDS by expanding the amount of expendables carried by a CMDS while still maintaining the legacy sequencer and dispenser in a legacy military platform, such as an aircraft. In addition, various circuitry systems are included in a circuit card of the breechplate for duplicating and/or expanding the firing lines provided in a legacy CMDS.

20 Claims, 26 Drawing Sheets

(56) References Cited

U.S. PATENT DOCUMENTS 5,097,765 A * 3/1992 Ziemba .................. F42C 17/04 102/703
5,269,214 A * 12/1993 Badura .................... F41F 1/08 42/105
5,351,597 A * 10/1994 Holmstrom ............ F41A 19/58 89/1.51
5,411,225 A * 5/1995 Lannon .................... F42B 5/15 102/505
5,413,024 A * 5/1995 Plummer ............... F41F 3/065 89/1.816
5,452,640 A * 9/1995 Bovee ...................... F41F 3/04 89/1.816
5,461,960 A * 10/1995 Marks ................... H01R 31/06 89/1.51
5,554,815 A * 9/1996 Authie ..................... F42B 5/15 89/1.51
5,602,362 A * 2/1997 Billard ..................... F42B 5/15 89/1.51
5,773,749 A * 6/1998 Cotton, III ............. F41A 19/65 89/1.51
6,412,416 B1 * 7/2002 Rouse ...................... F42B 5/15 102/370
7,866,246 B2 1/2011 Bellino et al.
7,878,120 B1 * 2/2011 Nodarse ................. F42B 5/285 102/470
8,365,664 B2 * 2/2013 Neff ......................... F42B 3/04 102/202.7
9,003,944 B2 * 4/2015 Zatterqvist .............. B64D 7/00 89/1.51
9,464,874 B1 * 10/2016 Mohler .................... F42B 3/10
9,501,055 B2 * 11/2016 Kolanek ................. F41G 7/308
9,811,079 B2 * 11/2017 Theiss ............... G05B 19/0428
10,697,742 B2 * 6/2020 Dube ....................... F42B 5/15
10,940,814 B2 * 3/2021 Mullins ................. H03K 19/20
10,948,909 B2 3/2021 Kolanek et al.
2006/0288857 A1 * 12/2006 Laine ..................... F41A 27/28 89/37.05
2009/0193962 A1 * 8/2009 Zachrisson ............ F42B 39/26 89/1.801
2010/0089226 A1 * 4/2010 Jones ..................... F42B 39/26 89/1.1
2012/0166741 A1 * 6/2012 Birkbeck ................. F42B 5/15 710/316
2013/0167711 A1 * 7/2013 Zatterqvist ............. F42B 12/70 89/1.56
2015/0331417 A1 * 11/2015 Theiss ............... G05B 19/0428 702/122
2015/0354920 A1 * 12/2015 Edge ........................ F41F 1/08 89/1.41
2016/0048129 A1 * 2/2016 Kolanek ............. G05D 1/0022 701/2
2016/0178331 A1 * 6/2016 Sharpin .................. F42B 10/66 235/404
2017/0102200 A1 * 4/2017 Alicea, Jr. .............. F41A 19/59
2019/0234718 A1 * 8/2019 Dube ....................... F42B 5/15

OTHER PUBLICATIONS

Bae Systems Information and Electronic Systems Integration Inc.; Methods for Delayed Dispersion of Chaff Within Countermeasure Expendables; PCT Application Serial No. PCT/US21/56988; filed Oct. 28, 2021.

Intemational Search Report, PCT/US22/32790, mailed Aug. 3, 2022, 7 pages.

* cited by examiner 112
150
152,152A
156
158
160
162
163
164
165
6

112,150
154
172
152
180
114
160
158B
158
116
117
168
162
170
100B
166
192
158b
158a
100A
186
190

152B
152A
116,116A
117,117A
162A
162B
116,116B
117,117B
192B
153,155
182

312
350
350A
354
356
358
360
362
363
364
365
15

314
392
392
392

314'
392B'
392A'
392B'
392A'
392B'

314"
392B"
392A"
392C"

600
600A
600B
600C
600D
600E
600F
610
612
614
616
618
636
650,650A
666
672
673
674
680
681
682
683
684
685
686,686A
687
687A
688
688A
688B
688C
688D
688E
689,689A
689B
689C
689D
690
691
692
693
694
695
696
697
698,698D
698A
698B
698C
699A
699B 614
686
686
686
686
688

614'
686'
686'
686"
686'''
686'''
686"
686'
688'

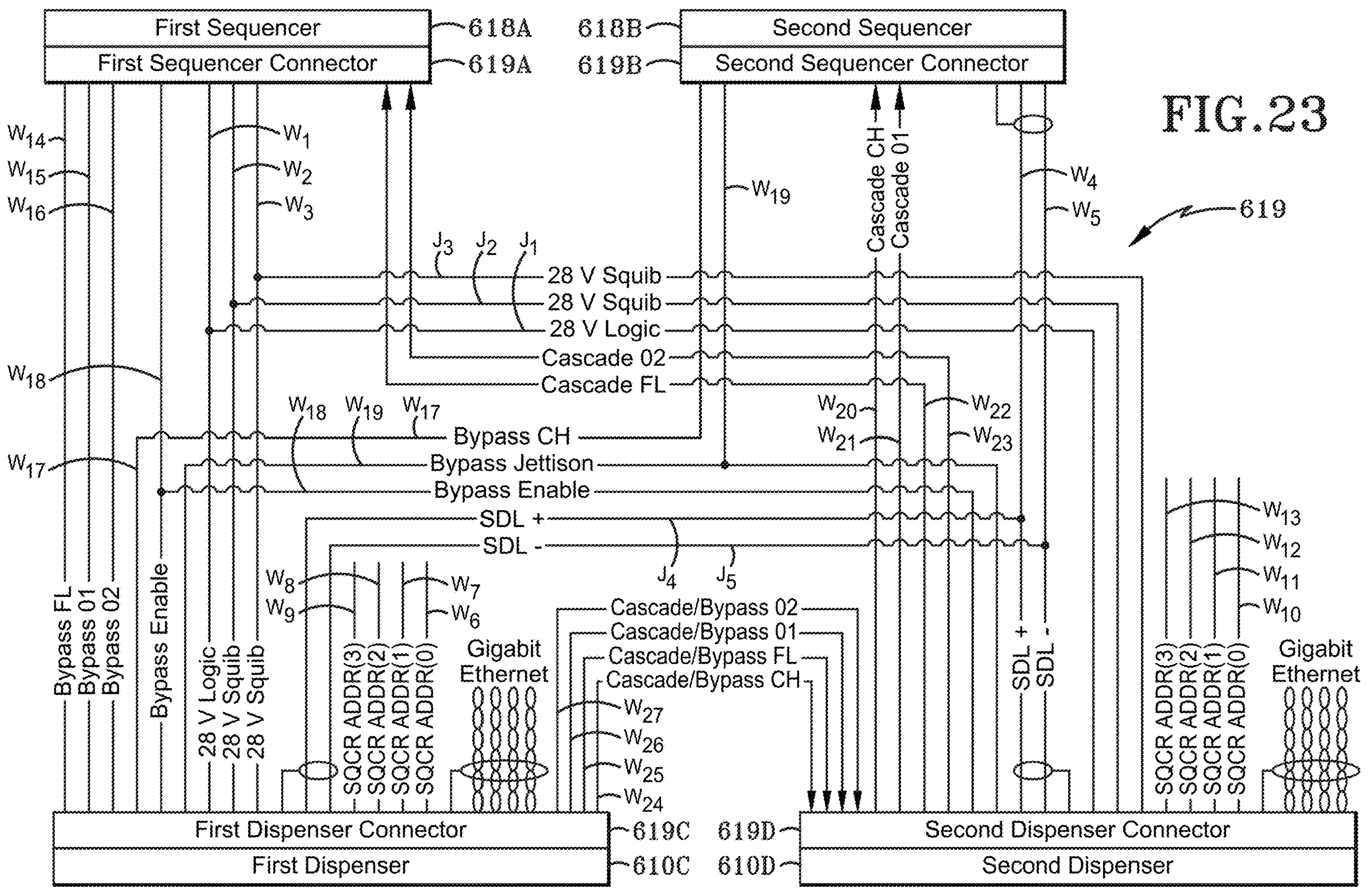
FIG.23
619
First Sequencer
First Sequencer Connector
618A
619A
Second Sequencer
Second Sequencer Connector
618B
619B
W14
W15
W16
W1
W2
W3
W19
Cascade CH
Cascade 01
W4
W5
J3
J2
J1
28 V Squib
28 V Squib
28 V Logic
Cascade 02
Cascade FL
W18
W20
W22
W18
W19
W17
Bypass CH
W21
W23
W17
Bypass Jettison
Bypass Enable
SDL +
SDL -
W13
W12
W11
W10
J4
J5
W8
W9
W7
W6
Cascade/Bypass 02
Cascade/Bypass 01
Cascade/Bypass FL
Cascade/Bypass CH
Bypass FL
Bypass 01
Bypass 02
Bypass Enable
28 V Logic
28 V Squib
28 V Squib
SQCR ADDR(3)
SQCR ADDR(2)
SQCR ADDR(1)
SQCR ADDR(0)
Gigabit Ethernet
W27
W26
W25
W24
SDL +
SDL -
SQCR ADDR(3)
SQCR ADDR(2)
SQCR ADDR(1)
SQCR ADDR(0)
Gigabit Ethernet
First Dispenser Connector
First Dispenser
619C
610C
619D
610D
Second Dispenser Connector
Second Dispenser

METHODS FOR INCREASING THE NUMBER OF COUNTERMEASURE EXPENDABLES FOR DISPENSING SYSTEMS

CROSS-REFERENCE TO RELATED APPLICATIONS

This application is a divisional of and claims priority to U.S. patent application Ser. No. 17/345,551, filed on Jun. 11, 2021, which is herein incorporated by reference in its entirety.

TECHNICAL FIELD

The present disclosure generally relates to aircraft defense systems. More particularly, the present disclosure relates to a Countermeasure Dispenser System (CMDS). Specifically, the present disclosure relates to a system and methods for firing expendables from a CMDS.

BACKGROUND

In current military technologies, military platforms, such as a military aircraft, include at least one CMDS. The CMDS dispenses expendables (i.e., chaff material or flares) from the platform in order to counter a detected incoming threat, such as a missile, and redirect such incoming threat away from the platform. In a conventional CMDS, such as the AN/ALE-47 CMDS used on an aircraft, a CMDS generally comprises a cockpit control unit that provides an interface with the operator of the military platform, sequencer units that control countermeasure dispensers, and a programmer that may provide additional features and characteristics for a CMDS. Each countermeasure dispenser in a CMDS is electrically connected to a sequencer unit for dispensing the expendables. However, the traditional countermeasure dispenser in a CMDS is limited to only carrying thirty (30) expendables with a corresponding sequencer having thirty (30) firing lines to dispense said expendables. Such limit of expendables and firing lines in the CMDS may cause issues during military operation when many expendables must be dispensed from the CMDS is critical situations. The countermeasure dispenser and the sequencer in a CMDS also limits the capability of expanding the amount of expendables that may be provided on a military platform without removing and replacing the existing countermeasure dispenser and sequencer unit.

SUMMARY

The current CMDS used on military platforms fails to provide a solution that expands the amount of expendables in a CMDS while still utilizing legacy hardware on said military platforms. As such, continuous unmet needs have been presented for expanding the amount of expendables in a CMDS while still utilizing legacy hardware on a military platform. The embodiments described and illustrated herein have provided solutions to the continuous unmet needs of expanding the amount of expendables on a CMDS while still utilizing legacy hardware on said military platforms. Aspects of the present disclosure are directed to these continuous unmet needs.

In one aspect, an exemplary embodiment of the present disclosure may provide a countermeasure dispensing system (CMDS). The CMDS has a dispenser, a breechplate, a sequencer, and a magazine. The dispenser is provided on a platform. The dispenser has a first end that defines a first opening and a second end, and the first opening provides access to a chamber that extends from the first opening to the second end. The breechplate operably engaged with the dispenser, and the breechplate has first and second sets of firing pins electrically connected to a circuit card. The sequencer is electrically connected to the circuit card, the sequencer is adapted to control the first and second sets of firing pins via a set of firing lines. The magazine is operably engaged with the breechplate, the magazine has a set of passageways to hold a plurality of expendables that is electrically connected to the first and second sets of firing pins. The second set of firing pins is greater than the first set of firing pins.

In another aspect, an exemplary embodiment of the present disclosure may provide that the first set of firing pins has a single firing pin electrically connected to a first firing line in the set of firing lines. The second set of firing pins has a pair of firing pins electrically connected to a second firing line in the set of the firing lines.

In another aspect, an exemplary embodiment of the present disclosure may provide that the first set of firing pins has a single firing pin that is electrically connected to a first firing line in the set of firing lines. The second set of firing pins has a pair of firing pins that is electrically connected to a second firing line in the set of the firing lines. In the exemplary embodiment, one of the firing pins of the pair of firing pins from the second set of firing lines is in series with a Zener diode.

In another aspect, an exemplary embodiment of the present disclosure may provide that the first set of firing pins has a single firing pin electrically connected to a first firing line in the set of firing lines. The second set of firing pins has a pair of firing pins electrically connected to a second firing line in the set of the firing lines. In the exemplary embodiment, each firing pin of the pair of firing pins from the second set of firing lines is in series with a logic switch provided by a field programmable gate array (FPGA) that is embedded in the circuit card. The FPGA is operably controlled by the sequencer for controlling the states of the logic switches.

In another aspect, an exemplary embodiment of the present disclosure may provide that the first set of firing pins has a single firing pin electrically connected to a first firing line in the set of firing lines. The second set of firing pins has a pair of firing pins electrically connected to a second firing line in the set of the firing lines. In the exemplary embodiment, a first firing pin of the pair of firing pins from the second set of firing lines is provided in a first bank of firing pins and a second firing pin of the pair of firing pins from the second set of firing lines is provided in a second bank of firing pins. The sequencer is adapted to select between the first bank of firing pins and the second bank of firing pins In yet another aspect, an exemplary embodiment of the present disclosure may provide a method. The method comprises the steps of providing a breechplate operably coupled to a dispenser disposed on a platform; providing a magazine for insertion into the dispenser, the magazine operably engaging the breechplate and housing a plurality of expendables; initiating a countermeasure dispensing system; determining the number of expendables from the plurality of expendables housed inside of the magazine; selecting at least one firing pin from a set of firing pins, wherein the at least one firing pin is one of a pair of firing pins electrically connected to a firing line in the set of firing lines; sending a first signal, by the sequencer, to the at least one firing pin in the pair of firing lines; and dispensing a first expendable from the magazine by the at least one firing pin in the pair of firing pins.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 23 (FIG. 23) is an electrical circuit diagram of the wiring harness of the CMDS between the sequencer and dispenser of the CMDS illustrated in FIG. 21.

Similar numbers refer to similar parts throughout the drawings.

DETAILED DESCRIPTION

Figure 1:
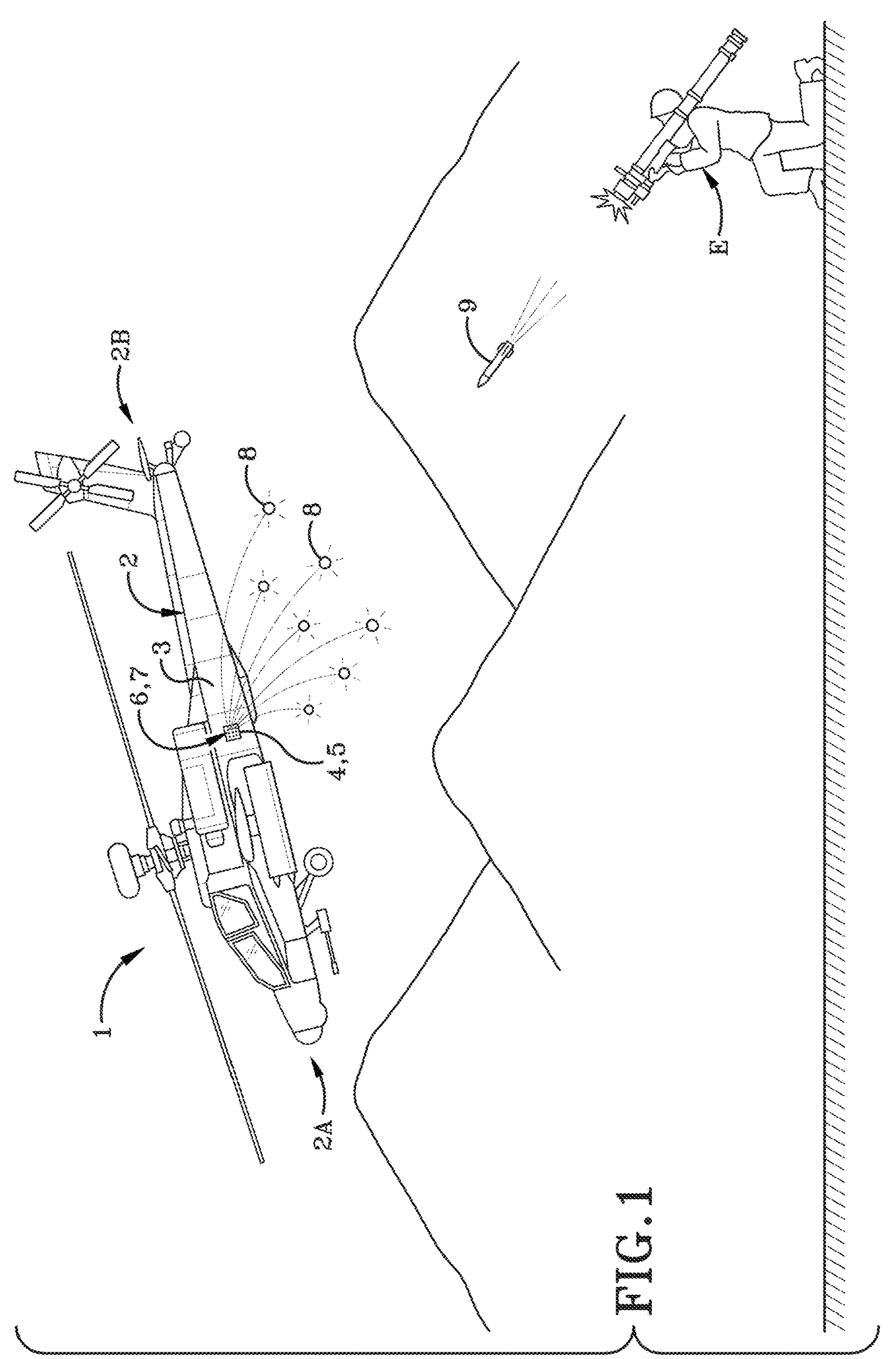
FIG. 1 (FIG. 1) is a diagrammatic view showing an aircraft having a CMDS used upon detecting an incoming enemy threat.

FIG. 1 illustrates a platform 1 such as a vehicle, ship or aircraft, which may be manned or unmanned, that includes a main body 2. As used herein, aircraft refers to fixed and rotary wing aircraft as well as UUVs and satellites. The main body 2 has a front end 2A and a rear end 2B that opposes the front end 2A. It should be understood that the directions of “front,” “rear,” “top,” “bottom,” “right,” and “left” are only used as a directional reference for the main body 2 and its associated components and/or parts described herein and illustrated in FIG. 1.

The platform 1 in this example is an aircraft and includes a sidewall 3 that extends from the front end 2A of the main body 2 to the rear end 2B of the main body 2. The sidewall 3 defines an opening 4 that is disposed between the front and rear ends 2A, 2B of the main body 2 that provides access to a chamber 5. The opening 4 and the chamber 5 defined by the sidewall 3 is sized and configured to receive a countermeasure dispensing system 6 (“CMDS”). The CMDS 6 operably engages the sidewall 3 of the main body 2 to mechanically fix the CMDS 6 to the aircraft 1. As illustrated in FIG. 1, the CMDS 6 is in line with the sidewall 3 of the main body 2 such that the CMDS 6 is even with the mold line of the aircraft 1 for aerodynamic purposes. In other embodiments, however, the CMDS 6 is uneven with the mold line of the aircraft 1, which are described in further details below. Upon mounting the CMDS 6, the CMDS 6 is electrically connected to a legacy wiring harness (not illustrated) that is provided in the aircraft 1 to provide power and communication to all electrical components in the CMDS 6, which is described in more detail below. As used herein, electrically connected or electrically coupled refers to a direct or indirect connection unless otherwise specified.

Prior to military operation or an aerial mission of the aircraft 1, the CMDS is pre-loaded with a plurality of expendables 7. Each expendable of the plurality of expendables 7 is loaded with flare and/or chaff material 8 for countermeasure purposes. In addition, each expendable of the plurality of expendables 7 includes an impulse cartridge (not illustrated) for detonating and dispensing the expendable from the aircraft 1. During military operation, the flare and/or chaff material 8 provides a distraction to an incoming enemy threat 9, initiated by an enemy "E", where the incoming enemy threat 9 is diverted to the flare and/or chaff material 8 while allowing the aircraft 1 to remain unscathed. During military operation or an aerial mission, the aircraft 1 may receive a warning from an on-board electronic warfare (EW) system regarding the incoming enemy threat 9 approaching the aircraft 1. Upon a determination made by the on-board EW system and/or an operator, the CMDS 6 dispenses a calculated amount of expendables of the plurality of expendables 7 that are disposed underneath, behind, or to the side of the aircraft 1. In addition, the CMDS 6 may also be provided along any suitable location of the aircraft 1 other than sidewall 3 of the main body 2. In one exemplary embodiment, a CMDS may be provided within a wing of an aircraft. In another exemplary embodiment, a CMDS may be provided in a fuselage or a pod disposed on an aircraft. In another exemplary embodiment, a CMDS may be provided on a separate device operably engaging an aircraft (e.g., a towable device).

Figure 2:
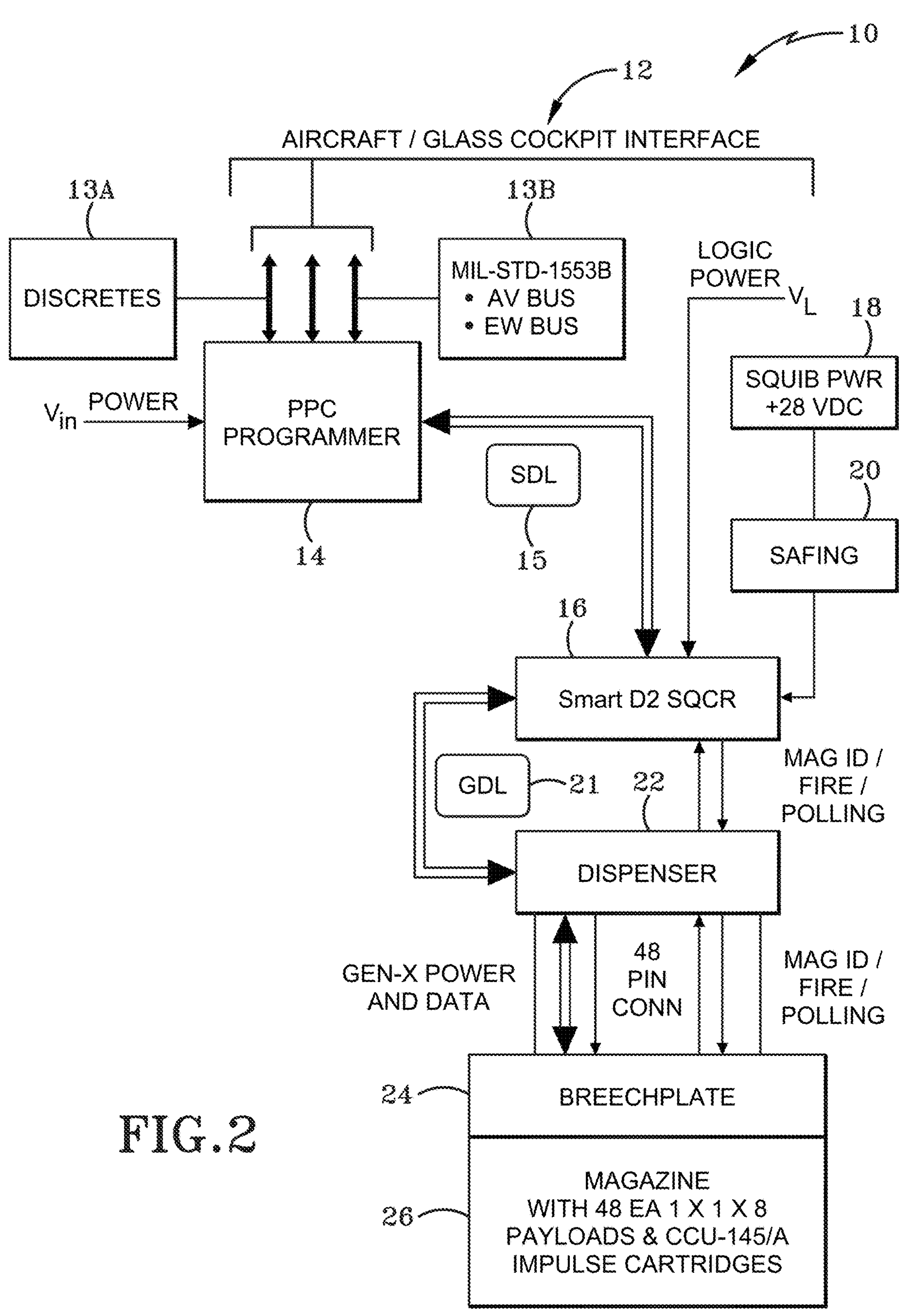
FIG. 2 (FIG. 2) is a diagrammatic view showing the CMDS and the electrical system of the aircraft according to one embodiment.

FIG. 2 illustrates one embodiment for a system 10 of the electrical connections between the legacy electrical components on the aircraft 1 with the CMDS 6. The system 10 includes an aircraft and/or cockpit interface 12 that is electrically connected to a programmer 14 via discrete signals 13A and serial buses 13B. Such discrete signals 13A included in this system 10A are ON/OFF signals such as aircraft identification wiring, weight-on-wheels signals, pilot activated manual dispense signal, threat warning and jammer dispense signals, and other suitable discrete signals where the voltage in such discrete signals is nominally about 28 VDC or in a range from about 8 VDC up to about 36 VDC. The discrete signals 13A and the serial buses 13B used in this embodiment may be of any suitable components for providing electrical connection and transferring communication between the aircraft and/or cockpit interface 12 and the programmer 14. In one exemplary embodiment, an avionic bus and an electronic warfare bus may be utilized for providing electrical connection and transference of communication between the aircraft and/or cockpit interface with a programmer. The serial buses 13B used in the aircraft in one example meet the military standard MIL-STD-1553. In addition, the programmer 14 is powered via an on-board power supply "$V_{in}$" located on the aircraft 1.

The system 10 also includes a sequencer 16 that is electrically connected to the programmer 14. The sequencer 16 (labeled as "Smart D2 SQCR" in FIG. 2) is electrically connected to the programmer 14 via a first data link 15 (a Sequencer Data Link or "SDL"). The first data link 15 allows for communication between the programmer 14 and the sequencer 16 during military operation of the aircraft 1. During military operation, the sequencer 16 may receive passageway types and fire commands from the programmer 14 over the first data link 15 based on incoming threats detected near the aircraft 1. In addition, the sequencer 16 is provided with logic power "VL" to allow the sequencer 16 to perform the necessary logic and/or commands received from the programmer 14. The logic power "VL" also allows the sequencer 16 to perform other logic and/or commands with other components in the system 10, which are described in more detail below. The logic power "VL" is also available when the aircraft 1 is grounded or in flight when the system 10 is turned on by the pilot of said aircraft 1. Moreover, the sequencer 16 is electrically connected to a squib power source 18, which is about +28 VDC. The squib power source 18 is electrically connected to and in series with a safing component 20. The squib power source 18 may be enabled when the saftting component 20 is enabled via a safety switch (e.g., a fuselage safety switch, a weight-on-wheels squib power interruption relay, and other electrical components of the like). The safing component 20 may interrupt or inhibit the dispensing of a plurality of expendables 7, to safeguard against inadvertent dispensing while being operated on the ground.

The system 10 also includes a dispenser 22 that is electrically connected to the sequencer 16 via a second data link 21 (GEN-X Data Link or "GDL"). The second data link 21 provides power and allows for communication between the sequencer 16 and the dispenser 22 during military operation of the aircraft 1, such as identifying the type of magazine located in the dispenser 22 (described in detail below), sending power impulses to the dispenser for firing and/or detonating expendables, and polling electrical components provided in the system 10 (described in detail below). Such communication between the sequencer 16 and the dispenser 22 is also sent to the programmer 14 via the first data link 15 for assessing the magazine type, monitoring the remaining number of expendables provided in the dispenser 22, and any expendable misfires that occurred.

The system 10 in this example also includes a breechplate 24 and a magazine 26 that are electrically connected to one another and are electrically connected to the dispenser 22. The dispenser 22 and the breechplate 24 are electrically connected such that the breechplate 24 is powered by the second data link 21 and is able to communicate with dispenser 22. Such power and communication allows the breechplate 24 to initiate tasks and/or commands sent from the sequencer 16 via the second data link 21. Such tasks and/or commands may be identifying the type of magazine 26 located in the dispenser 22, sending power impulses to the dispenser for firing and/or detonating expendables, and polling electrical components provided in the breechplate 24 and/or the magazine 26. As such, the breechplate 24 may output data and information to the sequencer 16, which may then be output to the programmer 14 to allow the system 10 to monitor certain variables and parameters along specific components during operation of the aircraft 1. Furthermore, the breechplate 24 and the magazine 26 are electrically connected to allow the breechplate 24 to fire specific expendables from the magazine 26. Such firing capabilities by the breechplate 24 through the electrical circuity of the breechplate 24 are described in more detail below.

The system 10 as illustrated in FIG. 2 will be referenced in each of the embodiments described below. It will be understood that the system 10 retains a majority of legacy electrical components such as the cockpit interface 12, discrete component 13A, serial buses 13B, programmer 14, first data link 15, and second data link 21. In addition, it will be understood that the system 10 may retain other legacy components such as the sequencer 16 and the dispenser 22. Moreover, it will be understood that the system 10 may include breechplates 24 and magazines 26 that are not legacy components provided in the aircraft 1. In one illustrated embodiment, a breechplate and a magazine, which are not legacy equipment, may be included into legacy equipment, such as a dispenser, provided on the military platform in which the magazine 26 may protrude outside of the dispenser 22 once loaded (see FIG. 11 and the description below).

Figure 3A:
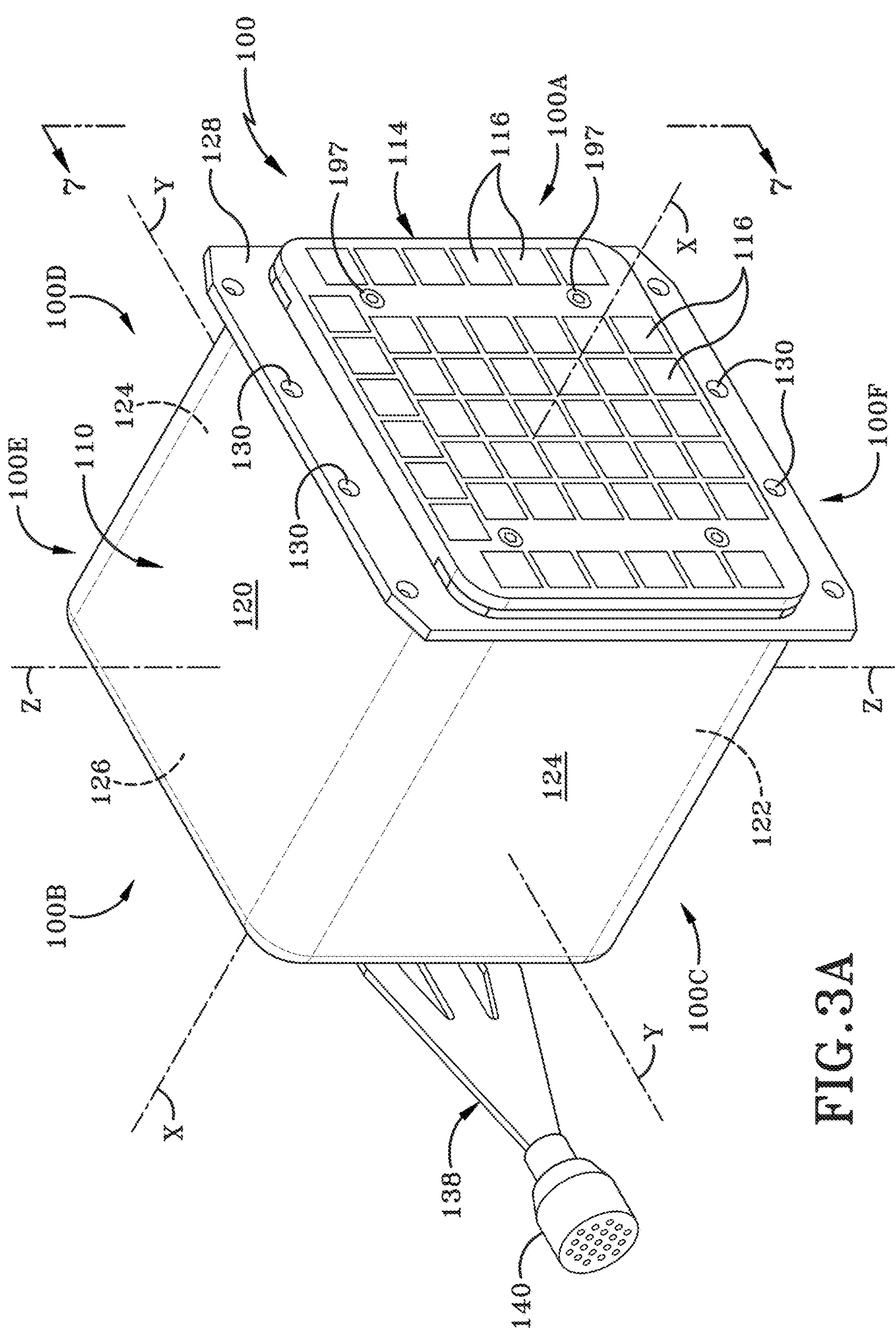
FIG. 3A (FIG. 3A) is a top isometric perspective view of one example of the CMDS.

Referring to FIGS. 3A-9, a CMDS 100 according to one embodiment is illustrated with its associated components. As best seen in FIG. 3B, the CMDS 100 includes a dispenser 110, a breechplate assembly 112, a magazine 114, a plurality of expendables 116, and a sequencer 118 (see FIG. 9). As illustrated in FIG. 3A, the CMDS 100 includes a front end 100A, a rear end 100B that opposes the front end 100A, a first side 100C, a second side 100D that opposes the first side 100C, a top end 100E, and a bottom end 100F that opposes the top end 100E. The front end 100A of the CMDS 100 faces outwardly towards the right side of the main body 2 when the CMDS 100 is provided in the chamber 5 of the aircraft 1. The CMDS 100 also defines a longitudinal axis "X" that extends from the front end 100A to the rear end 100B, a transverse axis "Y" that extends from the first side 100C to the right side 100D, and a vertical axis "Z" that extends from the top end 100E to the bottom end 100F.

Figure 3B:
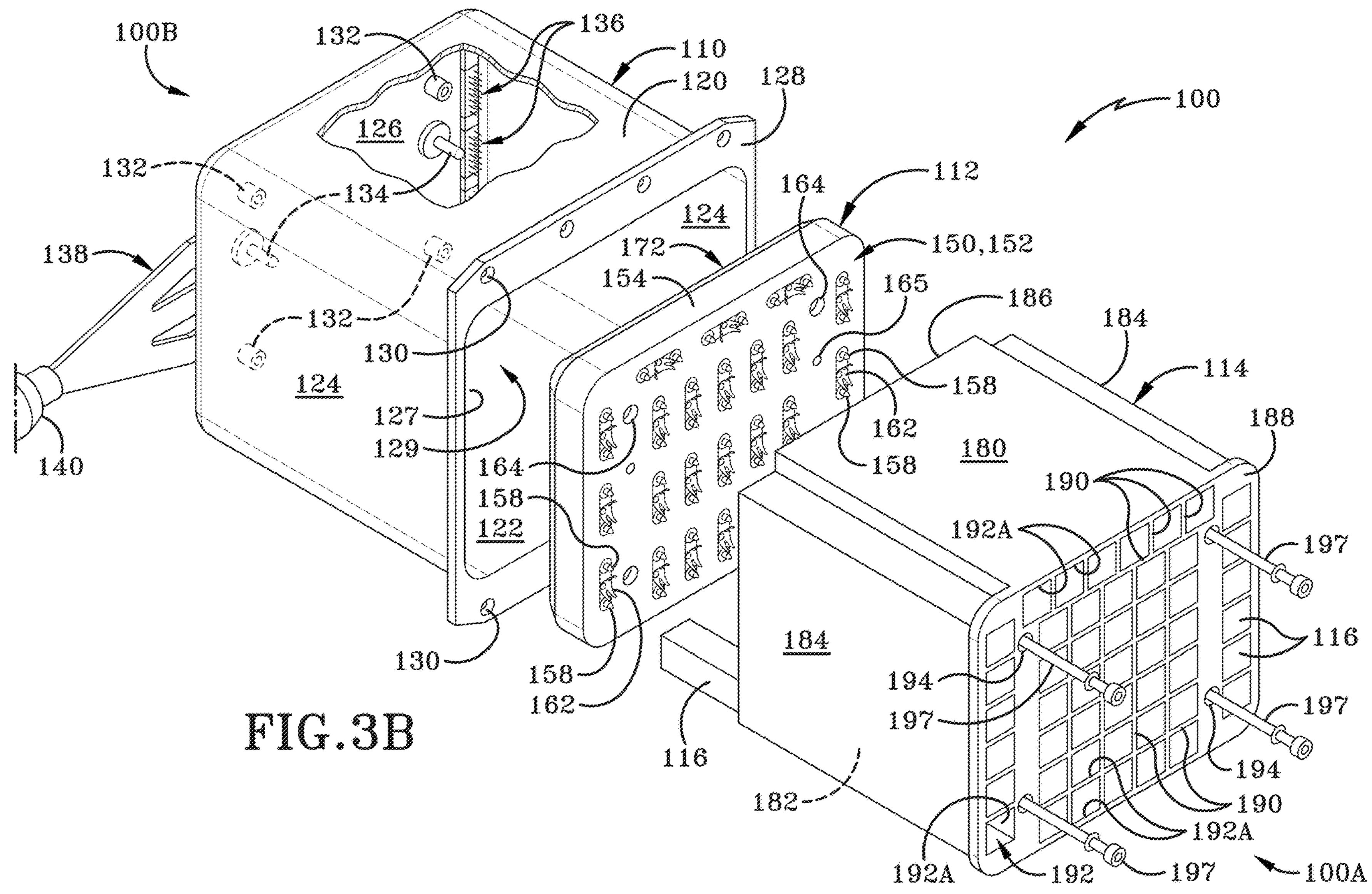
FIG. 3B (FIG. 3B) is a top exploded isometric perspective view of the example CMDS illustrated in FIG. 3A.

As illustrated in FIG. 3B, the dispenser 110 includes a top wall 120 that is disposed near the top end 100E of the CMDS 100, a bottom wall 122 that opposes the top wall 120 and is disposed near the bottom end 100F of the CMDS 100, a pair of side walls 124 that are parallel to one another and are disposed between the top and bottom walls 120, 122, and a rear wall 126 that is disposed at the rear end 100B of the CMDS 100. The top wall 120, the bottom wall 122, and the pair of side walls 124 collectively define a front opening 127 that is disposed at the front end 100A of CMDS 100. The top wall 120, the bottom wall 122, the pair of side walls 124, and the rear wall 126 collectively define a chamber 129 that extends from the front opening 127 to the rear wall 126. The chamber 129 is sized and configured to receive and house the breechplate assembly 112 and the magazine 114 upon assembly of the CMDS 100.

The dispenser 110 also includes a flange 128 that is disposed on each of the top wall 120, the bottom wall 122, and the pair of side walls 124 at the front end 100A of the CMDS 100. The flange 128 defines a plurality of apertures 130 that extends entirely through the flange 128 along an axis that is parallel to the longitudinal axis "X" of the CMDS 100. The flange 128 of the dispenser 110 provides the capability of securing the CMDS 100 to the aircraft 1 via a plurality of fasteners (not illustrated) passing through the plurality of apertures 130 and into the aircraft 1. The aircraft 1 may have a recessed portion disposed about the perimeter of the opening 4 such that flange 128 is even with the mold line of the sidewall 3.

Referring to FIG. 3B, the dispenser 110 includes a set of standoffs 132 that are provided on the rear wall 126 of the dispenser 110. The set of standoffs 132 laterally extends from the rear wall 126 and into the chamber 129. The set of standoffs 132 provides attachment points for fasteners to attach the breechplate assembly 112 and the magazine 114 to the dispenser 110. The dispenser 110 also includes a pair of pins 134 that are provided on the rear wall 126 of the dispenser 110. The pair of pins 134 laterally extend from the rear wall 126 and into the chamber 129. The pair of pins 134 provide mounting points for the breechplate assembly 112 for mounting the breechplate assembly 112 to the dispenser 110. As such, the set of standoffs 132 and the pair of pins 134 allow the breechplate assembly 112 to be maintained in the chamber 129 of the dispenser 110.

Still referring to FIG. 3B, the dispenser 110 includes sockets 136 that are provided on the rear wall 126 of the dispenser 110 proximate to side wall 124 of the dispenser 110 and the second side 100D of the CMDS 100. The sockets 136 are electrically connected to a wiring harness 138 that includes a plug 140. The wiring harness 138 and the plug 140 are adapted to electrically connect to the sequencer 118 that is disposed at a different location in the aircraft 1. The sockets 136, the wiring harness 138, and the plug 140 allows the breechplate assembly 112 to be powered and communicate with the sequencer 118, which is described in more detail below. In the illustrated embodiment, the dispenser 110 is a legacy D-59 Dispenser in a legacy AN/ALE-47 CMDS, meaning that the sockets 136, wiring harness 138, and plug 140 of the dispenser 110 supports a total of thirty firing lines that may be utilized by the sequencer 118. As such, the sockets 136, the wiring harness 138, and the plug 140 match the legacy A-Kit and B-Kit wiring harnesses in the legacy aircraft 1.

Figure 6:
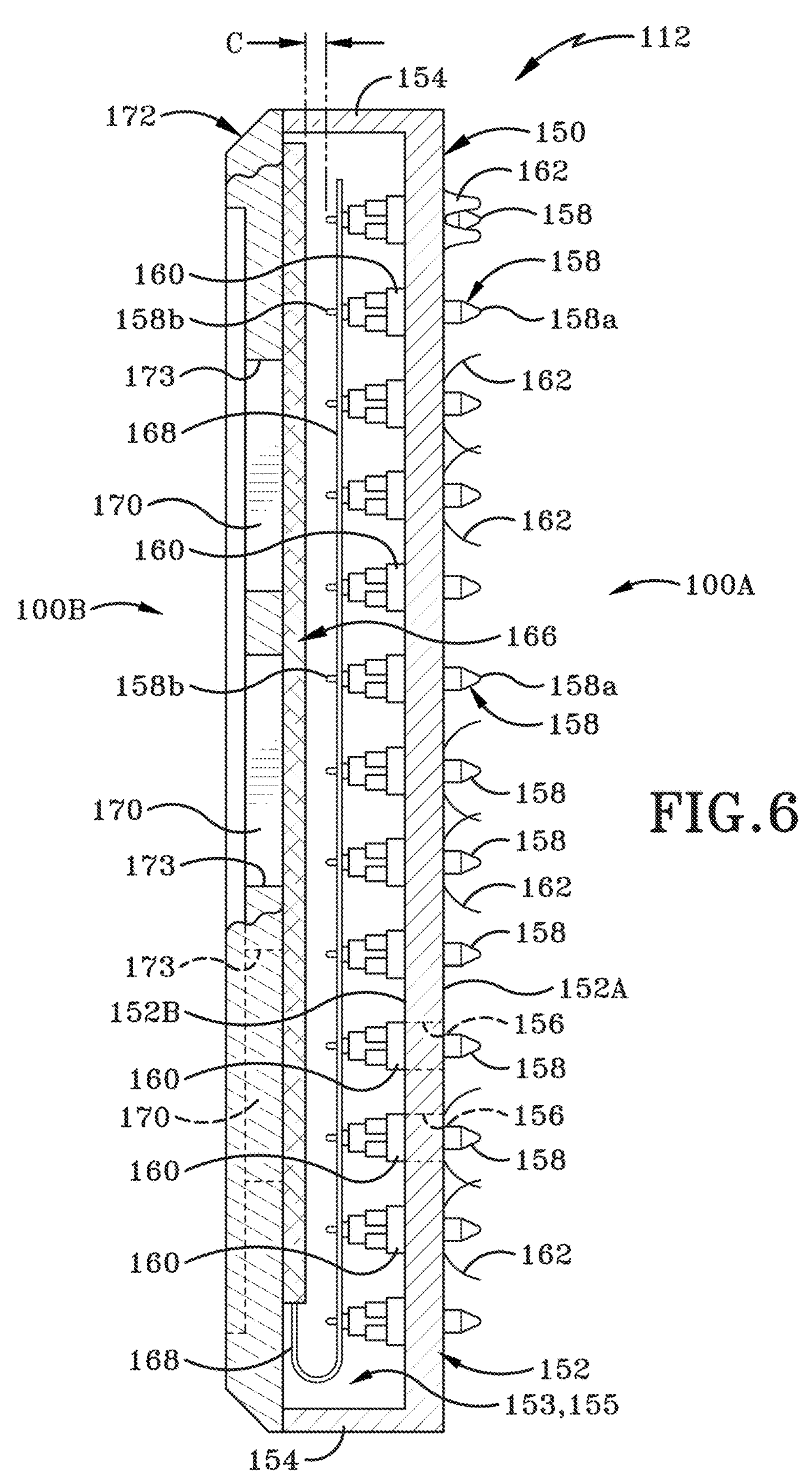
FIG. 6 (FIG. 6) is a left side cross-sectional view of the breechplate assembly of the CMDS illustrated in FIG. 3A taken along line 6-6 of FIG. 5.

Still referring to FIG. 3B, the breechplate assembly 112 includes a front plate 150 that has a base wall 152. The front plate 150 also includes a lateral wall 154 that is disposed about the perimeter of the base wall 152. The lateral wall 154 extends laterally away from the base wall 152 towards the rear end 100B of the CMDS 100. As illustrated in FIG. 6, the base wall 152 and the lateral wall 154 collectively define a central opening 153 proximate to the rear end 100B of the CMDS 100. The central opening 153 also provides access to a central space 155 that is collectively defined by the base wall 152 and the lateral wall 154.

Figure 8:
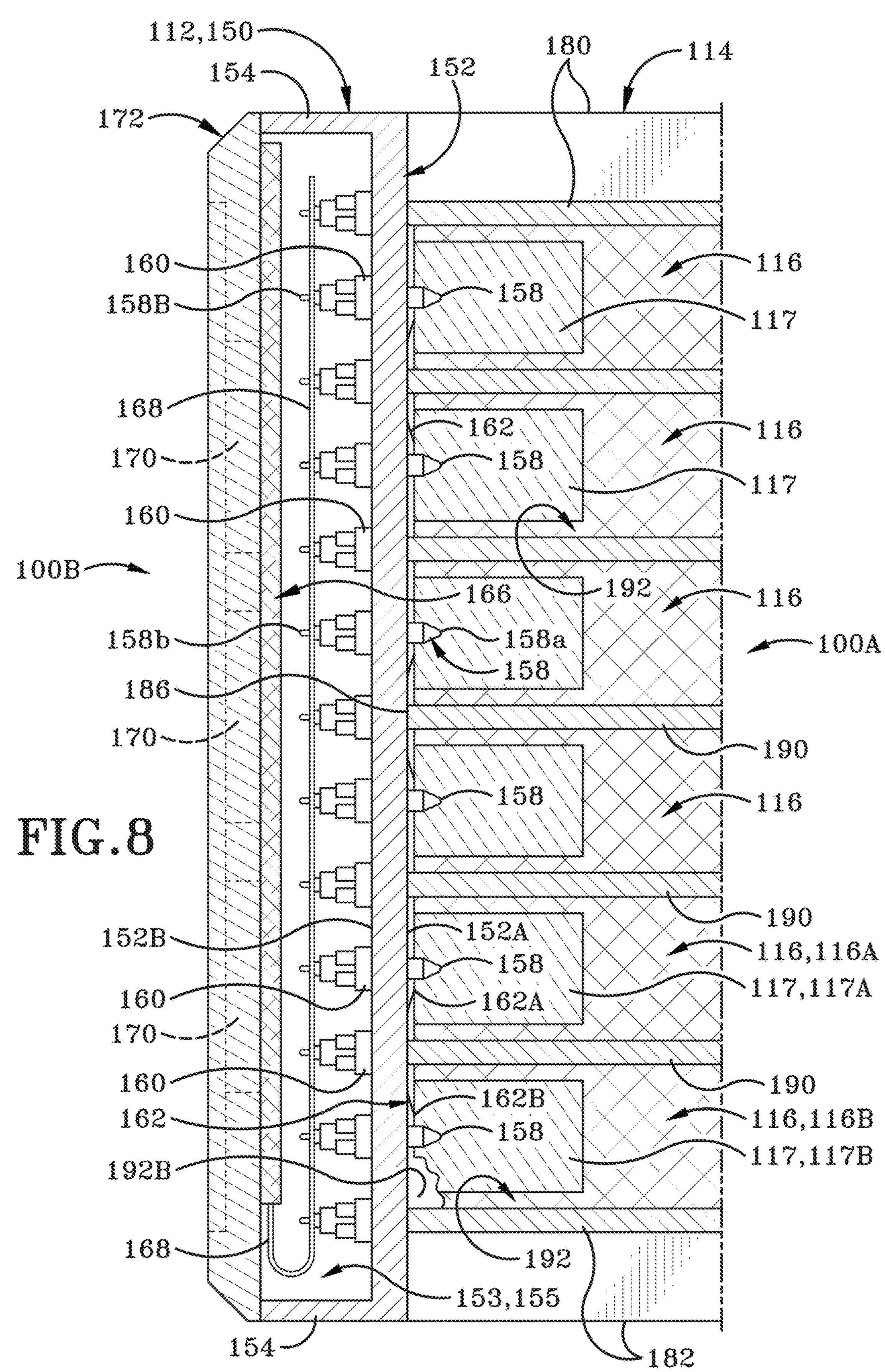
FIG. 8 (FIG. 8) is a left side cross-sectional view of the breechplate assembly, the magazine, and the plurality of expendables of the example CMDS illustrated in FIG. 3A.

Referring to FIGS. 3B through 5, the base wall 152 of the front plate 150 defines a first plurality of holes 156. Each hole of the first plurality of holes 156 extends entirely through the base wall 152 from the exterior surface 152A to the interior surface 152B such that the exterior surface 152A and the interior surface 152B are in communication at each hole of the first plurality of holes 156. In addition, each firing pin of a plurality of firing pins 158 is press-fitted to a retainer of a plurality of retainers 160 such that a firing pin of the plurality of firing pins 158 is disposed inside of a retainer of the plurality of retainers 160. As illustrated in FIGS. 6 and 8, each hole of the first plurality of holes 156 is sized and configured to receive a retainer from the plurality of retainers 160 that includes a firing pin inside of said retainer such that the base wall 152 secures the plurality of firing pins 158 and the plurality of retainers 160 to the front plate 150. Each retainer of the plurality of retainers 160 is press-fitted into the base wall 152 through a hole of the first plurality of holes 156.

While a firing pin of the plurality of firing pins 158 is press-fitted to a retainer of the plurality of retainers 160, a firing pin may operably engage a retainer in any suitable arrangement. Examples of operably engaging a firing pin to a retainer include attaching, affixing, adhering, connecting, fastening, fixing, gluing, joining, linking, mounting, riveting, securing, screwing, welding, and other suitable examples of operably engaging a firing pin to a retainer. Furthermore, while a retainer of the plurality of retainers 160 is press-fitted into the base wall 152 through a hole of the first plurality of holes 156, a retainer may operably engage a base wall via a hole in any suitable arrangement. Examples of operably engaging a retainer to a base wall via a hole include attaching, affixing, adhering, connecting, fastening, fixing, gluing, joining, linking, mounting, riveting, securing, screwing, welding, and other suitable examples of operably engaging a retainer to a base wall via a hole.

As illustrated in FIG. 6, each firing pin of the plurality of firing pins 158 includes a first end 158*a* that faces the front end 100A of the CMDS 100 and a second end 158*b* that faces the rear end 100B of the CMDS 100. The first end 158*a* of each firing pin of the plurality of firing pins 158 is disposed exterior to the central space 155 of the front plate 150 and is proximate to the exterior surface 152A. The second end 158*b* of each firing pin of the plurality of firing pins 158 is disposed inside of the central space 155 of the front plate 150 and is proximate to the interior surface 152B. Each of the first and second ends 158*a*, 158*b* is disposed outside a retainer of the plurality of retainers 160 when a retainer of the plurality of retainers 160 possess a firing pin of the plurality of firing pins 158.

Referring to FIGS. 3B through 5, the breechplate assembly 112 includes a plurality of ground springs 162 that operably engages the front plate 150. Each ground spring of the plurality of ground springs 162 is disposed on the exterior surface 152A of the base wall 152. Each ground spring of the plurality of ground springs 162 is also biased towards the front end 100A of the CMDS 100 in which each ground spring of the plurality of ground springs 162 is arched-shaped. In the illustrated embodiment, each ground spring in the plurality of ground springs 162 is disposed between two firing pins of the plurality of firing pins 158. As such, the plurality of ground springs 162 is half of the amount of plurality of firing pins 158 that is provided on the breechplate assembly 112. Each ground spring of the plurality of ground springs 162 provides a ground connection when a ground spring of the plurality of grounds springs 162 contacts an impulse cartridge of an expendable of the plurality of expendables 116, which is described in more detail below. Furthermore, each ground spring of the plurality of grounds spring 162 includes a notch at each terminal end. The notch at each terminal end of each ground spring of the plurality of ground springs 162 allows a firing pin of the plurality of firing pins 158 to pass through the notch and prevent any contact between the ground spring and the firing pin once a ground spring and a firing pin collectively contact an impulse cartridge of an expendable from the plurality of expendables 116.

Figure 5:
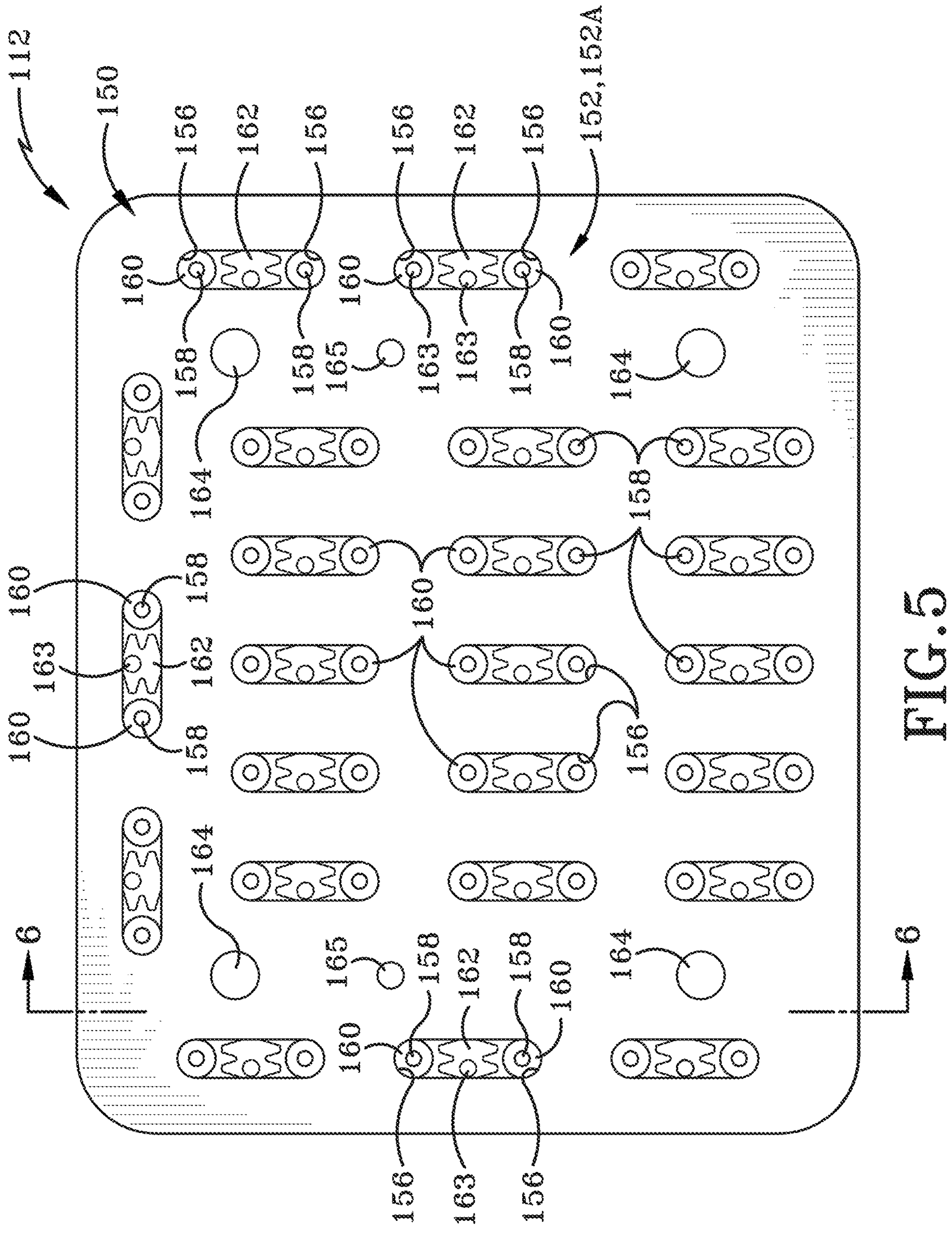
FIG. 5 (FIG. 5) is a front end elevation view of the breechplate assembly of the example CMDS illustrated in FIG. 3A.

As illustrated in FIG. 5, each ground spring of the plurality of ground springs 162 is fastened to the front plate 150 via a fastener of a plurality of fasteners 163. While each ground spring of the plurality of ground springs 162 is fastened to the front plate via a fastener of a plurality of fasteners 163, a ground spring may operably engage a front plate in any suitable arrangement. Examples of operably engaging a ground spring to a front plate include attaching, affixing, adhering, connecting, fixing, gluing, joining, linking, mounting, riveting, securing, screwing, welding, and other suitable examples of operably engaging a ground spring to a front plate.

Figure 4:
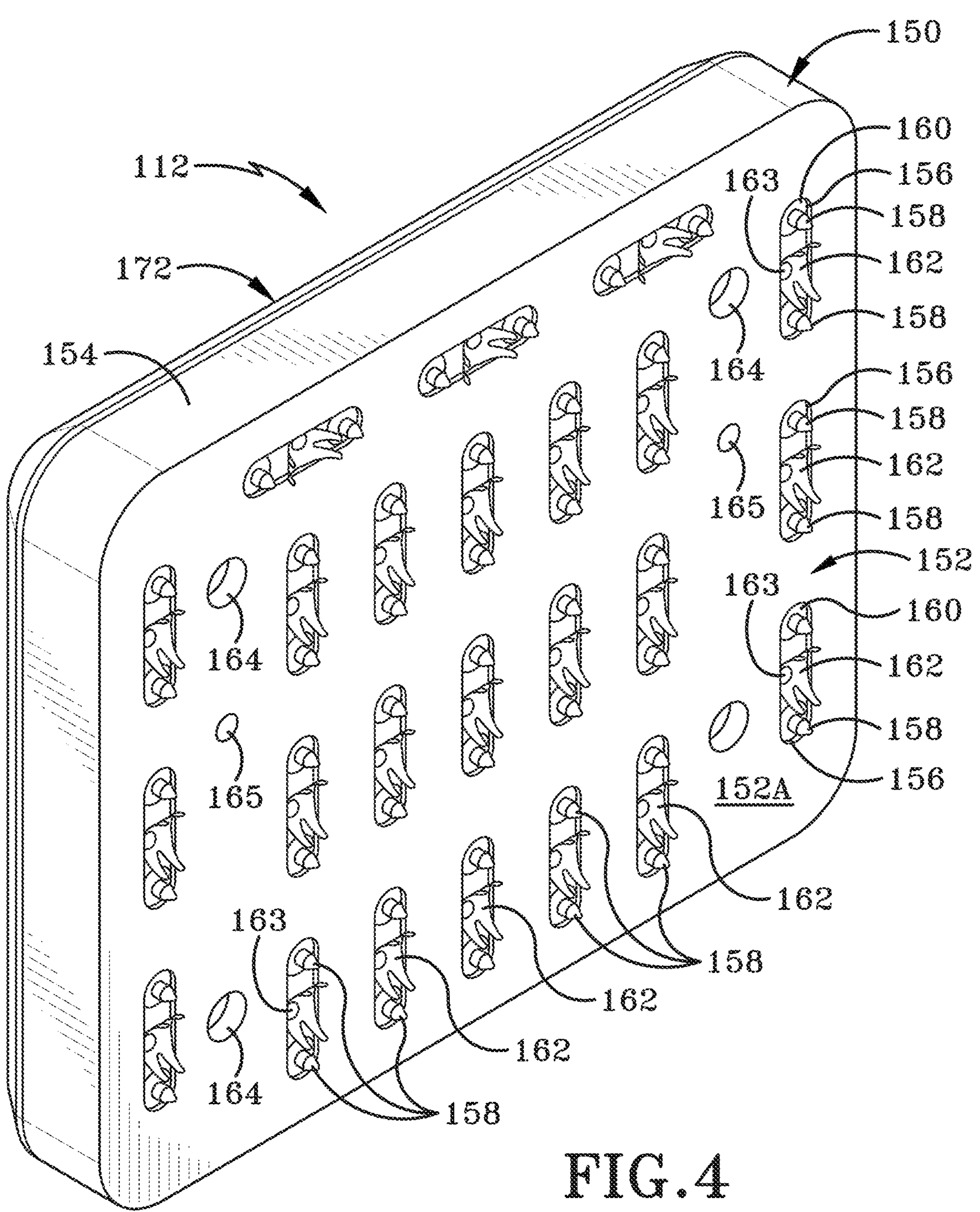
FIG. 4 (FIG. 4) is a top isometric perspective view of the breechplate assembly of the example CMDS illustrated in FIG. 3A.

The breechplate assembly 112 also includes a first set of through holes 164 and a second set of through holes 165 (seen in FIGS. 4 and 5). Each hole of the first set of through holes 164 and each hole of the second set of through holes 165 extends entirely through each component in the breechplate assembly 112. The first set of through holes 164 is sized and configured to receive the set of standoffs 132 of the dispenser 110 for securing the breechplate assembly 112 to the dispenser 110. The second set of through holes 165 is sized and configured to receive the pair of pins 134 of the dispenser for mounting the breechplate assembly 112 to the dispenser 110.

Referring to FIG. 6, the breechplate assembly 112 includes a circuit card 166. The circuit card 166 is sized and configured to be received by the central space 155 of the front plate 150. The circuit card 166 includes a firing pin connector 168 that electrically connects the circuit card 166 to each firing pin of the plurality of firing pins 158. Such connection allows the breechplate assembly 112 to communicate with the sequencer 118 through a plurality of firing lines 157 for sending and receiving data during military operation, which is described in more detail below. As illustrated in FIG. 6, the firing pin connector 168 attaches to each firing pin of the plurality of firing pins 158 where the firing pin connector 168 is disposed between the first and second ends 158*a*, 158*b* of each firing pin of the plurality of firing pins 158 proximate to the second end 158*b* of each firing pin of the plurality of firing pins 158. As such, the second end 158*b* of each firing pin of the plurality of firing pins 158 is disposed between the firing pin connector 168 and the circuit card 166. In addition, the second end 158*b* of each firing pin of the plurality of firing pins 158 and the circuit card 166 define a clearance "C" once the breechplate assembly 112 is assembled. The clearance "C" between the second end 158*b* of each firing pin of the plurality of firing pins 158 and the circuit card 166 is considered advantageous at least because the clearance "C" provides shock isolation between the plurality of firing pins 158 and the circuit card 166 when pyrotechnic reaction forces occur during the firing and/or denotation of an impulse cartridge in an expendable of the plurality of expendables 116. Such firing and/or denotation of an impulse cartridge in an expendable of the plurality of expendables 116 is explained in further detail below.

As illustrated in FIGS. 6 and 8, the circuit card 166 also includes socket connectors 170 for powering and controlling the electrical components embedded in the circuit card 166. The socket connectors 170 is configured to electrically connect to the sockets 136 on the dispenser 110. Such electrical connection between the circuit card 166 and the dispenser 110 allows the breechplate assembly 112 to communicate with the sequencer 118 for sending and receiving data during military operation, which is described in more detail below.

The breechplate assembly 112 also includes a rear plate 172. The rear plate 172 defines a slot 173 that is sized and configured to allow the socket connectors 170 of the circuit card 166 to pass through the rear plate 172 and electrically connect to the sockets 136 of the dispenser 110. The rear plate 172 is sized and configured to operably engage the circuit card 166 such that the circuit card 166 is secured to the rear plate 172. Having the circuit card 166 being secured to the rear plate 172 is considered advantageous at least because this arrangement mitigates the flex-induced failures caused during military operation when the front plate 150 flexes due to the dispensing of the plurality of expendables 116. In addition, the arrangement of the circuit card 166 and the rear plate 172 allows for future expansion and/or alteration of the circuit card 166 for automated passageway identification, passageway logic programming, and sustainable passageway power. While the circuit plate 166 is secured to the rear plate 172, a circuit card may operably engage to a rear plate in any suitable arrangement. Examples of operably engaging a circuit card to a rear plate include attaching, affixing, adhering, connecting, fastening, fixing, gluing, joining, linking, mounting, riveting, screwing, welding, and other suitable examples of operably engaging a circuit card to a rear plate.

Furthermore, the rear plate 172 is secured to the front plate 150 in which the circuit card 166 is disposed between the front plate 150 and the rear plate 172 to form the breechplate assembly 112. While the rear plate 172 is secured to the front plate 150, a rear plate may operably engage to a front plate in any suitable arrangement. Examples of operably engaging a rear plate to a front plate include attaching, affixing, adhering, connecting, fastening, fixing, gluing, joining, linking, mounting, riveting, securing, screwing, welding, and other suitable examples of operably engaging a rear plate to a front plate.

As illustrated in FIG. 3B, the magazine 114 includes a top wall 180 that is disposed near the top end 100E of the CMDS 100, a bottom wall 182 that opposes the top wall 180 and is disposed near the bottom end 100F of the CMDS 100, a pair of side walls 184 positioned parallel to one another and disposed between the top and bottom walls 180, 182, a rear wall 186 that is disposed at the rear end 100B of the CMDS 100, and a front wall 188 that is disposed directly opposite to the rear wall 186 at the front end 100A of the CMDS 100. The magazine 114 also includes a plurality of dividing walls 190 that collectively defines a first plurality of passageways 192 that extends from the front wall 188 to the rear wall 186. The magazine 114 also defines a front set of apertures 192A disposed proximate to the front end 100A of the CMDS 100 and a rear set of apertures 192B disposed proximate to the rear end 100B of the CMDS 100. Each passageway in the first plurality of passageways 192 has a front aperture from the front set of apertures 192A and a rear aperture from the rear set of aperture 192B to receive and house an expendable from the plurality of expendables 116.

As illustrated in FIG. 3B, the first plurality of passageways 192 defined by the magazine 114 has a total of forty-eight square passageways that are sized and configured to be loaded with a plurality of expendables, such as plurality of expendables 116, where each expendable has the dimension of 1×1×8.1 inches. While the magazine 114 includes a total of forty-eight passageways in the first plurality of passageways 192 with the dimensions of 1×1×8.1 inches, any suitable number of passageways may be included in a magazine with a dimension of 1×1×8 inches. Examples of suitable numbers of passageways provided in a magazine with a dimension of 1×1×8.1 inches includes at least 30 passageways, more than 30 passageways, between about 48 passageways up to about 60 passageways, about 54 passageways, about 60 passageways, and any other suitable numbers of passageways provided in a magazine with a dimension of 1×1×8.1 inches.

While the magazine 114 includes a first plurality of passageways 192 where each passageway has the dimension of 1×1×8 inches, a magazine may have any suitable size of passageway. Examples of suitable sizes of passageways that may be provided in a magazine include 1×2×8.1 inches, 2×2.5×8.1 inches, and any other suitable sizes of passageways that may be provided in a magazine. If the 1×2×8.1-inch passageway dimension is selected for a magazine, any suitable number of 1×2×8.1-inch passageways may be provided in the magazine. Examples of suitable numbers of 1×2×8.1-inch passageways that may be provided in a magazine include one, at least one, two, plurality, three, four, five, six, seven, eight, and any other suitable number of 1×2×8.1-inch passageway that may be provided in a magazine. If the 2×2.5×8.1-inch passageway dimension is selected for a magazine, any suitable number of 2×2.5×8.1-inch passageways may be provided in the magazine. Examples of suitable numbers of 2×2.5×8.1-inch passageways that may be provided in a magazine include one, at least one, two, plurality, three, four, five, six, and any other suitable number of 2×2.5×8.1-inch passageway that may be provided in a magazine.

Furthermore, the number of passageways 192 provided in a magazine 114 is complementary to the number of firing pins 158 provided in a breechplate assembly 112. Such complementary configuration between the number of passageways 192 and the number of firing pins 158 is dependent upon the types of expendables being used in the magazine 114. In one example, a number of passageways in a magazine and a number of firing pins in a breechplate assembly is 48 passageways and 48 firing pins when the dimension of the expendable is 1×1×8.1 inches. In another example, a number of passageways in a magazine and a number of firing pins in a breechplate assembly is 54 passageways and 54 firing pins when the dimension of the expendable is 1×1×8.1 inches. In another example, a number of passageways in a magazine and a number of firing pins in a breechplate assembly is 60 passageways and 60 firing pins when the dimension of the expendable is 1×1×8.1 inches. In another example, a number of passageways in a magazine and a number of firing pins in a breechplate assembly is 14 passageways and 14 firing pins when the dimensions of the expendables are 1×2×8 inches and 2×2.5×8 inches. In another example, a number of passageways in a magazine and a number of firing pins in a breechplate assembly is 14 passageways and 14 firing pins when the dimensions of the expendables are 1×2×8 inches and 2×2.5×8 inches. It should be understood that none of the examples listed above shall limit number of passageways 192 provided in a magazine 114 that complement the number of firing pins 158 provided in a breechplate assembly 112.

Referring to FIG. 3B, the magazine 114 defines a second plurality of passageways 194 that extends through the magazine 114 from the front wall 188 to the rear wall 186. In the illustrated embodiment, the second plurality of passageways 194 are disposed parallel to the first plurality of passageways 192. In addition, the second plurality of passageways 194 are positioned between the first plurality of passageways 192 proximate to the center of the front wall 188 of the magazine 114.

Figure 7:
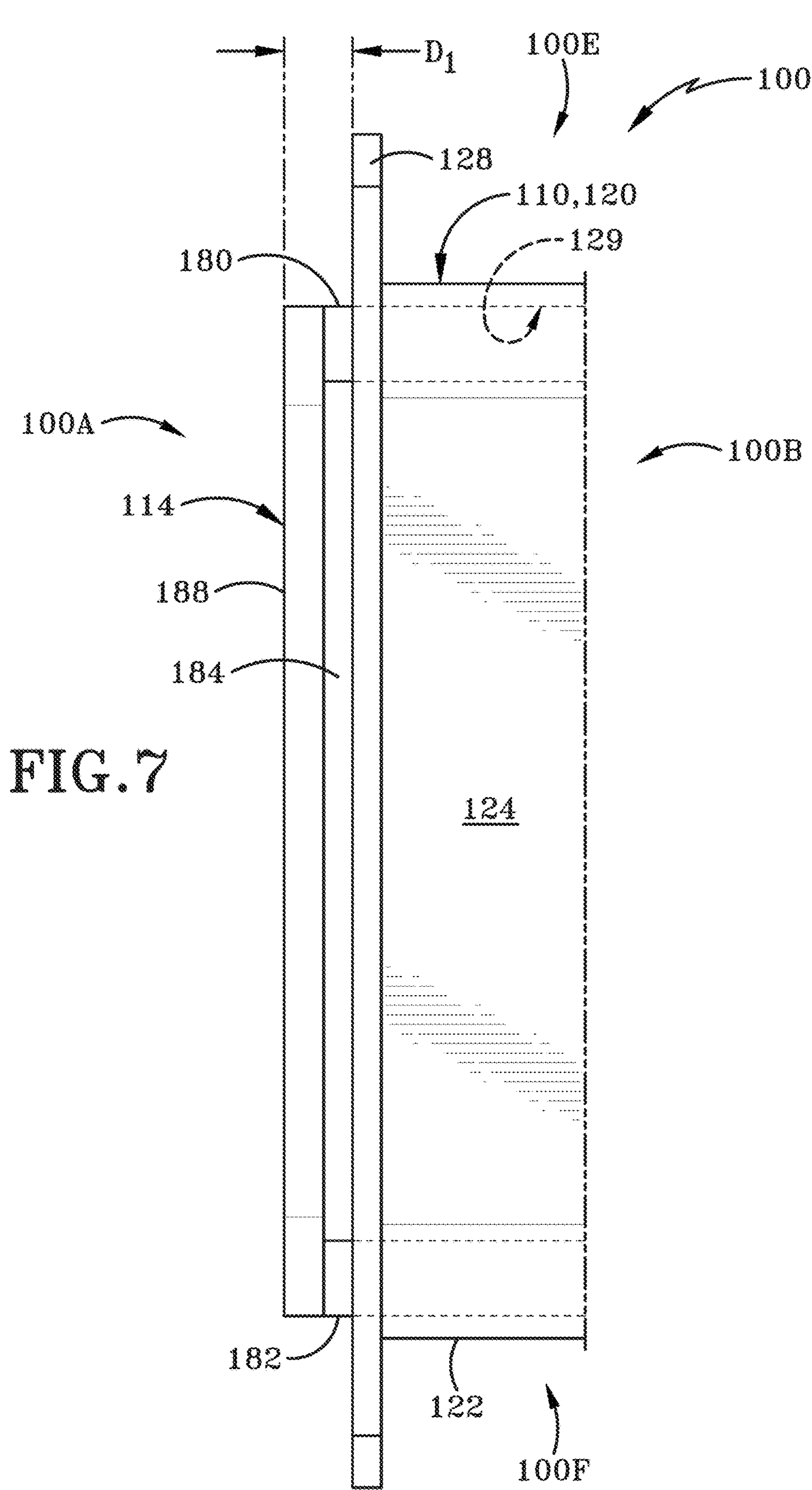
FIG. 7 (FIG. 7) is a right side elevation view of the example CMDS illustrated in FIG. 3A taken along line 7-7 of FIG. 3A. The magazine is protruding from the dispenser in the example CMDS.

In the illustrated embodiment, a portion of the magazine 114 protrudes beyond the flange 128 of the dispenser 110 at a first distance "$D_1$" that is measured from the front surface of the front wall 188 to the front surface of the flange 128 (shown in FIG. 7). The magazine 114 protrudes due to the overall thickness of the breechplate assembly 112 in CMDS 100. In the illustrated embodiment, the first distance "$D_1$" is of about 0.51 inches from the front surface of the front wall 188 to the front surface of the flange 128.

Figure 9:
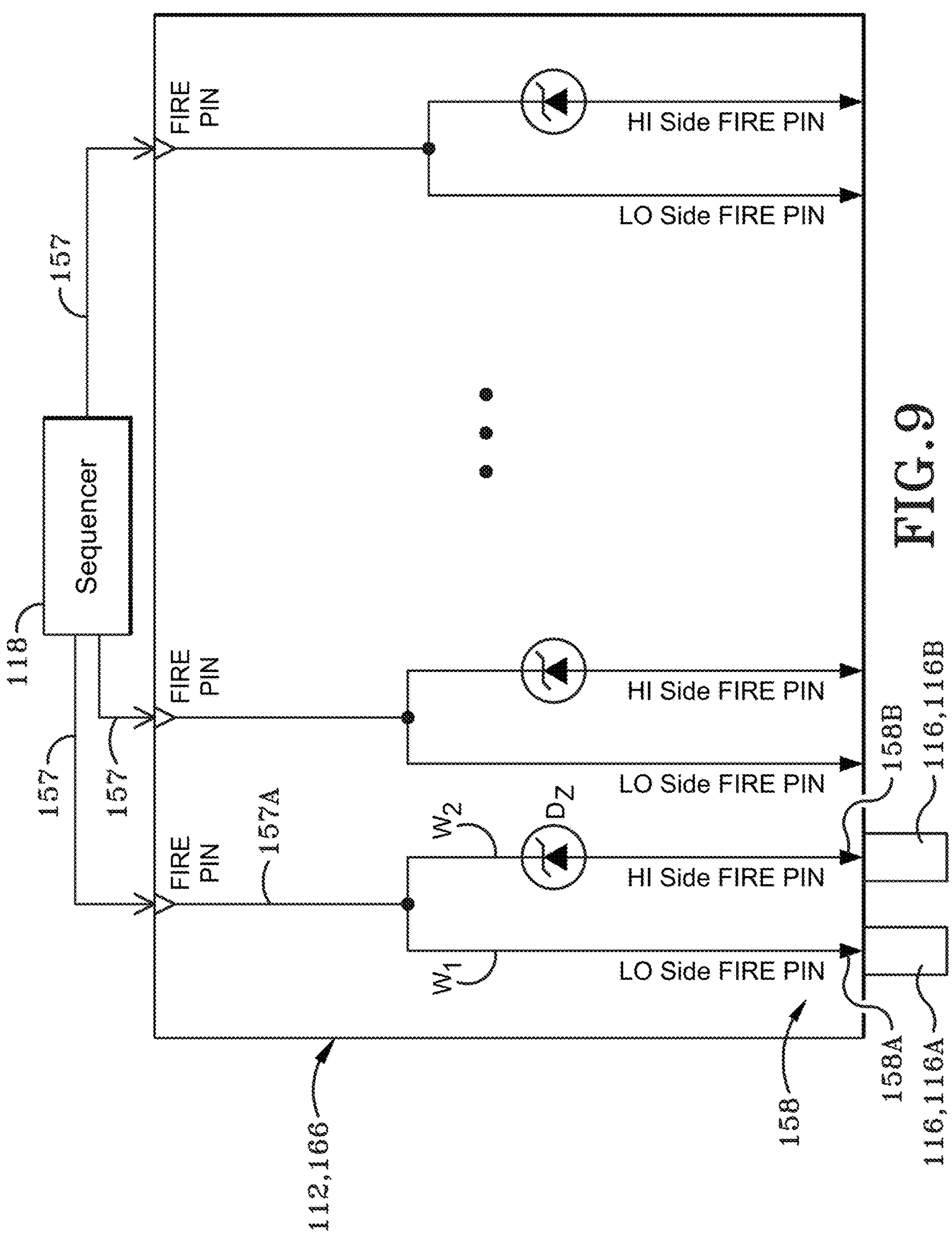
FIG. 9 (FIG. 9) is an electrical circuit diagram of the circuit card of the breechplate assembly in the example CMDS illustrated in FIG. 3A.

In the illustrated embodiment, the sequencer 118 in the CMDS 100 is a legacy ALE-47 Sequencer. The sequencer 118 retains its original hardware and wiring harnesses that electrically connect to the dispenser 110. As such, the sequencer 118 only supports up to a total of thirty firing lines in the CMDS 100. In addition, the sequencer 118 may receive updated logic and/or commands to allow the sequencer 118 to perform with the dispenser 110, the breechplate assembly 112, and the magazine 114. In the illustrated embodiment, twelve of the thirty firing lines supported by the sequencer 118 and the dispenser 110 are electrically connected to a single firing pin in the plurality of firing pins 158. In addition, eighteen of the thirty firing lines provided a pair of firing pins from the plurality of firing pins 158 such that each firing line in the eighteen firing lines is electrically connected to first and second firing pins of a pair of firing pins from the plurality of firing pins 158. Such expansion of firing pins is illustrated in FIG. 9, which is described in more detail below.

Prior to military operation, the magazine 114 will be loaded with a plurality of expendables 116. The number of passageway in the first plurality of passageways 192 of the magazine 114 will limit the size and number of the expendables that may be loaded into the magazine 114 (e.g., every passageway in a plurality of passageways has the dimensions of 1×1×8 inches and a magazine includes a total of forty-eight passageways). Each expendable of the plurality of expendables 116 is loaded into the rear end of the magazine 114. As such, an expendable of the plurality of expendables 116 is inserted through a rear aperture 192B in a passageway of the first plurality of passageways 192 until the expendable reaches the first aperture 192A at the front wall 188 of the magazine 114. Once the plurality of expendables 116 is loaded into the magazine 114, the fasteners 197 pass through the magazine 114 and the breechplate assembly 112 to operably engage the breechplate assembly 112 with the magazine 114 onto the dispenser 110.

In the illustrated embodiment, the dispenser 110 in unmodified and is already provided on the aircraft 1. As such, the installation of the dispenser 110 is not required in this embodiment. In addition, the wiring harness 138 is already electrically connected to the sequencer 118.

The breechplate assembly 112 and the magazine 114 are then inserted through the front opening 127 and into the chamber 129 of the dispenser 110. For mounting purposes, the pair of pins 134 are inserted the through holes 165 of the breechplate assembly 112 for mounting the breechplate assembly 112 to the dispenser 110. Such mounting between the breechplate assembly 112 and the dispenser 110 helps align the set of standoffs 132 with the through holes 164 in the breechplate assembly 112 and with the fasteners 197 for ease of securing the breechplate assembly 112 and the magazine 114 to the dispenser 110. Prior to securing the fasteners 197 to the set of standoffs 132, the socket connectors 170 of the breechplate assembly 112 are electrically connected to the sockets 136 of the dispenser 110 to allow the communication between the breechplate assembly 112 and the sequencer 118 during military operation. Once the sockets 136 and socket connector s 170 are electrically connected, the fasteners 197 may then be secured to the set of standoffs 132 for securing the breechplate assembly 112 and the magazine 114 inside of the dispenser 110.

As the breechplate assembly 112 and the magazine 114 are secured to the dispenser 110, a firing pin of the plurality of firing pins 158 is disposed inside of an impulse cartridge of an expendable of the plurality of expendables 116 (as shown in FIG. 8). As such, each firing pin of the plurality of firing pins 158 is contacting the impulse cartridge of the expandable of the plurality of expendables 116 such that the firing pin may cause firing of the impulse cartridge and dispensing of the expendable. In addition, each ground spring of the plurality of ground springs 162 is contacting a pair of expendables of the plurality of expendables 116 for grounding purpose. Specifically, each ground spring of the plurality of ground springs 162 is in contact with a pair of impulse cartridges 117 that are provided in a pair of expendables of a plurality of expendables 116. For example, a first end 162A of a ground spring of a plurality of ground springs 162 contacts a first impulse cartridge 117A of a first expendable 116A of the plurality of expendables 116 to ground the first expendable, and a second end 162B of a ground spring of the plurality of ground springs 162 contacts a second impulse cartridge 117B of a second expendable 116B of the plurality of expendables 116 to ground the second expendable.

As illustrated in FIG. 7, a portion of the magazine 114 protrudes outside of the dispenser 110 and into the exterior environment outside of the chamber 129. Such protrusion of the magazine 114 is caused by the added thickness of the breechplate assembly 112 as compared to the legacy breechplate assembly provided in the legacy CMDS of the aircraft 1. Traditional breechplate assemblies used in ALE-47 CMDS, however, are thinner to the allow magazine 114 to be even with the mold line of the sidewall 3.

As illustrated in FIG. 9, the circuit card 166 includes the electrical circuitry that is able to leverage the sequencer 118. The sequencer 118 is electrically connected to each and every firing pin of the plurality of firing pins 158 in two electrical configurations. In the first electrical configuration (not illustrated), the sequencer 118 is electrically connected to twelve of the thirty firing lines 157 where the sequencer 118 may operably control a single firing pin in the plurality of firing pins 158. Here, the firing pins that are electrically connected to the twelve of the thirty firing lines 157 define a first set of firing lines. In this electrical configuration, each firing pin receives an electrical pulse sent by the sequencer 118 to dispense an expendable from a plurality of expendables 116.

In the second configuration, eighteen of the thirty firing lines provides a pair of firing pins from the plurality of firing pins 158 such that each firing line in the eighteen firing lines is electrically connected to first and second firing pins of a pair of firing pins from the plurality of firing pins 158. Here, the firing pins that are electrically connected to the eighteen of the thirty firing lines 157 define a second set of firing lines. As illustrated in FIG. 9, the sequencer 118 is electrically connected to a first pair of firing pins 158A, 158B in the plurality of firing pins 158 via a first firing wire 157A in a plurality of firing wires 157. The first firing wire 157A splits off into first and second firing lines $W_1$, $W_2$. The first firing line $W_1$ is electrically connected to the first firing pin 158A, and the second firing line $W_2$ is electrically connected to the second firing pin 158B. In this illustrated embodiment, a Zener diode "$D_Z$" is embedded in the second firing line $W_2$ such that the sequencer 118 is in series with the Zener diode "$D_Z$" and the second firing pin 158B. The Zener diode "$D_Z$" that is embedded in the second firing line $W_2$ has a Zener voltage threshold "$V_Z$" that must be overcome by a required voltage.

During operation of the electrical configuration, the sequencer 118 is able to send first and second pulses to the first and second firing pins 158A, 158B in order to fire first and second expendables 116A, 116B of the plurality of expendables 116. To fire the first expendable 116A in the plurality of expendables 116, the sequencer 118 sends a first pulse to the first firing pin 158A via the first firing line 157A. The first pulse sent by the sequencer 118 includes a first voltage $V_1$ that is less than the Zener voltage "$V_Z$", meaning the that first pulse is unable to pass the Zener diode "$D_Z$." As such, the first signal sent by the sequencer 118 will progress through the first firing line "$W_1$" and towards the first firing pin 158A to fire the first expendable 116A of the plurality of expendables 116. To fire the second expendable 116B in the plurality of expendables, the sequencer 118 sends a second pulse to the second firing pin 158B via the first firing line 157A. The second pulse sent by the sequencer 118 includes a second voltage $V_2$ that is greater than or equal to the Zener voltage "$V_Z$". As such, the second signal sent by the sequencer 118 will progress through the second firing line "$W_2$", past the Zener diode "$D_Z$", and towards the second firing pin 158B to fire the second expendable 116B of the plurality of expendables 116.

The circuitry of the breechplate assembly 112 illustrated in FIG. 9 is considered advantageous to at least one exemplary embodiment because the inclusion of the Zener diode "$D_Z$" into pairs of firing pins in the plurality of firing pins 158 allows the CMDS 100 to fire expendables of the plurality of expendables 116 independently. However, other mechanisms or instantiations of allowing the firing of the plurality of pins 158 through two independent lines are entirely possible. The independent firing of single expendables in the plurality of expendables 116 is accomplished by duplicating eighteen of the existing thirty firing lines, as provided on the dispenser 110. In one exemplary embodiment, this is accomplished by embedding a Zener diode "$D_Z$" into each expanded fire line so that each pair of firing pins may independently fire a single expendable rather than pair of expendables dependent upon the pulse voltage sent by the sequencer 118. The existing eighteen firing lines in the illustrated embodiment are now expanded to thirty-six firing lines to provide a total of forty-eight firing lines in the CMDS 100 (i.e., eighteen of the thirty-six firing lines is embedded with a Zener diode "$D_Z$").

While the breechplate assembly 112 duplicates eighteen of the existing thirty firing lines that are provided on the dispenser 110 via the use Zener diodes, any suitable amount of existing firing lines provided on a dispenser may be expanded on a breechplate assembly. Example amounts of existing firing lines that may be expanded include a range between about 18 firing lines up to about 30 firing lines.

Figure 10:
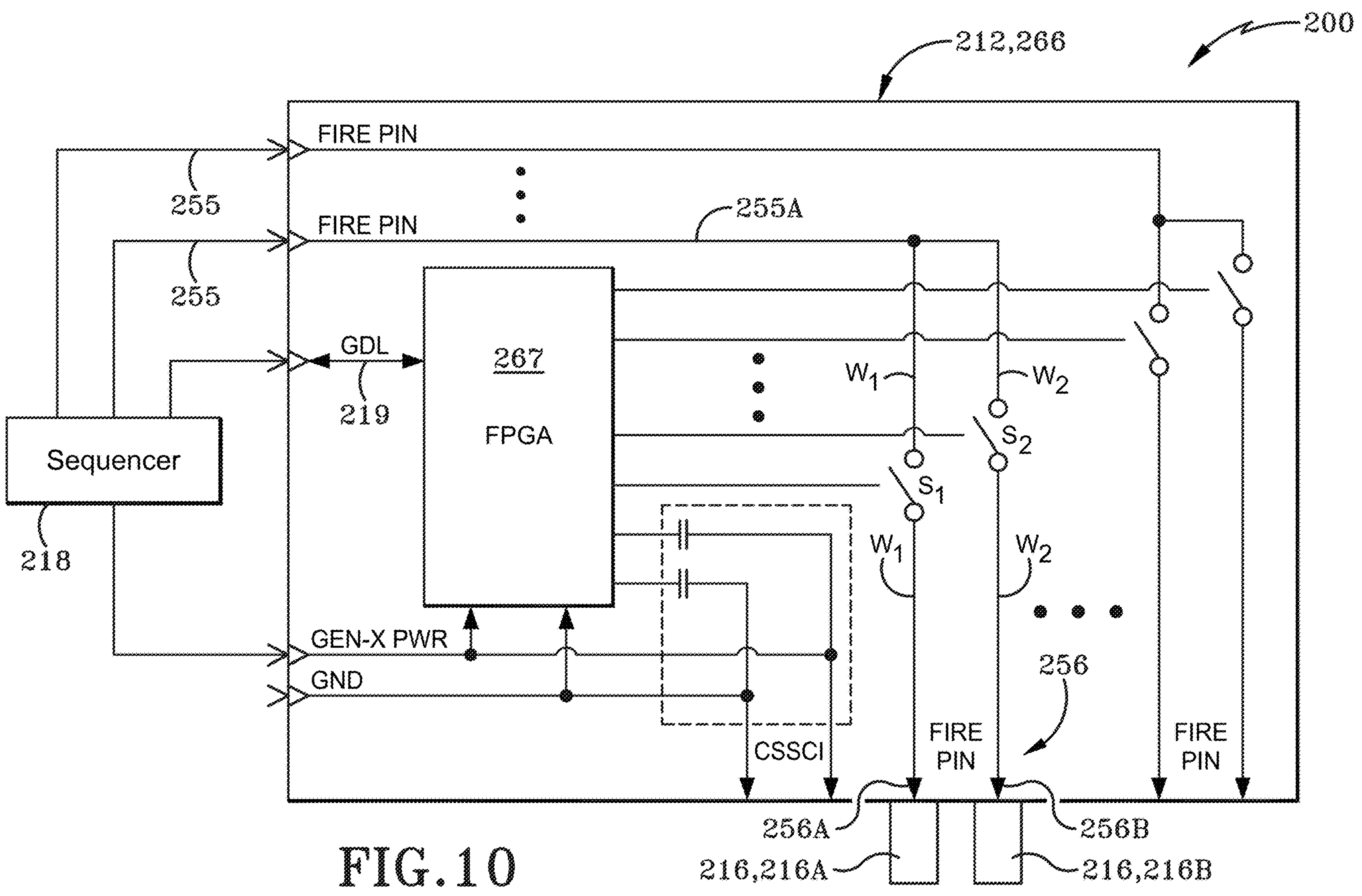
FIG. 10 (FIG. 10) is an electrical circuit diagram of the circuit card of the breechplate assembly in another example of the CMDS.

FIG. 10 illustrates another CMDS 200 that is similar to the CMDS illustrated in FIGS. 3A-9, except as detailed below. In the illustrated embodiment, CMDS 200 includes substantially similar components of CMDS 100. As such, the dispenser (not illustrated), breechplate assembly 212, magazine (not illustrated), expendables (not illustrated), and sequencer 218 in CMDS 200 are substantially similar to the dispenser 110, the breechplate assembly 112, magazine 114, expendables 116, and sequencer 118. As such, the dispenser and the sequencer are both legacy components provided in the aircraft 1. However, the circuitry of the circuit card 266 in the breechplate assembly 212 is different than the circuitry of the circuit card 166 in the breechplate assembly 112.

In the illustrated embodiment, the sequencer 218 includes a multiplexer (not illustrated). As illustrated in FIG. 10, the multiplexer of the sequencer 218 is embedded into the circuitry of the circuit card 266 through the use of a field programmable gate array (FPGA) 267. The multiplexer implements its associated control logic into the FPGA 267 to allow for the implementation of logic switches into the breechplate assembly 212, which is described in more detail below. To include such control logic into the breechplate assembly 212, the FPGA 267 includes additional electrical components such as a softcore processor, embedded memory (flash memory and RAM), universal asynchronous receiver/transmitter (UART), and programmable logic cells that allows for the duplication of the twenty-four fire selects from the existing thirty fire selects provided in the sequencer 218. In the system, FPGA 267 is electrically connected to the sequencer 218 since the FPGA 267 is electrically connected to the multiplexer and is being powered by the sequencer 218. The FPGA 267 is also electrically connected to ground. Additionally, the FPGA 267 is electrically connected to the sequencer 218 via the second data link 219 to allow communication and data sharing between the sequencer 218 and the FPGA 267.

Similar to the circuitry of the circuit card 166 in the breechplate 112, the circuitry of the circuit card 266 in the breechplate assembly 212 duplicates existing firing lines in the CMDS 200. However, the circuitry of the circuit card 266 in the breechplate assembly 212 duplicates twenty-four (24) of the existing thirty firing lines provided in the dispenser 210 (an unmodified D-59 dispenser) and the sequencer 218 (unmodified ALE-47 sequencer). Such expansion of the firing lines distributes the firing lines across four legacy fire sources provided in the aircraft 1. As such, circuit card 266 of the breechplate 212 expands the number of firing pins from thirty firing pins to fifty-four firing pins. With this expansion, the FPGA 267 provides the capabilities of using logic switches across each firing line provided in the expanded firing lines.

As such, twenty-four of the thirty firing lines provides a pair of firing pins from the plurality of firing pins 256 such that each firing line in the twenty-four firing lines is electrically connected to first and second firing pins of a pair of firing pins from the plurality of firing pins 256. In the second configuration, which is illustrated in FIG. 10, the sequencer 218 is electrically connected to a first pair of firing pins 256A, 256B in the plurality of firing pins 256 via a first firing line 255A. The first firing line 255A splits off into first and second firing lines $W_1$, $W_2$. The first firing line $W_1$ is electrically connected to the first firing pin 256A, and the second firing line $W_2$ is electrically connected to the second firing pin 256B. In this illustrated embodiment, the FPGA 267 embeds logic switches into first and second firing lines $W_1$, $W_2$. Still referring to FIG. 10, a first logic switch "$S_1$" is electrically connected to the FPGA 267 and is in series with the sequencer 218 and a first firing pin 256A. In addition, a second logic switch "$S_2$" is electrically connected to the FPGA 267 and is in series with the sequencer 218 and a second firing pin 256B. Each of the first and second logic switches "$S_1$", "$S_2$" has an open state and a closed state which are controlled via the FPGA 267 and the sequencer 218 during military operation. In the illustrated embodiment, each of the first and second logic switches "$S_1$", "$S_2$" is in the open state. Such open and closed states between the first and second logic switches "$S_1$", "$S_2$" allows for the individual firing of an expendable rather than a dual firing of two expendables.

During military operation and use of CMDS 200, the sequencer 218 selects the correct firing line from a plurality of firing lines 255 that is associated with the passageway required for polling, communication, and firing an expendable from the plurality of expendables. For the expanded firing lines that include pairs of firing pins, such as firing line 255A with first and second firing pins 256A, 256B in FIG. 10, the sequencer 218 will first communicate with the FPGA 267 via the second data link 219 to select which of the two firing pins prior to polling, communication, or firing. Once selection is completed, the sequencer 218 may send a first pulse to dispense a first expendable 216A of the plurality of expendables 216 from the CMDS 200. The first expendable 216A is electrically connected to the first firing pin 256A via an impulse cartridge provided in the first expendable. Upon detecting an enemy incoming threat via an on-board EW system, the sequencer 218 sends a first pulse over a first firing line 255A, which is electrically connected to the first and second firing wires $W_1$, $W_2$. Upon the sequencer 218 sending the first pulse, the FPGA 267 logically controls the states of the first and second logic switches "$S_1$", "$S_2$" by having the first logic switch "$S_1$" in a closed state and the second logic switch "$S_2$" in an open state. The states of the first and second logic switches "$S_1$", "$S_2$" forces the first pulse through the first logic switch "$S_1$" and towards the first firing pin 256A to fire the first expendable 216. Such states of the first and second logic switches "$S_1$", "$S_2$" is communicated by the sequencer 218 to the FPGA 267, via the second data link 219, for opening and closing logic switches embedded in the circuit card 266.

The sequencer 218 may also send a second pulse to fire a second expendable 216B of the plurality of expendables 216 from the CMDS 200. The second expendable is electrically connected to the second firing pin 256B. Upon detecting an enemy incoming threat via an on-board EW system, the sequencer 218 sends a second signal over the first firing line 255A, which is electrically connected to the first and second firing wire $W_1$, $W_2$. Upon the sequencer 218 sending the second pulse, the FPGA 267 logically controls the states of the first and second logic switches "$S_1$", "$S_2$" by having the first logic switch "$S_1$" in an open state and the second logic switch "$S_2$" in a closed state. The states of the first and second logic switches "$S_1$", "$S_2$" forces the second pulse through the second logic switch "$S_2$" and towards the second firing pin 256B to fire the second expendable 216B. Such states of the first and second logic switches "$S_1$", "$S_2$" is communicated by the sequencer 218 to the FPGA 267, via the second data link 219, for opening and closing logic switches embedded in the circuit card 266.

The inclusion of the FPGA 267 in the breechplate assembly 212 is considered advantageous at least because the FPGA 267 is able to communicate with the sequencer 218 for directing a specific pulse to specific firing pin for firing a specific expandable. On one hand, CMDS 200 may conserve and/or limit the amount of expendables dispensed from CMDS 200 due to the FPGA 267 being electrically connected to each firing pin in the expanded set of firing pins. On the other hand, the CMDS 200 may dispense a substantial amount of expendables based on the military operation. Such electrical connection between each firing pin in the expanded set of firing pins allows for the firing of a single expendable rather than a pair of expendables in the existing set of firing pins that are electrically connected to the FPGA 267.

FIGS. 11-15 illustrate another CMDS 300 that is similar to CMDS 100 illustrated in FIGS. 3A-9, expect as described below. The CMDS 300 includes a dispenser 310, a breechplate assembly 312, a magazine 314, a plurality of expendables 316, and a sequencer 318. The dispenser 310 in the CMDS 300 is substantially similar to the dispenser 110 in the CMDS 100 due to the dispenser 310 being a legacy D-59 dispenser in an ALE-47 CMDS. The magazine 314 in the CMDS 300 is also substantially similar to the magazine 114 in the CMDS 100. The plurality of expendables 316 and the sequencer 318 are substantially similar to the plurality of expendables 116 and the sequencer 118 in the CMDS 100. The breechplate assembly 312, however, is different than the breechplate assembly 112 of CMDS 100.

Figure 11:
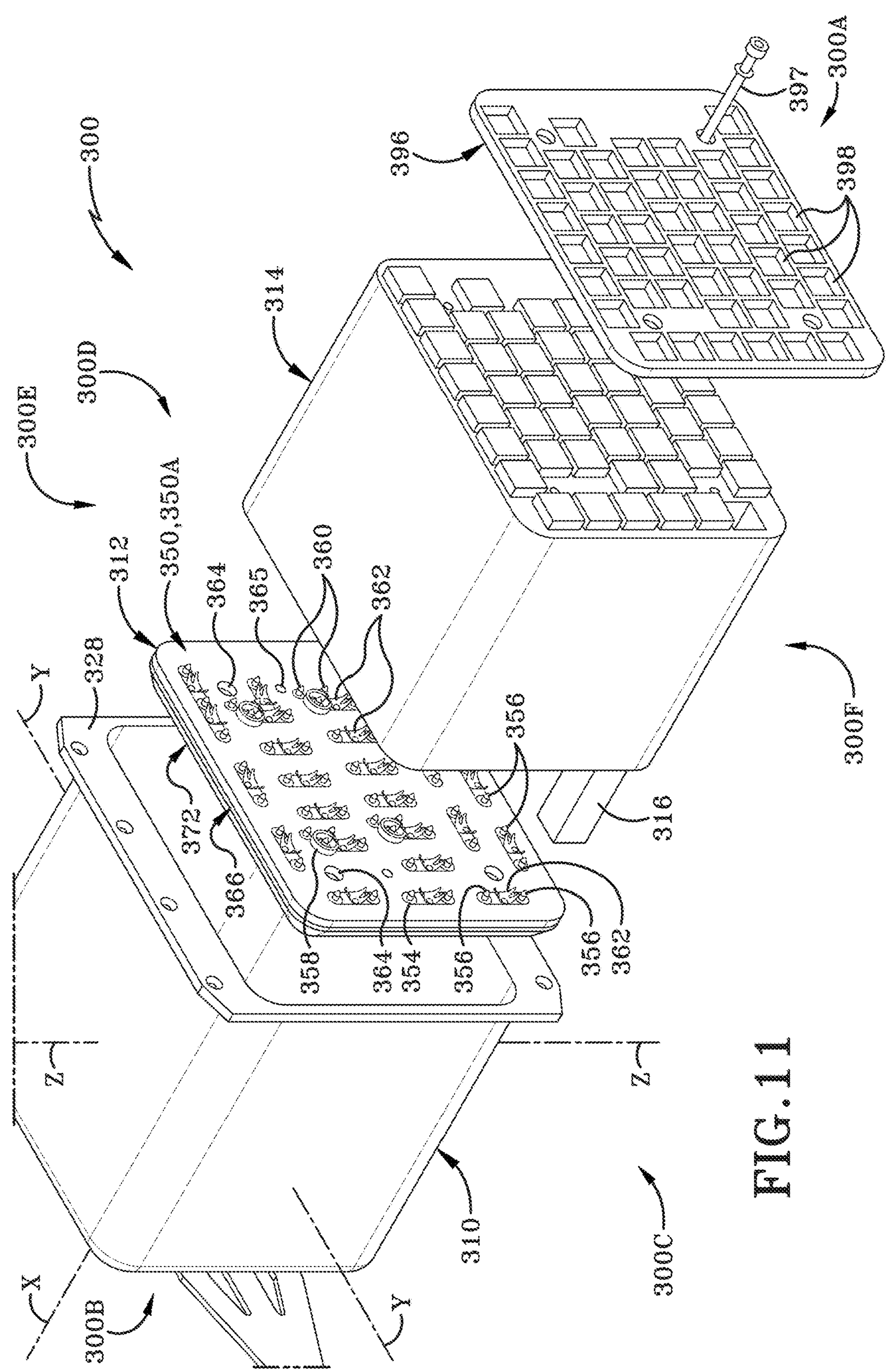
FIG. 11 (FIG. 11) is a top exploded isometric perspective view of another example CMDS.

As illustrated in FIG. 11, the CMDS 300 includes a front end 300A, a rear end 300B that opposes the front end 300A, a first side 300C, a second side 300D that opposes the first side 300C, a top end 300E, and a bottom end 300F that opposes the top end 300E.

As illustrated in FIGS. 11 and 13-15, the breechplate assembly 312 includes a front plate 350 that defines a first plurality of holes 354 that extends entirely through the front plate 350. The first plurality of holes 354 are sized and configured to receive a plurality of firing pins 356 in which the plurality of firing pins 356 are press-fitted inside of the front plate 350 similar to the plurality of firing pins 356 disposed inside of the front plate 150 of the breechplate assembly 112. While a firing pin of the plurality of firing pins 356 is press-fitted into the front wall 350 via a hole of the first plurality of holes 354, a firing pin may operably engage a front plate inside of a hole in any suitable arrangement. Examples of operably engaging a firing pin to a front plate inside of a hole include attaching, affixing, adhering, connecting, fastening, fixing, gluing, joining, linking, mounting, riveting, securing, screwing, welding, and other suitable examples of operably engaging a firing pin to a front plate inside of a hole.

Figure 13:
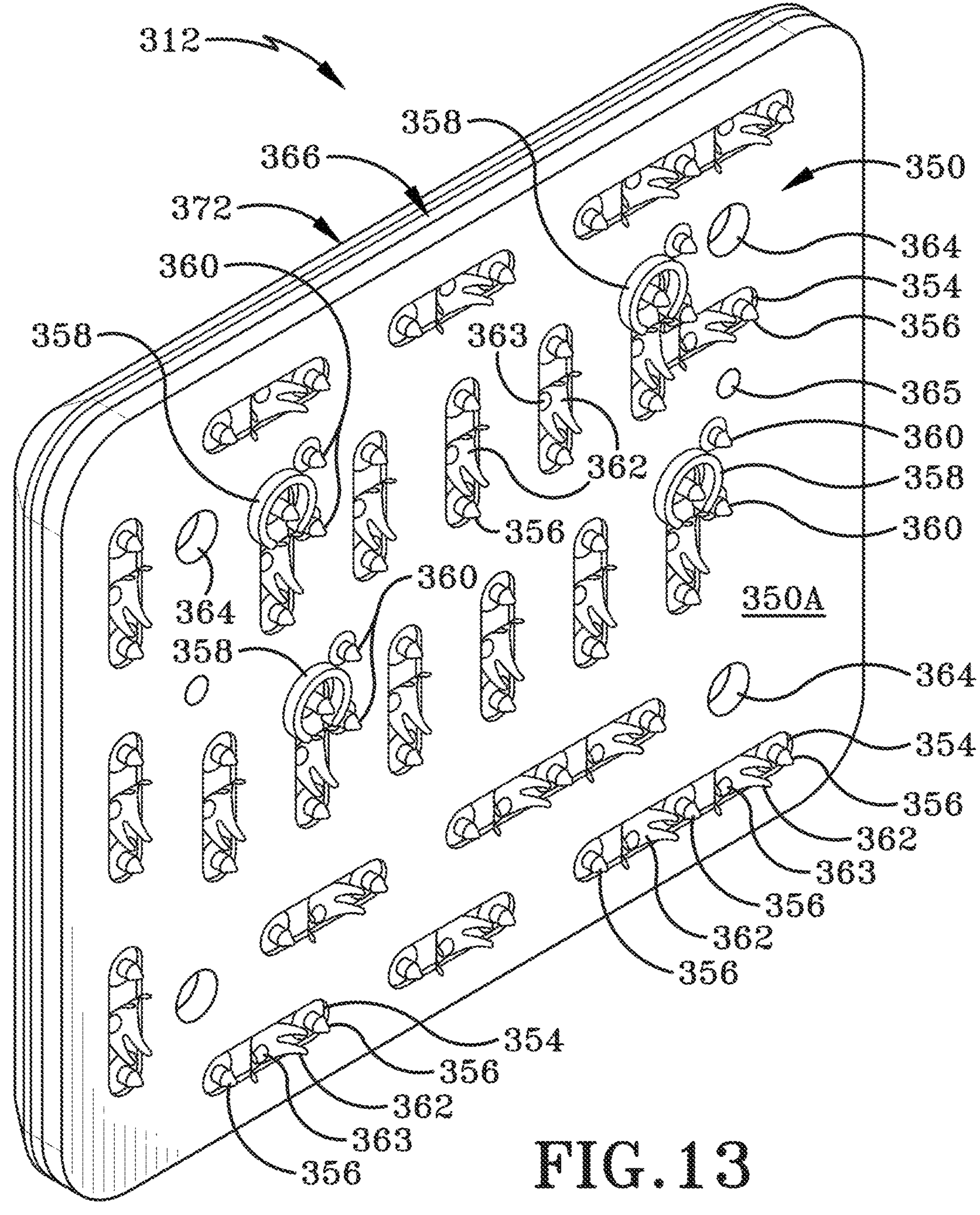
FIG. 13 (FIG. 13) is a top isometric perspective view of the breechplate assembly of the example CMDS illustrated in FIG. 12.
Figure 14:
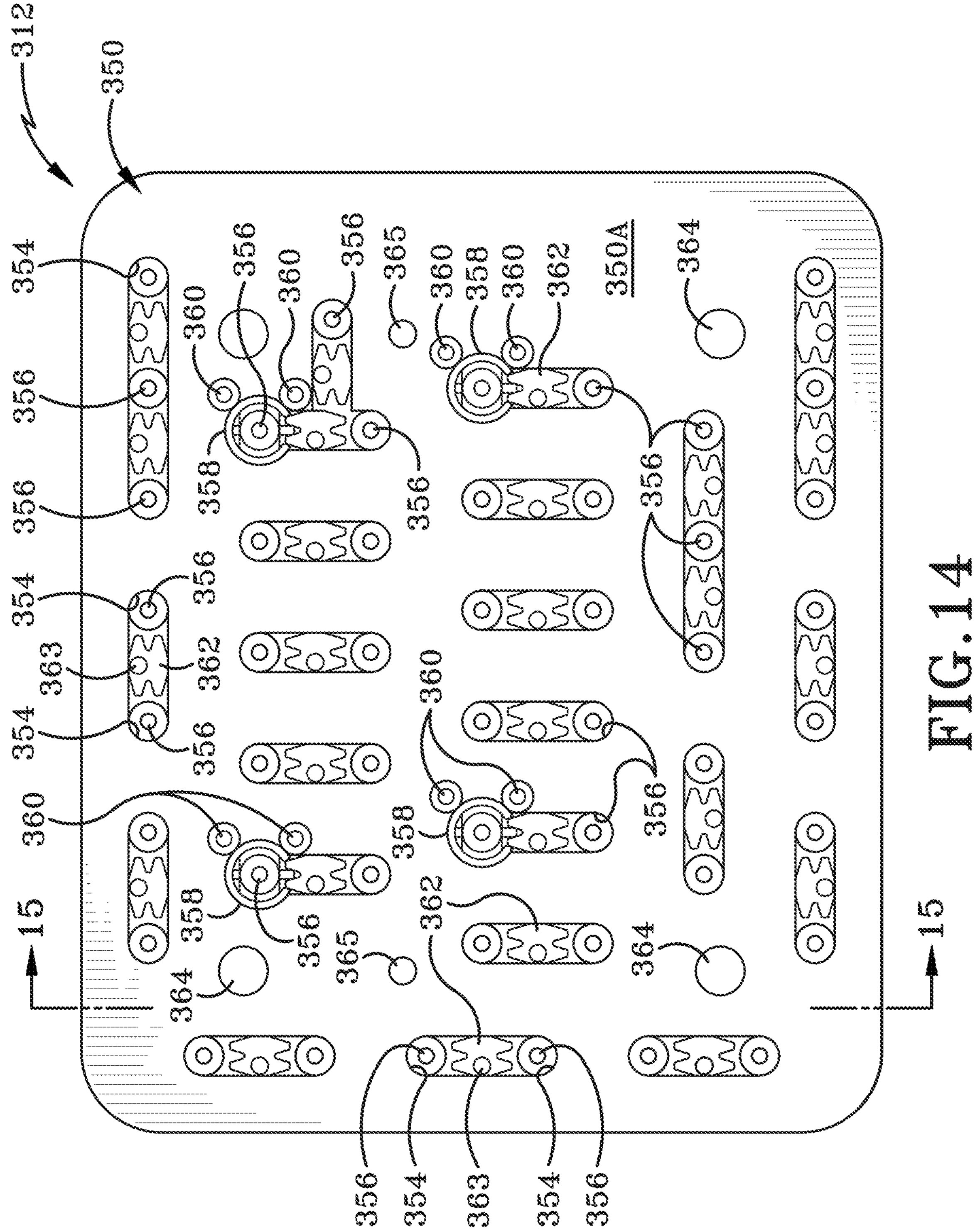
FIG. 14 (FIG. 14) is a front elevation view of the breechplate assembly of the example CMDS illustrated in FIG. 12.
Figure 15:
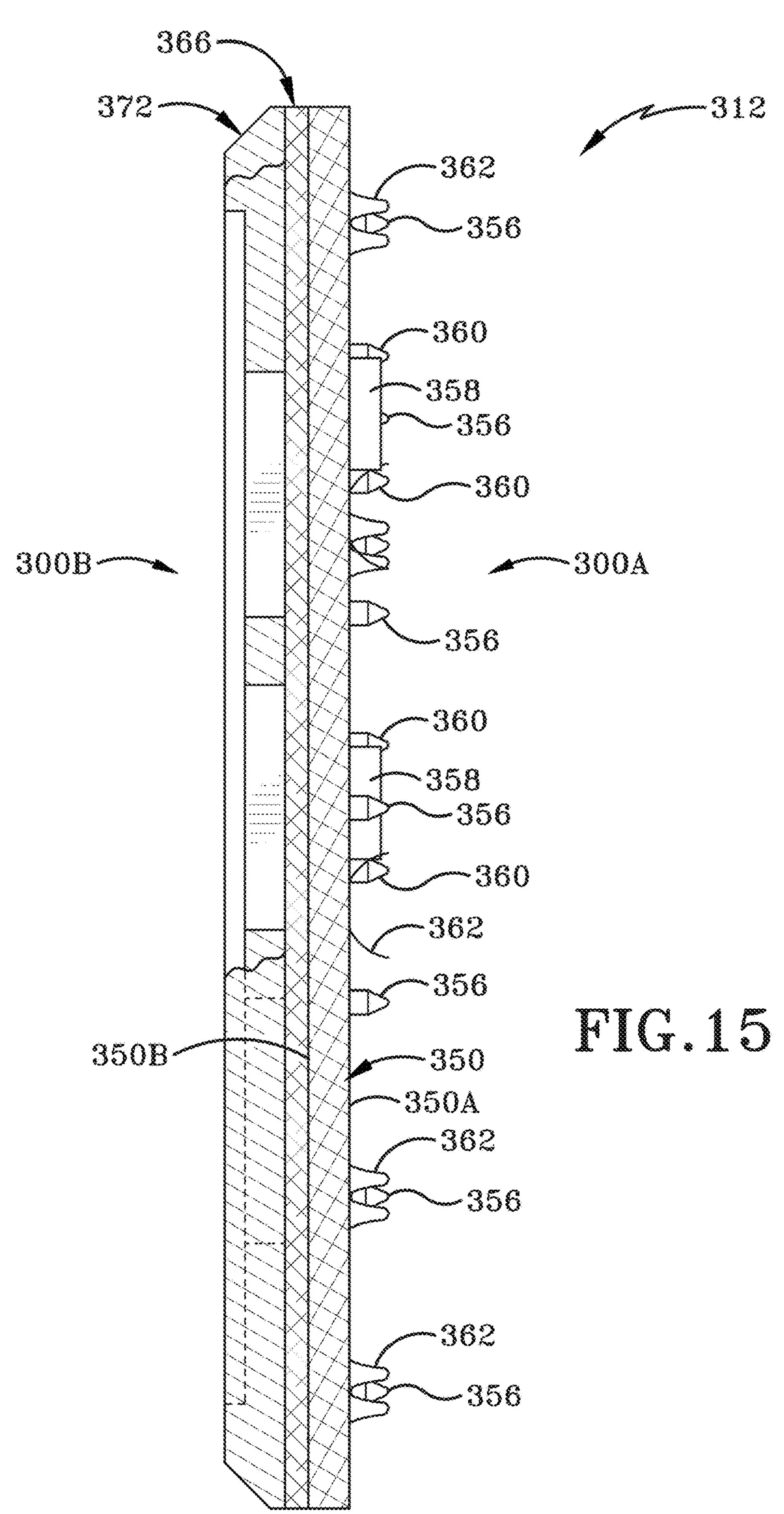
FIG. 15 (FIG. 15) is a right side elevation cross-sectional view of the breechplate assembly of the example CMDS illustrated in FIG. 12 taken along line 15-15 of FIG. 14.

FIGS. 13 through 15 illustrate a set of gaskets 358 are provided on a select number of firing pins in the plurality of firing pins 356. Each gasket of the set of gaskets 358 is provided on the front surface 350A of the front plate 350. In the illustrated embodiment, a total of four firing pins from the plurality of firing pins 356 are provided with gaskets of the set of gaskets 358. Any suitable number of gaskets from a set of gaskets may be provided on a selected number of firing pins in a plurality of firing pins based on various considerations, including the types of expendables being used in the CMDS. Example numbers of gaskets that may be provided on a plurality of firing pins include one, at least one, two, a plurality, three, four, five, six, and any other suitable number of gaskets that may be provided on a select amount of firing pins of a plurality of firing pins. In addition, each gasket in the set of gaskets 358 includes two additional firing pins 360 to provide support to the companion smart stores communications interface (CSSCI) as well as smart stores communications interface (SSCI) on the aircraft 1.

Still referring to FIGS. 13 through 15, the breechplate assembly 312 includes a plurality of ground springs 362 that operably engages the front plate 350. Each ground spring of the plurality of ground springs 362 is disposed on the front surface 350A. Each ground spring of the plurality of ground springs 362 is also biased towards the front end 300A of the CMDS 300 in which each ground spring of the plurality of ground springs 362 is arched-shaped. In the illustrated embodiment, each ground spring in the plurality of ground springs 362 is disposed between two firing pins of the plurality of firing pins 356. As such, the plurality of ground springs 362 is half of the amount of plurality of firing pins that is provided in the breechplate assembly 312. Each ground spring of the plurality of ground springs 362 provides a ground connection when a ground spring of the plurality of grounds springs 362 contacts an impulse cartridge of an expendable of the plurality of expendables 316. Furthermore, each ground spring of the plurality of grounds spring 362 includes a notch at each terminal end. The notch at each terminal end of a ground spring of the plurality of ground springs 362 allows a firing pin of the plurality of firing pins 356 to pass through the notch and prevent any contact between the ground spring and the firing pin once a ground spring and a firing pin collectively contact an impulse cartridge of an expendable from the plurality of expendables 316.

In addition, each ground spring of the plurality of ground springs 362 is fastened to the front plate 350 via a fastener of a plurality of fasteners 363. While each ground spring of the plurality of ground springs 362 is fastened to the front plate via a fastener of a plurality of fasteners 363, a ground spring may operably engage a front plate in any suitable arrangement. Examples of operably engaging a ground spring to a front plate include attaching, affixing, adhering, connecting, fixing, gluing, joining, linking, mounting, riveting, securing, screwing, welding, and other suitable examples of operably engaging a ground spring to a front plate.

The breechplate assembly 312 also includes a first set of through holes 364 and a second set of through holes 365 (seen in FIGS. 13 and 14). Each hole of the first set of through holes 364 and each hole of the second set of through holes 365 extends entirely through each component in the breechplate assembly 312. The first set of through holes 364 is sized and configured to receive a set of standoffs (not illustrated) of the dispenser 310 for securing the breechplate assembly 312 and magazine 314 to the dispenser 310 via fasteners. The second set of through holes 365 is sized and configured to receive a pair of pins (not illustrated) of the dispenser 310 for mounting the breechplate assembly 312 to the dispenser 310.

Referring to FIG. 15, the breechplate assembly 312 includes a circuit card 366. The circuit card 366 is similar to the circuit card 166 in the CMDS 100. As such, the circuit card 366 electrically connects to each firing pin of the plurality of firing pins 356 substantially similar to how the circuit card 166 electrically connects to each firing pin of the plurality of firing pins 158 in CMDS 100. However, a clearance between the plurality of firing pins 356 and the circuit card 366 is omitted from this embodiment due to the front plate 350 directly abutting the circuit card 366. To prevent shock and damage issues between the front plate 350 and the circuit card 366, the front plate 350 is made a robust material. Such robust material of the front plate 350 prevents shock and damages issues when pyrotechnic reaction forces occur during the firing and/or denotation of an expendable in the plurality of expendables 316. In addition, the robust material of the front plate 350 may improve durability and prevent issues of a magazine cracking, such as magazine 314, during handling. In the illustrated embodiment, the front plate 350 is made of a composite material for preventing shock and damage issues to the electrical circuity provided in the breechplate assembly 312. In one exemplary embodiment, a breechplate assembly may be formed from a metal material, more particularly aluminum or titanium. In another exemplary embodiment, a breechplate assembly may be formed from a composite material, more particularly a fiber-reinforced plastic material using glass fiber. In yet another exemplary embodiment, a breechplate assembly may be formed from a polymer material, more particularly carbon fiber material. In yet another exemplary embodiment, a breechplate assembly may be formed from a combination of materials described and illustrated herein and other suitable and/or similar materials described and illustrated herein.

Referring to FIGS. 13 and 15, the breechplate assembly 312 also includes a rear plate 372 that is similar to the rear plate 172 of the breechplate assembly 112. The rear plate 372 is secured the front plate 350 in which the circuit card 366 is disposed between the front plate 350 and the rear plate 372 to form the breechplate assembly 312. While the rear plate 372 is secured to the front plate 350, a rear plate may operably engage to a front plate in any suitable arrangement. Examples of operably engaging a rear plate to a front plate include attaching, affixing, adhering, connecting, fastening, fixing, gluing, joining, linking, mounting, riveting, securing, screwing, welding, and other suitable examples of operably engaging a rear plate to a front plate.

In addition, the circuitry system of the circuit card 366 may use any circuity system that is described and illustrated herein. The circuity systems that may be used in the circuit card 366 includes the circuit system used in the circuit card 166 of CMDS 100, the circuitry system used in the circuit card 266 of CMDS 200, and other suitable circuity systems in a circuit card that are described and illustrated herein.

Figure 12:
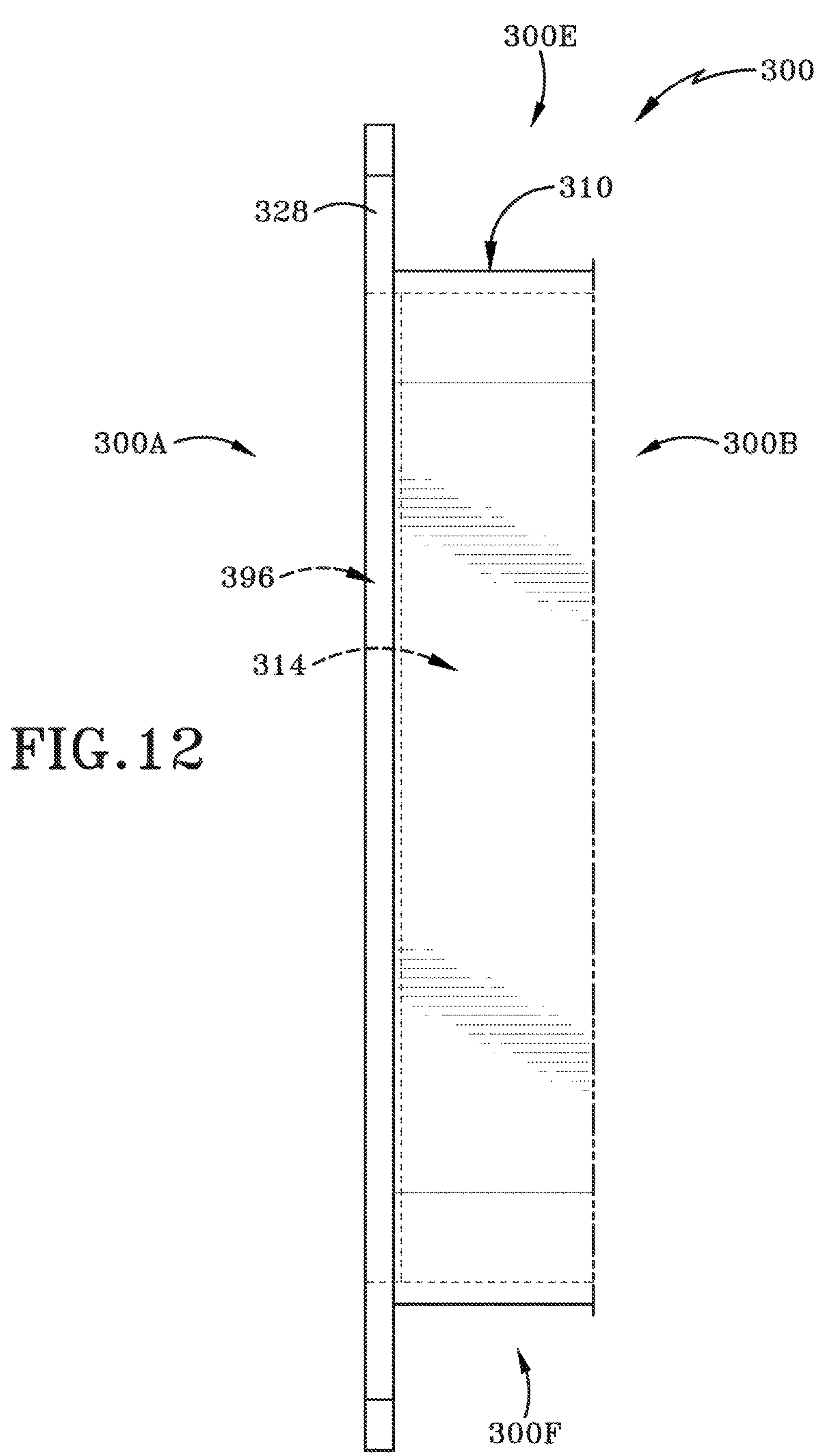
FIG. 12 (FIG. 12) is a right side elevation view of the example CMDS illustrated in FIG. 11 where the magazine is even with the dispenser in the example CMDS.

As illustrated in FIG. 12, a muzzle plate 396 operably engages the front end of the magazine 314 proximate to the front end 300A of CMDS 300. Here, the muzzle plate 396 is attached to the magazine 314 via fasteners 397. The muzzle plate 396 is even with a flange 328 of the dispenser 310 and even with the side wall 5 of the aircraft 1 due to the overall width of the breechplate assembly 312. While the muzzle plate 396 is secured to the magazine 314, a muzzle plate may operably engage to a magazine in any suitable arrangement. Examples of operably engaging a muzzle plate to a magazine include attaching, affixing, adhering, connecting, fastening, fixing, gluing, joining, linking, mounting, riveting, screwing, welding, and other suitable examples of operably engaging a muzzle plate to a magazine.

Figure 16A:
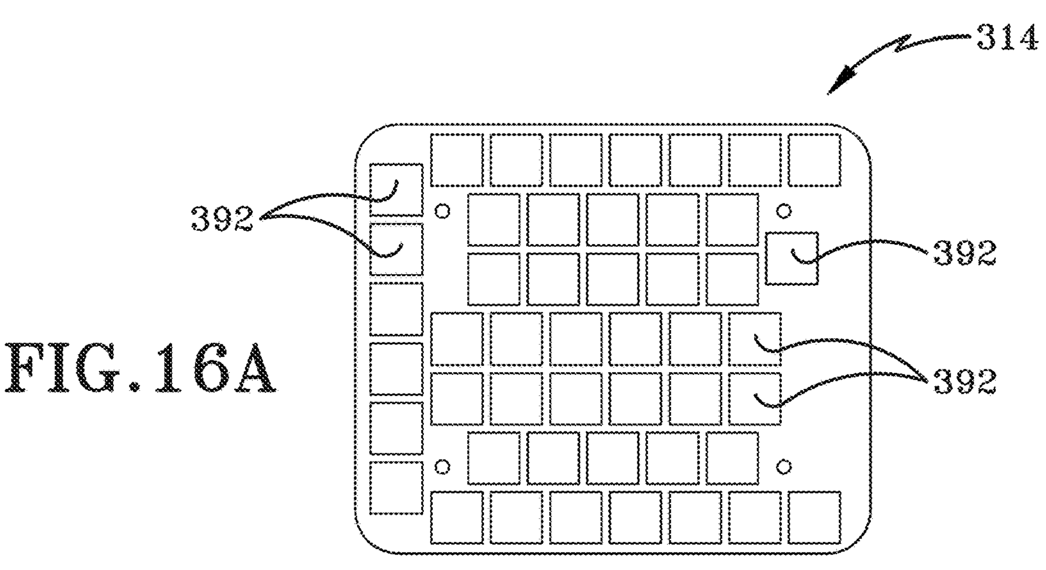
FIG. 16A (FIG. 16A) is a front elevation view of the magazine of the example CMDS illustrated in FIG. 12 where the magazine may be loaded with one type of expendable.
Figure 16B:
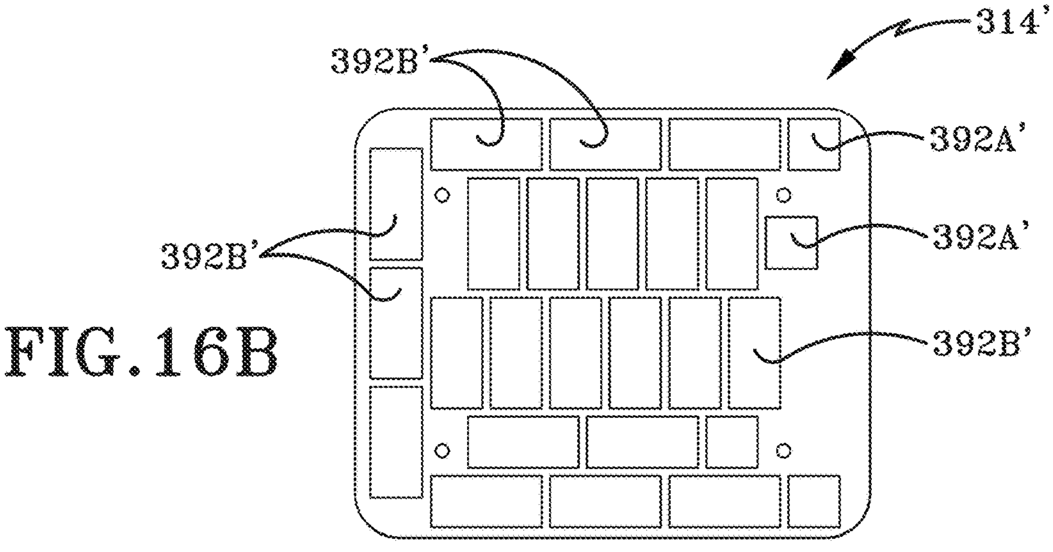
FIG. 16B (FIG. 16B) is a front elevation view of an alternative magazine of the magazine illustrated in FIG. 16A where the alternative magazine can be loaded with two different types of expendables.
Figure 16C:
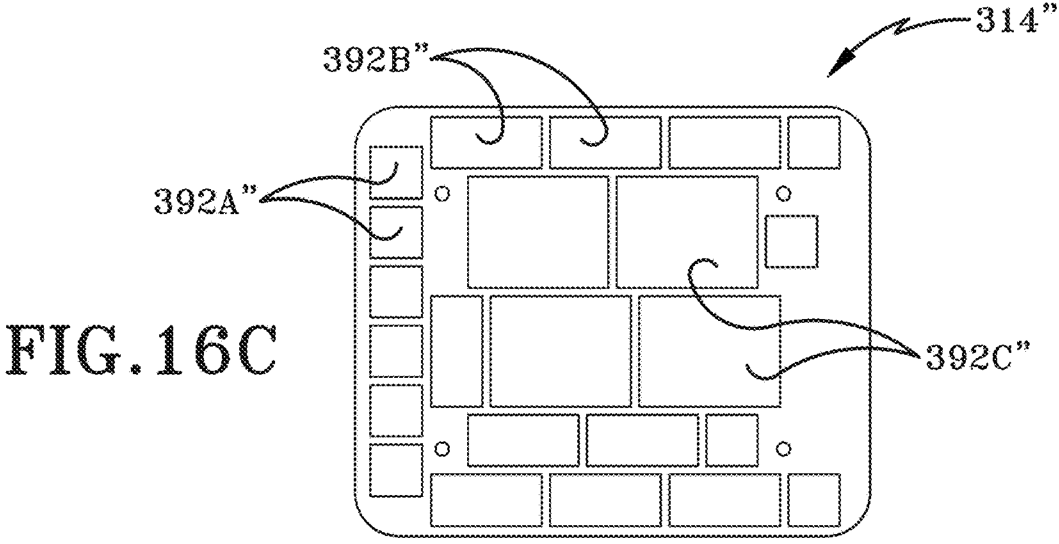
FIG. 16C (FIG. 16C) is a front elevation view of an alternative magazine of the magazine illustrated in FIG. 16A where the alternative magazine can be loaded with three different types of expendables according to one embodiment.

Referring to FIG. 16A, the magazine 314 defines a plurality of passageways 392. In this configuration, the magazine 314 may hold one type of expendable from the plurality of expendables as defined by the plurality of passageways 392. In the illustrated embodiment, the magazine 314 may hold an expendable with the dimensions of 1×1×8.1 inches as defined by the plurality of passageways 392. In other exemplary embodiments as illustrated in FIGS. 16B and 16C, a magazine may hold more than one type of expendable where the magazine is sized and configured to be disposed inside of the dispenser 310 and is complementary to the breechplate 312. As illustrated in FIG. 16B, an alternative magazine 314' may define a first plurality of passageways 392A' and a second plurality passageways 392B' where the first plurality of passageways 392A' holds a first plurality of expendables and the second plurality of passageways 392B' holds a second plurality of expendables where the first and second pluralities of expendables may be of different dimensions. As such, each expendable housed inside of each passageway in the first plurality of passageways 392A' may have the dimensions of 1×1×8.1 inches, and each expendable housed inside of each passageway in the second plurality of passageways 392B' may have the dimensions of 1×2×8.1 inches. As illustrated in FIG. 16C, another alternative magazine 314" may define a first plurality of passageways 392A", a second plurality of passageways 392B", and a third plurality of passageways 392C" where the first, second, and third pluralities of passageways 392A", 392B", 392C" may be of different dimensions. As such, each expendable housed inside of each passageway of the first plurality of passageways 392A" may have the dimensions of 1×1×8.1 inches, each expendable housed inside of each passageway of the second plurality of passageways 392B" may have the dimensions of 1×2×8.1 inches, and each expendable housed inside of each passageway of the third plurality of passageways 392C" may have the dimensions of 2×2.5×8.1 inches.

Figure 17:
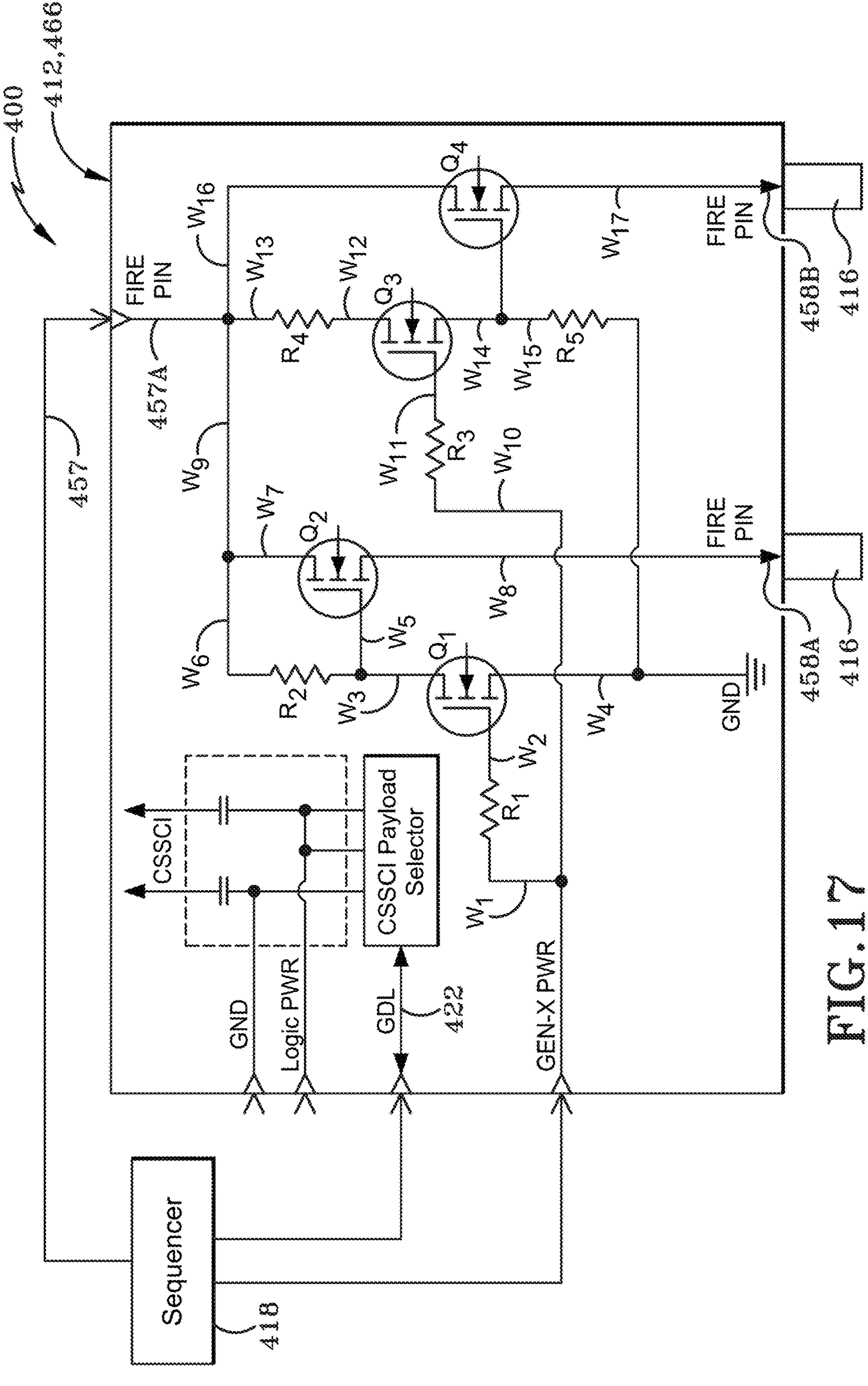
FIG. 17 (FIG. 17) is an electrical circuit diagram of the circuit card of the breechplate assembly in another example CMDS.

FIG. 17 illustrates another CMDS 400 that is similar to the CMDS 300 illustrated in FIGS. 11-15, except as detailed below. The CMDS 400 includes a dispenser (not illustrated), a breechplate assembly 412, a magazine (not illustrated), a plurality of expendables 416, and sequencer 418. In the illustrated embodiment, the circuitry of a circuit card 466 in the breechplate assembly 412 is different than the circuitry of the circuit card 366 in the breechplate assembly 312.

The circuit card 466 of the breechplate assembly 412 includes a plurality of firing lines 457. Similar to the circuit cards 166, 266, and 366 of CMDSs 100, 200, 300, the circuit card 466 duplicates the legacy firing pins in a legacy D-59 dispenser from thirty (30) firing pins to at least forty-eight (48) firing pins (i.e., eighteen (18) of the existing thirty (30) firing lines have a pair of firing pins). FIG. 17 provides an example of a first firing line 457A being electrically connected to first and second firing pins 458A, 458B.

As illustrated in FIG. 17, the circuit card 466 of the breechplate assembly 412 is electrically connected to the sequencer 418 for providing power and communication to the breechplate assembly 412. In the illustrated embodiment, the second data link 422 electrically connects the sequencer 418 to the breechplate assembly 412. In addition, the first firing line 457A is also electrically connected to the sequencer 418. Once the sequencer 418 is electrically connected to the breechplate assembly 412, the sequencer 418 is electrically connected to a first resistor $R_1$ such that the sequencer 418 is in series with a first resistor $R_1$ via a first wire $W_1$. The first resistor $R_2$ is also electrically connected to the gate terminal of a first field effect transistor (FET) $Q_1$ such that the first resistor $R_2$ is also in series with a first FET $Q_1$ via a second wire $W_2$. The drain terminal of the first FET $Q_1$ is electrically connected to a second resistor $R_2$ such that the first FET $Q_1$ is in series with the second resistor $R_2$ via a third wire $W_3$. The source terminal of the first FET $Q_1$ is electrically connected to the ground terminal "GND" via a fourth wire $W_4$. The drain terminal of the first FET $Q_1$ is also electrically connected to the gate terminal of a second FET $Q_2$ via $W_5$. In addition, the second resistor $R_2$ is electrically connected to the gate and drain terminals of the second FET $Q_2$ such that the second resistor $R_2$ is in parallel with the second FET $Q_2$ via the third wire $W_3$, the fifth wire $W_5$, a sixth wire $W_6$, and a seventh wire $W_7$. The source terminal of the second FET $Q_2$ is electrically connected to the first firing pin 458A such the second FET $Q_2$ is in series with the first firing pin 458A via an eighth wire $W_8$. In addition, the first firing line 457A is electrically connected to the second resistor $R_2$ and the drain terminal of the second FET $Q_2$ via a ninth wire $W_9$.

Moreover, the sequencer 418 is also electrically connected to a third resistor $R_3$ such that the sequencer 418 is in series with the third resistor $R_3$ via a tenth wire $W_{10}$. The third resistor $R_3$ is electrically connected to the gate terminal of a third FET $Q_3$ such that the third resistor $R_3$ is in series with the third FET $Q_3$ via an eleventh wire $W_{11}$. The drain terminal of the third FET $Q_3$ is electrically connected to the fourth resistor $R_4$ such that the third FET $Q_3$ is in series with the fourth resistor $R_4$ via a twelfth wire $W_{12}$. The fourth resistor $R_4$ is electrically connected to the output of the first firing line 457A such that the fourth resistor $R_4$ is in series with the first firing line 457A via a thirteenth wire $W_{13}$. The source terminal of the third FET $Q_3$ is electrically connected to a gate terminal of a fourth FET $Q_4$ such that the third FET $Q_3$ is in series with the fourth FET $Q_4$ via a fourteenth wire $W_{14}$. The fifth resistor $R_5$ is electrically connected to the ground terminal "GND" via a fifteenth wire $W_{15}$. The first firing line 457A is also electrically connected to the drain terminal of the fourth FET $Q_4$ such that the first firing line 457A is in series with the fourth FET $Q_4$ via a sixteenth wire $W_{16}$. The source terminal of the fourth FET $Q_4$ is electrically connected to the second firing pin 458B such that the fourth FET $Q_4$ is in series with the second firing pin 458B via a seventeenth wire $W_{17}$.

In the illustrated embodiment, the sequencer 418 is electrically connected to each and every firing pin of the plurality of firing pins 458 in two electrical configurations. In the first electrical configuration (not illustrated), the sequencer 418 is electrically connected to twelve of the thirty firing lines where the sequencer 418 may operably control a single firing pin in the plurality of firing pins 458. In this electrical configuration, each firing pin receives an electrical pulse sent by the sequencer 418 to dispense an expendable from a plurality of expendables 416. In addition, eighteen of the thirty firing lines provides a pair of firing pins from the plurality of firing pins 458 such that each firing line in the eighteen firing lines is electrically connected to first and second firing pins of a pair of firing pins from the plurality of firing pins 458. In the second configuration, which is illustrated in FIG. 17, the sequencer 418 is electrically connected to a first pair of firing pins 458A, 458B in the plurality of firing pins 458 via a first firing wire 457A. The first firing pin 458A of the pair of firing pins is embedded in a first bank of firing pins in the breechplate assembly 412, and the second firing pin 458B of the pair of firing pins is embedded in second bank of firing pins in the breechplate assembly 412.

In the illustrated embodiment, the sequencer 418 is able to switch from the first bank of firing pins in the breechplate assembly 412 to the second bank of firing pins in the breechplate assembly 412 based on initiating the second data link 422. In one exemplary embodiment, the sequencer 418 may disable power via the second data link 422 and poll the first bank of firing pins (i.e., poll the first firing pin 458A). Once polling is complete, the sequencer 418 may send pulses to the first bank of firing pins until the expendables that are electrically connected to the first bank of firing pins have been dispensed from CMDS 400. In another exemplary embodiment, the sequencer 418 may enable power via the second data link 422 and poll the second bank of firing pins (i.e., poll the second firing pin 458B). Once polling is complete, the sequencer 418 may send pulses to the second bank of firing pins until the expendable that are electrically connected to the second bank of firing pins have been dispensed from CMDS 400. Furthermore, the breechplate assembly 412 and the dispenser 410 are electrically connected to an additional logic power source and return. These electrical connections provide an "always on" power to the legacy firing lines so that power is available when the second data link 422 is turned to the OFF state. The states of the second data link 422 is described in more detail below. Additionally, a feedback mechanism (not illustrated) would be electrically connected to the sequencer 418 to ensure the selection of the requested firing pin between the first bank of firing pins and the second bank of firing pins.

During military operation of the aircraft 1, CMDS 400 is initiated once an enemy incoming threat is detected by the on-board EW system. In the illustrated embodiment, the sequencer 418 may disable power to the breechplate assembly 412 over the second data link 422 for polling the first bank of firing pins with their associated electrical components before dispensing the expendables electrically connected to the first bank of firing lines. In the illustrated embodiment, the sequencer 418 would poll the first bank of firing lines, which includes the first firing pin 458A, through the first firing line 457A. The polling performed by the sequencer 418 checks for readiness and/or the state of each firing pin the first set of firing pins, including the first firing pin 458A. Once polling is complete and the first bank of firing pins is ready and/or in the correct state, the sequencer 418 may send a first pulse to a dispense the expendables electrically connected to the first bank of firing pins, which includes the first firing pins 458A.

If the first bank of firing pins dispenses each and every expendable electrically connected to the first bank of firing pins, the sequencer may switch from the first bank of firing pins to the second bank of firing pins, which includes the second firing pin 458B in FIG. 11. In the illustrated embodiment, the sequencer 418 may enable power to the breechplate assembly 412 over the second data link 422 for polling the second bank of firing pins with their associated electrical components before dispensing the expendables electrically connected to the second bank of firing lines. In the illustrated embodiment, the sequencer 418 would poll the second bank of firing lines, which includes the second firing pin 458B, through the first firing line 457A. The polling performed by the sequencer 418 checks for readiness and/or the state of each firing pin the second set of firing pins, including the second firing pin 458B. Once polling is complete and the second bank of firing pins is ready and/or in the correct state, the sequencer 418 may send a second pulse to a dispense the expendables electrically connected to the second bank of firing pins, which includes the second firing pins 458B.

While FIG. 17 illustrates a single firing line (first firing line 457A) electrically connected to a pair of firing pins (first and second firing pins 458A, 458B), such electrical circuitry illustrated and described herein is repeated for the remaining firing lines and firing pins in the circuit card 466.

Figure 18:
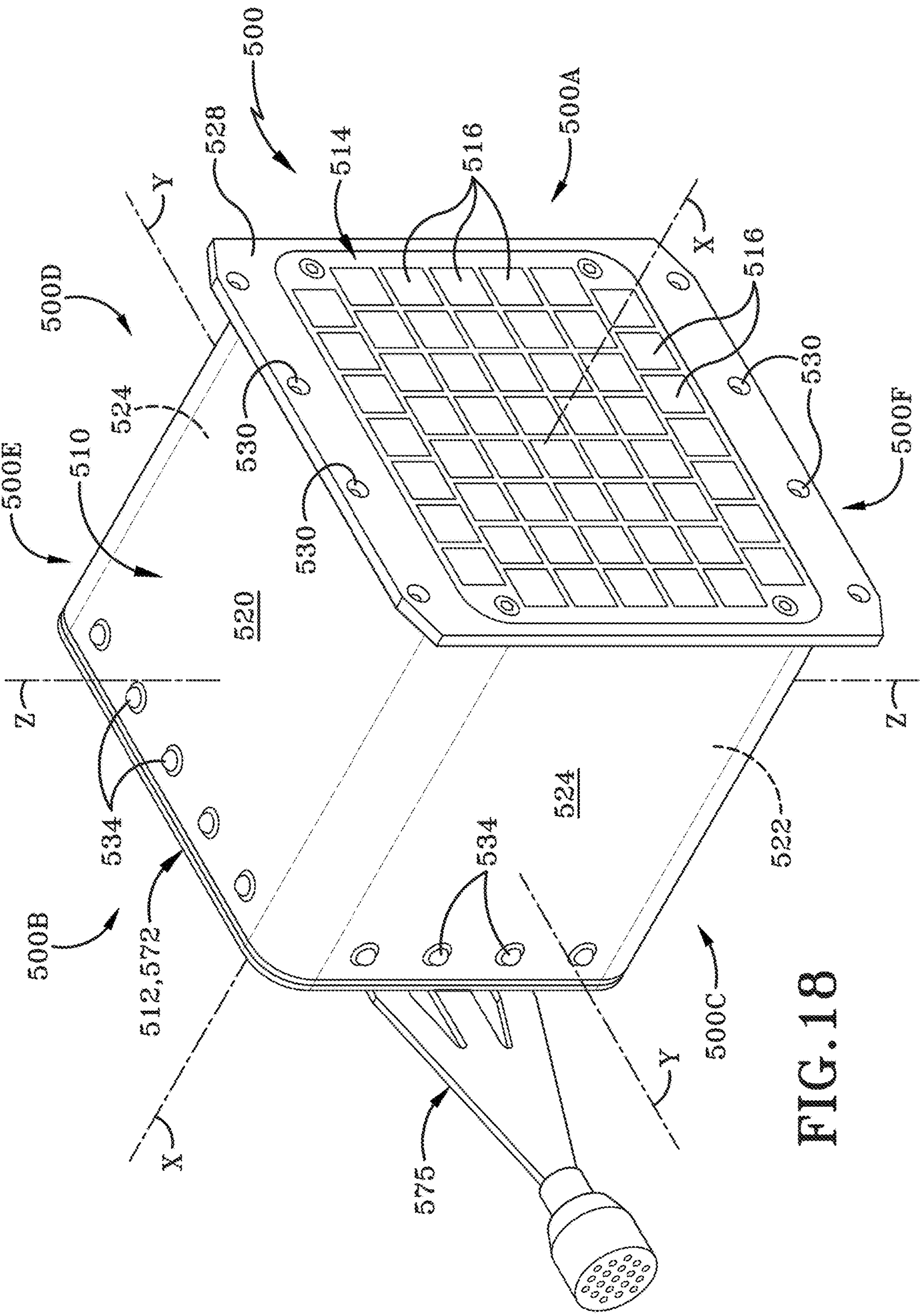
FIG. 18 (FIG. 18) is a top isometric perspective view of another example CMDS.
Figure 19:
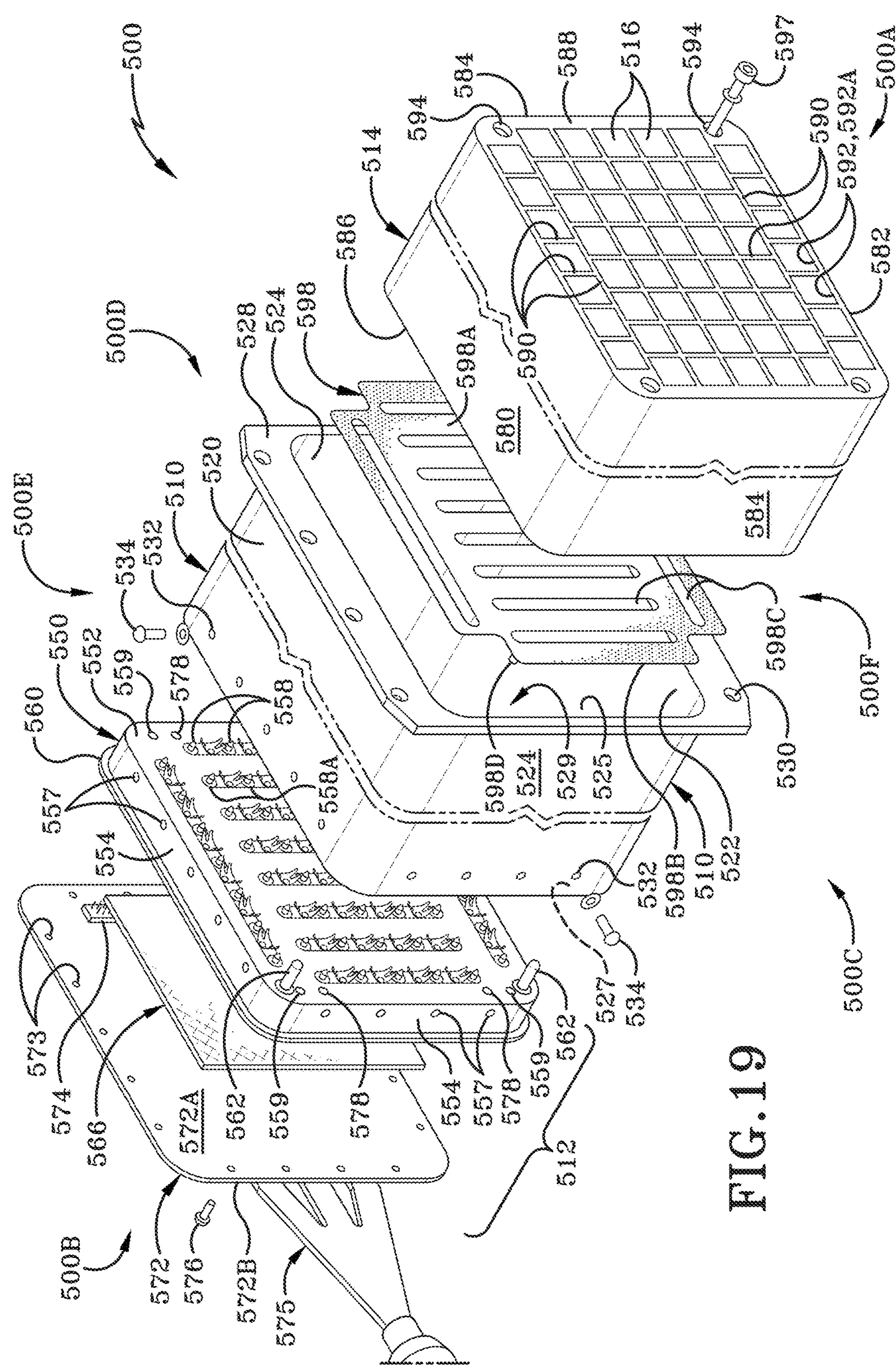
FIG. 19 (FIG. 19) is a top exploded isometric perspective view of the example CMDS illustrated in FIG. 18.
Figure 20:
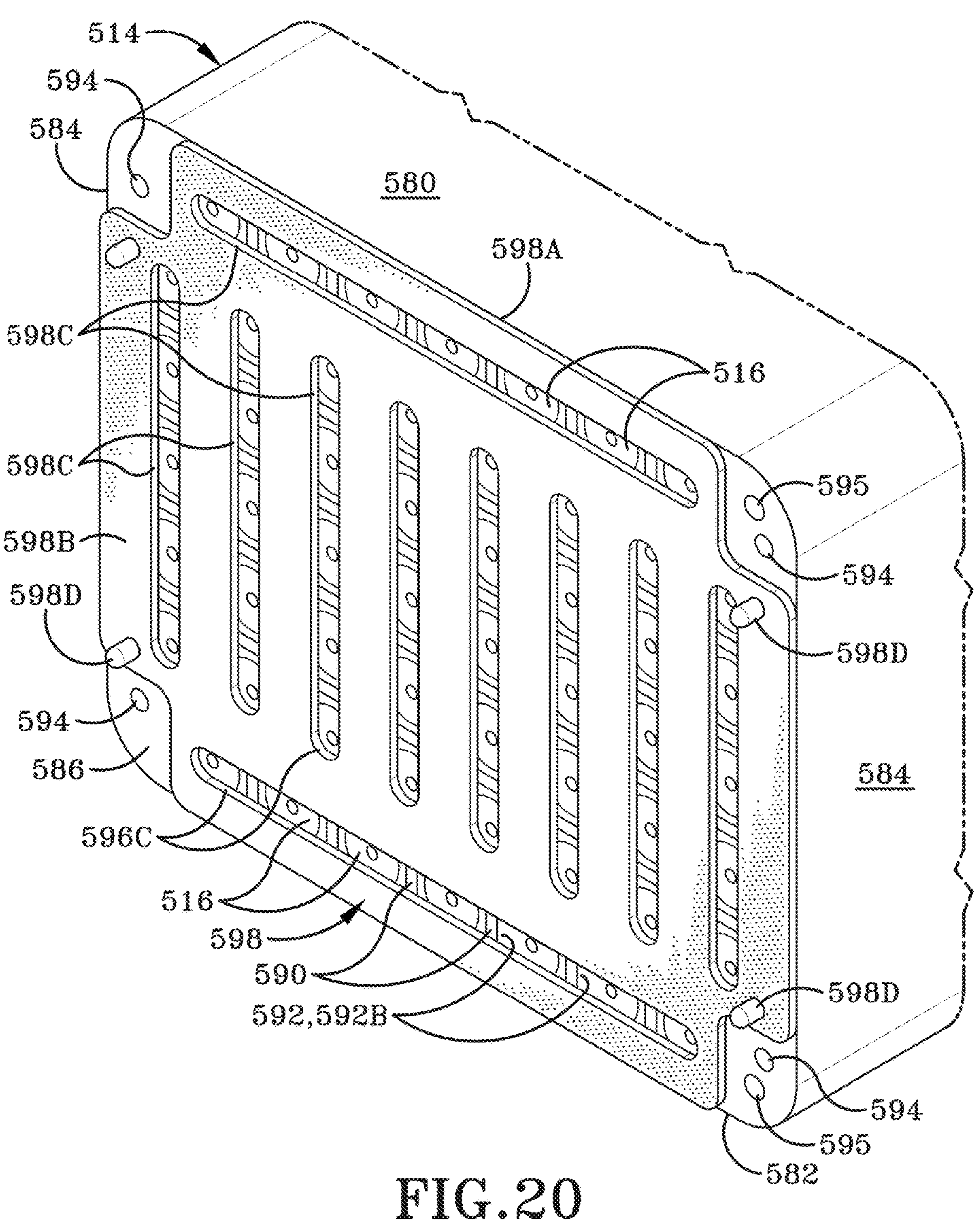
FIG. 20 (FIG. 20) is a rear partial isometric perspective view of the magazine of the example CMDS illustrated in FIG. 18 where the plurality of expendables is loaded into the plurality of passageways provided in the magazine and where the retaining plate is covering the plurality of expendables once loaded in the magazine.

FIGS. 18-20 illustrates another CMDS 500 that is similar to the CMDS 100 illustrated in FIGS. 3A-9, except as detailed below. The CMDS 500 includes a dispenser 510, a breechplate assembly 512, a magazine 514, a plurality of expendables 516, and a sequencer (not illustrated). In the illustrated embodiment, the plurality of expendables 516 and the sequencer are legacy CMDS components. As illustrated in FIG. 18, the CMDS 500 includes a front end 500A, a rear end 500B that opposes the front end 500A, a first side 500C, a second side 500D that opposes the first side 500C, a top end 500E, and a bottom end 500F that opposes the top end 500E. The CMDS 500 also defines a longitudinal axis "X" that extends from the front end 500A to the rear end 500B, a transverse axis "Y" that extends from the first side 500C to the right side 500D, and a vertical axis "Z" that extends from the top end 500E to the bottom end 500F.

As illustrated in FIG. 19, the dispenser 510 includes a top wall 520 that is disposed near the top end 500E of the CMDS 500, a bottom wall 522 that opposes the top wall 520 and is disposed near the bottom end 500F of the CMDS 500, a pair of side walls 524 disposed parallel to one another and disposed between the top and bottom walls 520, 522. The top wall 520, the bottom wall 522, and the pair of side walls 524 collectively define a front opening 525 that is disposed at the front end 500A of CMDS 500. The top wall 520, the bottom wall 522, and the pair of side walls 524 also collectively define a rear opening 527 that is disposed at the rear end 500B of the CMDS 500 opposite to the front opening 525. The top wall 520, the rear wall 522, and the pair of side walls 524 also collectively define a central passageway 529 that extends along the longitudinal axis "X" from the front opening 525 to the rear opening 527. The central passageway 529 is sized and configured to receive and house the breechplate assembly 512 and the magazine 514 upon assembly of the CMDS 500.

The dispenser 510 also includes a flange 528 that is disposed on each of the top wall 520, the bottom wall 522, and the pair of side walls 524 at the front end 500A of the CMDS 500. The flange 528 defines a first plurality of apertures 530 that extends entirely through the flange 528 along an axis that is parallel to the longitudinal axis "X" of the CMDS 500. The flange 528 of the dispenser 510 provides the capability of securing the CMDS 500 to the aircraft 1 via a plurality of fasteners (not illustrated) passing through the plurality of apertures 530 and into the aircraft 1. The aircraft 1 may have a recessed portion disposed around the perimeter of the opening 4 such that flange 528 is even with the mold line of the sidewall 3 of the aircraft 1.

The dispenser 510 also defines a second plurality of apertures 532. The second plurality of apertures 532 is disposed on each of the top wall 520, the bottom wall 522, and the pair of side walls 524 at the rear end 500B of the CMDS 500. Each aperture of the plurality of apertures 532 extends entire through the top wall 520, bottom wall 522, and the pair of side walls 524 to provide communication between the central passageway 529 and the exterior environment of the dispenser 510 at each aperture of the plurality of apertures 532. In the illustrated embodiment, the second plurality of apertures 532 allows for the fastening of the breechplate assembly 512 to the dispenser 510, which is described in more detail below.

The breechplate assembly 512 is similar to the breechplate assembly 112 of the CMDS 100 illustrated in FIGS. 3A-9. As illustrated in FIG. 19, the breechplate assembly 512 includes a front plate 550. The front plate 550 is similar to the front plate 150 of the breechplate assembly 112, except as detailed below. The front plate 550 has a base wall 552. The front plate 550 also includes a lateral wall 554 that is disposed about the perimeter of the base wall 552. The lateral wall 554 extends laterally away from the base wall 552 towards the rear end 522B of the breechplate assembly 512. The front plate 550 also includes an upper wall (not illustrated) that is disposed about the perimeter of the lateral wall 544 and extends laterally away from the lateral wall 544 along the vertical axis "Z". The upper wall of the front plate 550 is disposed opposite to the base wall 552. The base wall 552, the lateral wall 554, and the upper wall collectively define a central opening (not illustrated) that provides access to a central space (not illustrated). In this illustrated embodiment, however, the lateral wall 554 defines a first plurality of openings 557 that extends entirely through the lateral wall 554 from exterior environment of the lateral wall 554 to the central space. The first plurality of openings 557 is coaxial with the second plurality of apertures 532 on the dispenser 510 when the breechplate assembly 512 is secured to the dispenser 510 via a first set of fasteners 534. Furthermore, the upper wall defines a second plurality of openings (not illustrated) that extends entirely through the upper wall from the exterior environment of the upper wall to the central space.

The breechplate 512 includes a plurality of firing pins 558 substantially similar to the plurality of firing pins 158 of the breechplate 112 in CMDS 100. The plurality of firing pins 558 are embedded in the front plate 550 of the breechplate via a plurality of holes 558A.

Referring to FIG. 19, the front plate 550 also includes a lip 560 that extends from the lateral wall 554 and away from the central opening and the central space along the vertical axis "Z" of the CMDS 500. The lip 560 is parallel to the base wall 552 and is orthogonal to the lateral wall 554. During assembly of the breechplate assembly 512 into the dispenser 510, the lip 560 contacts the rear end of the dispenser 510 along the top wall 520, the bottom wall 522, and the pair of side walls 524. The lip 560 provides a limit on how far the breechplate assembly 512 is able to be housed inside of the central passageway 529.

The front plate 550 also includes a set of extensions 562. The set of extensions 562 extends laterally from the front surface 560A of the front plate 550 and away from the front plate 550. The set of extensions 562 are disposed proximate to the first side 500C of the CMDS 500.

Referring to FIG. 19, the breechplate assembly 512 includes a circuit card 566. The circuit card 566 is similar to the circuit cards 166, 266 in CMDS 100, 200. As such, the circuit card 566 electrically connects to each firing pin of a plurality of firing pins 558 via a firing pin connector (not illustrated) substantially similar to how the circuit cards 166, 266 electrically connects to each firing pin of the plurality of firing pins 158, 256 in CMDS 100, 200. The clearance between the circuit card 566 and the plurality firing pins 556 is substantially similar to clearance "C" between the circuit card 166 and the plurality of firing pins 158, 256 in CMDS 100, 200. The circuit card 566 in CMDS 500, however, utilizes the electrical circuity described in the circuit card 266 of CMDS 200. In addition, the circuit card 566 includes a socket connectors (not illustrated) that allows for communication and power between the breechplate assembly 512 and the sequencer.

Still referring to FIG. 19, the breechplate assembly 512 also includes a rear plate 572. The rear plate 572 is similar to the rear plate 172 of the breechplate assembly 112 of CMDS 100, except as detailed below. The rear plate 572 defines a front surface 572A that faces the front end 500A of the CMDS 500 and a rear surface 572B that faces the rear end 500B of the CMDS 500. The rear plate 572 defines a set of holes 573 that extends entirely through the rear plate 572. The plurality of holes 573 are sized and configured to receive a set of fasteners 577 to fasten the front plate 550, via the plurality of openings 557 on the front plate 550, to the rear plate 572. Upon fastening the front plate 550 to the rear plate 572, the circuit card 566 is disposed between the front plate 550 and the rear plate 572 inside of the central space. The rear plate 572 also includes sockets 574 that are configured to electrically connect the socket connectors to the circuit card 566 to allow the breechplate assembly 512 to communicate with the sequencer. The sockets 574 provided on the rear plate 572 are electrically connected to a wiring harness 575. A portion of the wiring harness 575 is fastened to the rear surface 572A of the rear plate 572. In addition, the wiring harness 575 is configured to electrically connect with the legacy wiring harness (e.g., A Kit wiring harness) provided on the aircraft 1 such that the sequencer may communicate with and provide power to the breechplate assembly 512.

Furthermore, the breechplate assembly 512 includes a set of push buttons 578 that are disposed on the exterior surface 552A of the base wall 552 on the front plate 550. Each push button of the set of push buttons 578 is disposed proximate to the lateral wall 554 on the base wall 552. Each push button of the set of push buttons 578 is also electrically connected to the circuit card 566. Such connection allows the breechplate assembly 512 to send information and/or data to the sequencer based on the interaction received by the set of push buttons 578. Such interactions are described in more detail below.

Referring to FIG. 19, the magazine 514 is substantially similar to the magazine 114 in CMDS 100. The magazine 514 in CMDS 500, however, operably engages the breechplate assembly 512 once the breechplate assembly 512 operably engages the dispenser 510, which is explained in further detail above. The magazine 514 includes a top wall 580 that is disposed near the top end 500E of the CMDS 500, a bottom wall 582 that opposes the top wall 580 and is disposed near the bottom end 500F of the CMDS 500, a pair of side walls 584 positioned parallel to one another and disposed between the top and bottom walls 580, 582, a rear wall 586 that is disposed at the rear end 500B of the CMDS 500, and a front wall 588 that is disposed directly opposite to the rear wall 586 at the front end 500A the CMDS 500. The magazine 514 also includes a plurality of dividing walls 590 operably engaging each of the top wall 580, bottom wall 582, and lateral walls 584 and collectively defines a first plurality of passageways 592 that extends from the front wall 588 to the rear wall 586. The magazine 514 also defines a front set of apertures 592A disposed at the front end 500A of the CMDS 500 and a rear set of apertures 592B disposed at the rear end 514B of the magazine 514. Each passageway in the first plurality of passageways 592 has a front aperture from the front set of apertures 592A and a rear aperture from the rear set of aperture 592B to receive and house an expendable from the plurality of expendables 516.

Referring to FIG. 20, the magazine 514 defines a second plurality of passageways 594 that extends through the magazine 514 from the front wall 588 to the rear end 586. In the illustrated embodiment, the second plurality of passageways 594 are disposed parallel to the first plurality of passageways 592. In addition, the second plurality of passageways 594 are positioned between the first plurality of passageways 592 proximate to the center of the front wall 588 of the magazine 514.

Still referring to FIG. 20, the magazine 514 also defines a pair of cavities 595 that extends laterally from the rear wall 586 towards the front wall 588. The pair of cavities 595 are sized and configured to receive the pair of extensions 562 from the breechplate assembly 512 once CMDS 500 is assembled. The interaction between the pair of cavities 595 and the pair of extensions 562 provides additional support between the breechplate assembly 512 and the magazine 514 when CMDS 500 is assembled.

In the illustrated embodiment, the magazine 514 is without a muzzle plate operably engaged to the front end of the magazine 514. However, in one exemplary embodiment, a muzzle plate may operably engage the front end of the magazine 514 similar to the muzzle plate 396 operably engaging the front end of the magazine 314 in CMDS 300. In addition, the exemplary muzzle plate would be even with the mold line of the sidewall 3 to provide aerodynamic advantages for the aircraft 1. Even though the breechplate assembly 512 defines a substantially similar width as the breechplate assembly 112 in CMDS 100, the breechplate assembly 512 allows for the magazine 514 to be completely disposed inside of the dispenser 510.

Referring to FIGS. 19-20, the magazine 514 also includes a retaining plate 598. The retaining plate 598 has a front surface 598A that faces towards the front end 500A of the CMDS 500 and a rear surface 598B that faces towards the rear end 500B of the CMDS 500. The retaining plate 598 also defines a set of slots 598C that extend entirely through the retaining plate 598 from the front surface 598A to the rear surface 598B. The retaining plate 598 is considered advantageous at least because the retaining plate 598 maintains the plurality of expendables 516 inside of the first plurality of passageways 592 while the magazine 514 is loaded into the dispenser 510. In addition, the set of slots 598C provide access to the impulse cartridges provided in the plurality of expendables 516. The front surface 598A of the retaining plate 598 also operably engages the rear wall 586 of the magazine 514 by securing the retaining plate 598 to the magazine 514. While the retaining plate 598 is secured to the magazine 514, a muzzle plate may operably engage to a magazine in any suitable arrangement. Examples of operably engaging a muzzle plate to a magazine include attaching, affixing, adhering, connecting, fastening, fixing, gluing, joining, linking, mounting, riveting, screwing, welding, and other suitable examples of operably engaging a muzzle plate to a magazine.

Furthermore, the retaining plate 598 includes a set of encoding studs 598D. Each stud of the plurality of encoding studs 598D extends laterally from the rear surface 598B of the retaining pin 598 to operably engage the set of push buttons 578 embedded on front wall 550 of the breechplate assembly 512. The interaction between the set of encoding studs 598D and the set of push buttons 578 is communicated to the sequencer to provide magazine identification of the type of magazine being installed into the CMDS 500. As such, the retaining plate 598 will provide a plurality of encoding studs 598D that matches the specific size and configuration of the magazine being loaded into the CMDS 500 so that the sequencer may send suitable data for dispensing the plurality of expendables 516 during military operation. The inclusion of the set of encoding studs 598D on the retaining plate 598 and the set of push buttons 578 on the breechplate assembly 512 is considered advantageous at least because this inclusion eliminates the need for the loader of magazine 514 to set the position switches in a CMDS or manually changing the encoder upon loading the magazine 514 into the dispenser 510.

Figure 21:
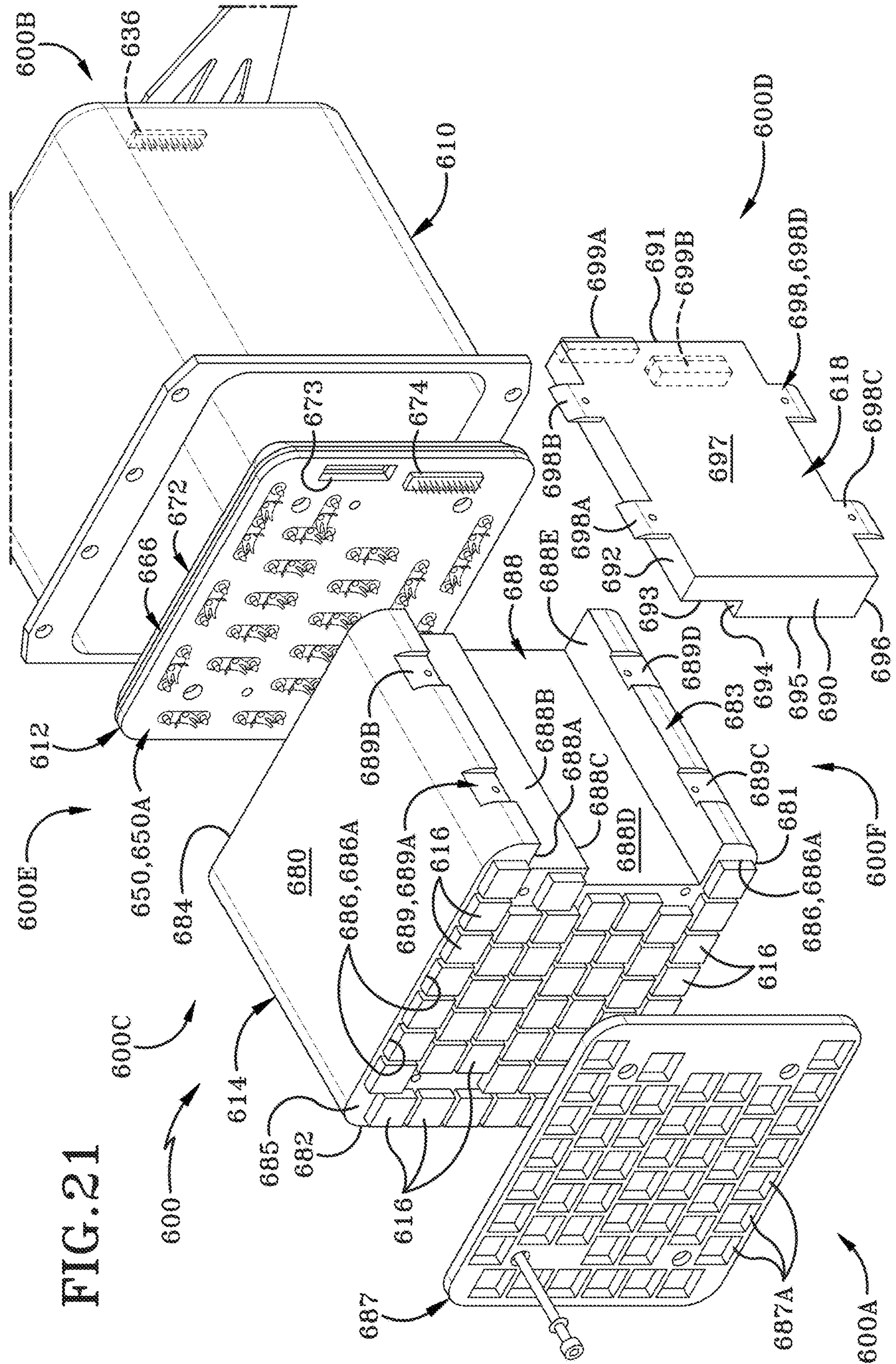
FIG. 21 (FIG. 21) is a top exploded isometric perspective view of another example CMDS.
Figure 22A:
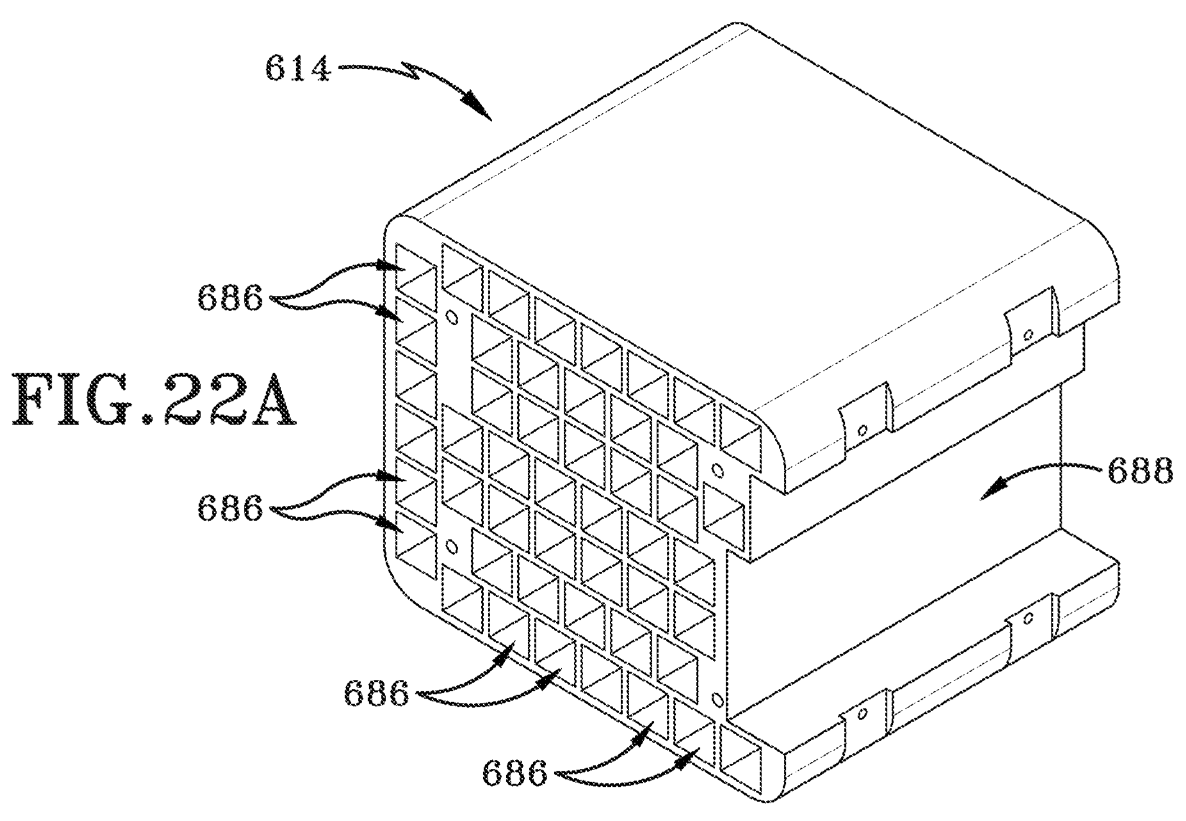
FIG. 22A (FIG. 22A) is a top isometric perspective view of the magazine of the example CMDS illustrated in FIG. 21 where the magazine may be loaded with one type of expendable.
Figure 22B:
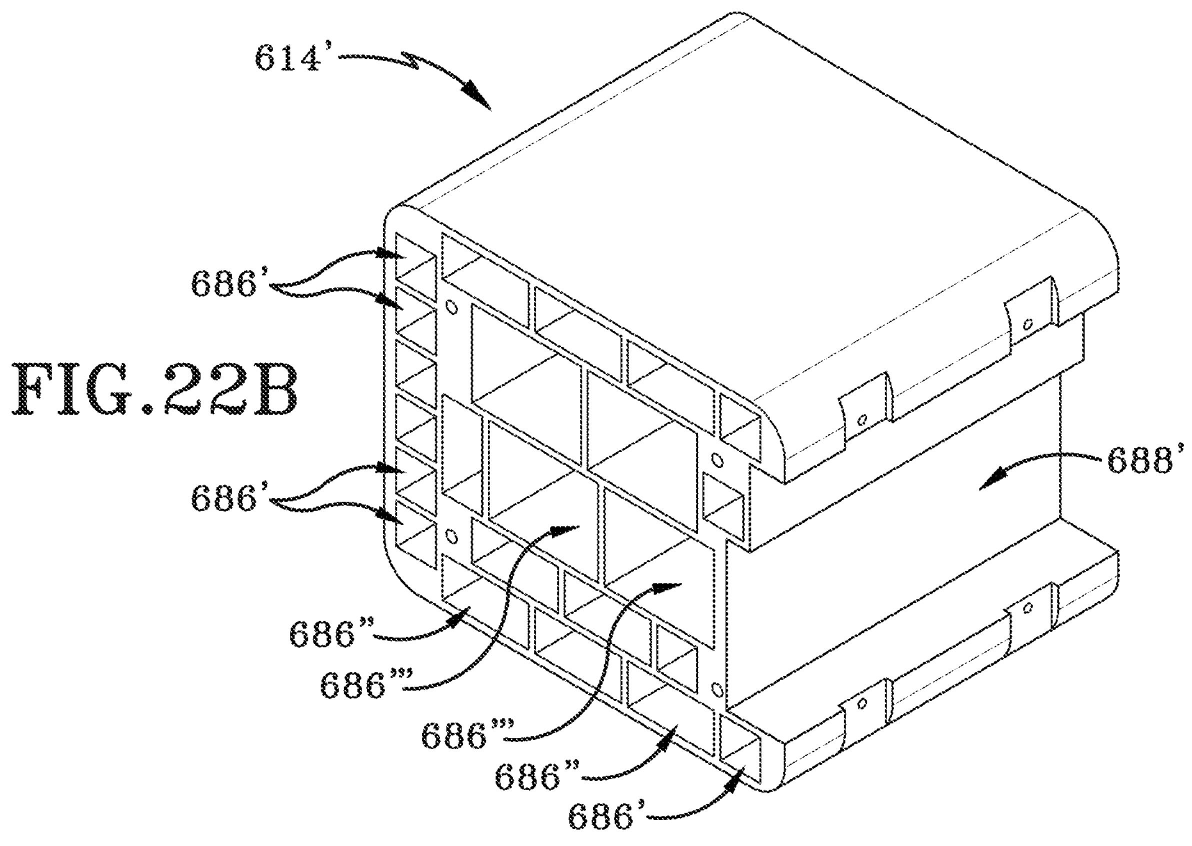
FIG. 22B (FIG. 22B) is a top isometric perspective view of an alternative magazine of the example CMDS illustrated in FIG. 21 where the alternative magazine can be loaded with three different types of expendables.

FIGS. 21-23 illustrates another CMDS 600 that is similar to the CMDS 300 illustrated in FIGS. 11-15 except as detailed below. The CMDS 600 includes a dispenser 610, a breechplate assembly 612, a magazine 614, a plurality of expendables 616, and a sequencer 618. As illustrated in FIG. 21, the CMDS 600 includes a front end 600A, a rear end 600B that opposes the front end 600A, a first side 600C, a second side 600D that opposes the first side 600C, a top end 600E, and a bottom end 600F that opposes the top end 600E. The front end 600A of the CMDS 600 faces outwardly towards the bottom end 2F of the main body 2 when the CMDS 600 is provided in the chamber 5 of the aircraft 1.

In the illustrated embodiment, the dispenser 610 is a legacy D-59 Dispenser in a legacy AN/ALE-47 CMDS, which is similar to dispensers 110, 310, in CMDS 100, 300.

In addition, the breechplate assembly 612 is similar to breechplate assembly 312, except as detailed below. The breechplate defines a front plate 650, a circuit card 666, and a rear wall 672 similar to the front plate 350, circuit card 366, and rear wall 372 in breechplate assembly 312. However, the breechplate assembly 612 defines a main slot 673. The main slot 673 extends entirely through the breechplate assembly 612 such that each of the front plate 650, circuit card 666, and rear plate 672 collectively define a slot in which each slots is coaxial with each other. The breechplate assembly 612 also includes a second socket 674 that is disposed on a front surface 650A of the front plate 650. The second socket 674 is electrically connected to the circuit card 666 such that breechplate assembly 612 is able to communicate with and receive power from the sequencer 618.

As illustrated in FIG. 21, the magazine 614 includes a top wall 680 that is disposed near the top end 600E of the CMDS 600, a bottom wall 681 that opposes the top wall 680 and is disposed near the bottom end 600F of the CMDS 600, a left wall 682 that is disposed between the top and bottom walls 680, 681 and at the first side 600C of the CMDS 600, a right wall 683 that is disposed between the top and bottom walls 680, 681 and at the second side 600D of the CMDS 600, a rear wall 684 that is disposed at the rear end 600B of the CMDS 600, and a front wall 685 that is disposed directly opposite to the rear wall 684 at the front end 600A of the CMDS 600. The top wall 680, bottom wall 681, left wall 682, right wall 683, rear wall 684, and the front wall 685 collectively define a plurality of passageways 686 that extends from the front wall 685 to the rear wall 684. Each passageway of the plurality of passageways is sized and configured to house an expendable of the plurality of expendables 616. The magazine 614 also defines a front set of apertures 686A and a rear set of apertures (not illustrated). Each passageway in the plurality of passageways 686 has a front aperture from the front set of apertures 686A and a rear aperture from the rear set of aperture to receive and house an expendable from the plurality of expendables 616.

Still referring to FIG. 21, receptacle 688 is formed in the right wall 683 of the magazine 614 that extends laterally into the right wall 683 from the second side 614D of the magazine 614 and towards the first side 614C of the magazine 614. The receptacle 688 has a first upper wall 688A that is proximate to the top wall 680 of the magazine 614. The receptacle 688 also has a first lateral wall 688B that extends downwardly away from the first upper wall 688A and is orthogonal to the first upper wall 688A. The receptacle 688 also has a second upper wall 688C that extends laterally away from the first lateral wall 688B and is orthogonal to the first lateral wall 688B. The receptacle 688 also has a second lateral wall 688D that extends downwardly away from the second upper wall 688C and is orthogonal to the second upper wall 688C. The receptacle 688 also has a base wall 688E extends laterally away from the second lateral wall 688D and is orthogonal to the second lateral wall 688D. In addition, magazine 614 defines a set of cavities 689 where each cavity of the set of cavities 689 extends laterally into the right wall 683 towards the first side 600C of the CMDS 600. As illustrated in FIG. 15, the set of cavities 689 defines first and second cavities 689A, 689B that are disposed proximate to the upper wall 688A of the receptacle 688. In addition, the set of cavities 689 also defines third and fourth cavities 689C, 689D that are disposed proximate to the base wall 688B of the receptacle 689. The use of receptacle 688 and the set of cavities 689 is provided in more detail below.

The magazine 614 also includes a muzzle plate 687. The muzzle plate 687 defines a plurality of apertures 687A that is coaxial with the plurality of passageways 686 when the muzzle plate 687 and the magazine 614 are assembled. The muzzle plate 687 operably engages the front wall 685 of the magazine 614 similar to the muzzle plate 196 operably engaging the front wall 188 of the magazine 114 in CMDS 100. In addition, a retaining plate (not illustrated) may operably engage the rear wall 684 of the magazine similar to the retaining plate 598 operably engaging the rear wall 586 of the magazine 514 in CMDS 500.

The magazine 614 may have any suitable size and configuration for the plurality of passageways 686. In one exemplary embodiment, each passageway of a plurality of passageways may have the same size and configuration in a magazine (illustrated in FIGS. 21 and 22A). In another exemplary embodiment, a magazine may have different pluralities of passageways such that the magazine (e.g, magazine 614') may have a first plurality of passageways (e.g., first plurality of passageways 686'), a second plurality of passageways (e.g., second plurality of passageways 686"), and a third plurality of passageways (e.g., third plurality of passageways 686"") (illustrated in FIG. 22B). In this exemplary embodiment, the pluralities of passageways are different sizes to carry pluralities of expendables that are different sizes. The pluralities of passageways may be sized and configured to carry certain expendables with the dimensions of 1×1×8.1 inches, 1×2×8.1 inches, 2×2.5×8.1 inches, and other expendables for a suitable situation.

Referring to FIG. 21, the sequencer 618 in CMDS 600 has been repositioned such that the sequencer 618 operably engages the dispenser 610 and the breechplate assembly 612. The sequencer 618 defines a front wall 690, a rear wall 691 that opposes front wall 690, a first top wall 692 that is proximate to the top end 600E, a first vertical wall 693 that is disposed between the first top wall 692 and the bottom end 600F of the CMDS, a second top wall 694 that is disposed between first vertical wall 693 and the bottom end 600F of CMDS 600, a second vertical wall 695 that is disposed between the second top wall 694 and the bottom end 600F of the CMDS 600, a bottom wall 696 disposed between the second vertical wall 695 and the bottom end 600F of the CMDS 600, and a third vertical wall 697 that is disposed opposite to the first and second vertical walls 693, 695. In the illustrated embodiment, the sequencer 618 is sized and configured to be received by the receptacle 688. Once the sequencer 618 operably engages the receptacle 688, the first upper wall 688A contacts the first top wall 692 and the first lateral wall 688B contacts the first vertical wall 693. In addition, the second upper wall 688C contacts the second top wall 694, the second lateral wall 688D contacts the second vertical wall 695, and the base wall 688E contacts the bottom wall 696.

The sequencer 618 also defines a set of extensions 698. The set of extensions 698 has first and second extensions 698A, 698B that extend upwardly to the top end 600E of CMDS 600 from the first top wall 692. The first and second extensions 698A, 698B are sized and configured to be received by the first and second cavities 689A, 689B such that the first and second extensions 698A, 698B operably engage the magazine 614 inside of the first and second cavities 689A, 689B. In addition, the set of extensions 698 has third and fourth extensions 698C, 698D that extend downwardly to the bottom end 600F of the CMDS 600 from the bottom wall 696. The third and fourth extensions 698C, 698D are sized and configured to be received by the third and fourth cavities 689C, 689D such that the third and fourth extensions 698C, 698D operably engage the magazine 614 inside of the third and fourth cavities 689C, 689D. In the illustrated embodiment, the sequencer 618 is fastened to the magazine 614 via a set of fasteners (not illustrated) fastening the set of extensions 698 to the magazine 614 inside of the set of cavities 689. While the sequencer 618 is fastened to the magazine 614 via a set of fasteners fastening the set of extensions 698 to the magazine 614 inside of the set of cavities 689, a sequencer may operably engage a magazine in any suitable arrangement. Examples of operably engaging a sequencer to a magazine include attaching, affixing, adhering, connecting, fastening, fixing, gluing, joining, linking, mounting, riveting, securing, screwing, welding, and other suitable examples of operably engaging a sequencer to a magazine.

The sequencer 618 also includes a first socket connector 699A that is sized and configured to be passed through the main slot 673 of the breechplate assembly 612. Such configuration between the sequencer 618 and the breechplate assembly 612 allows the first socket connector 699A to be electrically connected to a first socket 636 on the dispenser 610. The electrical connection between the sequencer 618 and the dispenser 610 allows the CMDS 600 to receive power from the aircraft 1 and to communicate with associated electrical components provided on the aircraft 1 (e.g., programmer 14). In addition, the sequencer 618 includes a second socket connector 699B that connects to the second socket 674 such that the sequencer 618 provides power to the breechplate assembly 612 and communicates with the breechplate assembly 612.

The configuration of repositioning the sequencer 618 on to the magazine 614 is considered advantageous at least because the configuration removes lengthy cabling between the sequencer 618 and the dispenser 610. The removal of lengthy cabling may eliminate or greatly reduce the potential events of stray voltages due to the electromagnetic sources between the sequencer 618 and the dispenser 610. In addition, the remove of length cabling may eliminate or greatly reduce the potential events of stray voltages due to cable chafing between the sequencer 618 and the dispenser 610.

Due to the relocation of the sequencer 618 in the illustrated embodiment, the legacy wiring harness used in the aircraft 1 (i.e., A-Kit wiring harness) that electrically connects the sequencer 618 to the dispenser 610 is modified such that the CMDS 600 includes a modified wiring harness 619. As illustrated in FIG. 23, the wiring harness 619 is electrically connected to first and second sequencers 618A, 618B via first and second sequencers connector 619A, 619B. In addition, the wiring harness 619 is electrically connected to first and second dispensers 610A, 610B via first and second dispenser connectors 619C, 619D.

Referring to FIG. 23, the wiring harness 619 includes a plurality of wires that electrically connect from the first and second sequencers 618A, 618B to the first and second dispensers 610A, 610B. In the illustrated embodiment, the wiring harness 619 includes a first wire $W_1$ that is electrically connected from the first sequencer connector 619A to the first dispenser 610A that provides logic power to the first dispenser 610A. In addition, a first jumper wire $J_1$ is electrically connected to the first wire $W_1$ in which the jumper wire $J_1$ is electrically connected to the second dispenser 610B to provide logic power to the second dispenser 610B. Such electrical connection between the first wire $W_1$ and the jumper wire $J_1$ provides logic power to first and second dispensers 610A, 610B. Moreover, the wiring harness 619 includes second and third wires $W_2$, $W_3$ that are electrically connected from the first sequencer connector 619A to the first dispenser 610A to provide power to the impulse cartridges in the plurality of expendables 616. In order to provide power to the impulse cartridges at the second dispenser 610B, second and third jumper wires $J_2$, $J_3$ are electrically connected to the second and third wires $W_2$, $W_3$. Such electrical connection between the second and third wires $W_2$, $W_3$ and the second and third jumper wires $J_2$, $J_3$ provides logic power to first and second dispensers 610A, 610B.

Still referring to FIG. 23, the wiring harness 619 includes fourth and fifth wires $W_4$, $W_5$ that are electrically connected from the second sequencer connector 619B to the first dispenser connector 610A. Each of the fourth and fifth wires $W_4$, $W_5$ is a first data link, similar to the first data link 15, which allows communication between the sequencers and the dispensers in the CMDS 600. In legacy wiring harnesses, the fourth and fifth wires $W_4$, $W_5$ were twisted, shield pairs to a first data link, such as the first data link 15, which limited the communication between the sequencers and dispensers in legacy CMDS.

Moreover, the wiring harness 619 reassigns magazine identification communication lines to sequencer identification communication lines for each sequencer present on a legacy aircraft, such as aircraft 1. The wiring harness 619 sets each sequencer address through the use of utilizing legacy jumper wires, rather than switches, on each sequencer housing. In addition, the wiring harness 619 uses four dedicated sequencer identification communication lines, reuses first and second legacy magazine identification communication wires, and reuses first and second dispenser firing lines for third and fourth magazine identification communication lines. Such magazine relocation wires and dispensing firing lines are provided in a sixth wire $W_6$, a seventh wire $W_7$, an eighth wire $W_8$, a ninth wire $W_9$, a tenth wire $W_{10}$, an eleventh wire $W_{11}$, a twelfth wire $W_{12}$, and a thirteenth wire $W_{13}$.

Furthermore, the wiring harness 619 maintains the legacy bypass cascade wiring design from the legacy sequencer installation. In the illustrated embodiment, the bypass wiring design includes a fourteenth wire $W_{14}$ (bypass flare line), a fifteenth wire $W_{15}$ (bypass first other countermeasure line), a sixteenth wire $W_{16}$ (bypass second other countermeasure line), and a seventeenth wire $W_{17}$ (bypass enable line) that electrically connects between the second sequencer connector 619B to the first dispenser connector 619C. In addition, the bypass wiring design includes an eighteenth wire $W_{18}$ (bypass chaff line) that electrically connects to the first sequencer connectors 619A to the first dispenser connector 619C. The eighteenth wire $W_{18}$ and a nineteenth wire $W_{19}$ (bypass Jettison line) also electrically connect the first dispenser connector 619C to the second dispenser connector 619D. The nineteenth wire $W_{19}$ also connects the second sequencer connector 61B to both the first dispenser connector 619C and the second dispenser connector 619D. In addition, a twentieth wire $W_{20}$ (cascade chaff line) and a twenty-first wire $W_{21}$ (cascade first other countermeasure line) electrically connect the second dispenser connector 619D to the second sequencer connector 619B. Moreover, a twenty-second wire $W_{22}$ (cascade flare line) and a twenty-third wire $W_{23}$ (cascade second other countermeasure line) electrically connect the second dispenser connector 619D to the first sequencer connector 619A. Furthermore, a twenty-fourth wire $W_{24}$ (cascade/bypass chaff line), a twenty-fifth wire $W_{25}$ (cascade/bypass flare wire), a twenty-sixth wire $W_{26}$ (cascade/bypass first other countermeasure line), and a twenty-seventh wire $W_{27}$ (cascade/bypass second other countermeasure line) electrically connect from the first dispenser connector 619C to the second dispenser connector 619D.

The installation of the wiring harness 619 cascades the bypass dispensing lines from a first sequencer and a first dispenser, such as the first sequencer 618A and first dispenser 610A, to a second sequencer and a second dispenser, such as the second sequencer 618B and second dispenser 610B. Here, the bypass wiring design functions as a reversionary mode of operation for an ALE-47 system. As such, the bypass wiring design allows an operator of military platform, such as a pilot, to bypass a programmer, such as programmer 14, for manually dispensing countermeasure (e.g, flares and chaff) if the programmer has failed or is non-operational during military operation. The manual switches and/or signals of the bypass wiring design are routed directly to the sequencer 618 via the fourteenth wire $W_{14}$, the fifteenth wire $W_{15}$, the sixteenth wire $W_{16}$, and the seventeenth wire $W_{17}$, for manually dispensing a chaff, a flare, a first other countermeasure, and/or a second outer countermeasure during military operation. Furthermore, the first and second sequencers 618A, 618B cascade the bypass lines between each other to utilize the legacy wiring harnesses for routing/cascading signals between each other for dispensing countermeasures if one sequencer does not have the allotted inventory in its associated dispenser magazine.

Figure 24:
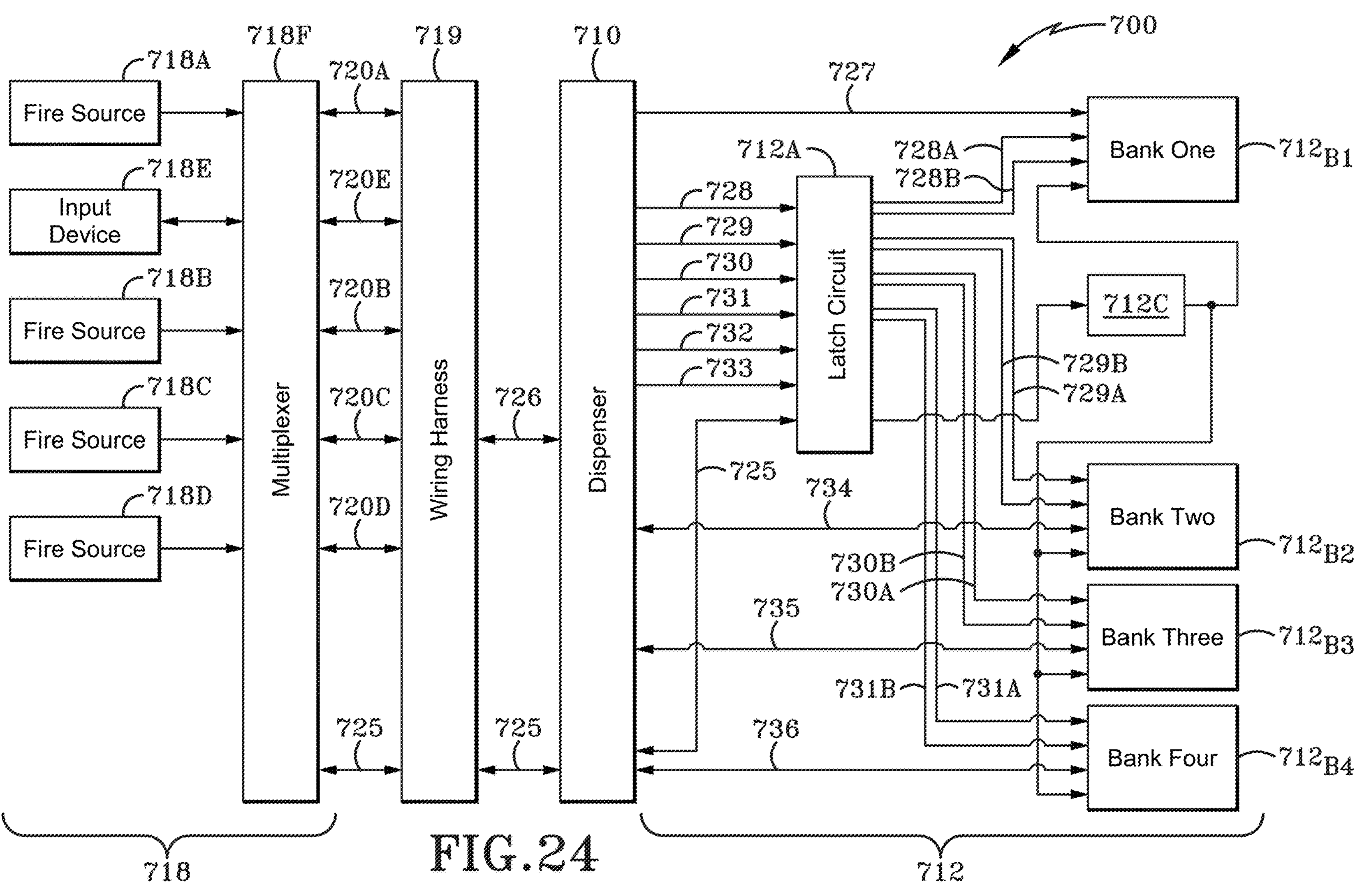
FIG. 24 (FIG. 24) is an electrical circuit diagram of the circuit card of the breechplate assembly in another example CMDS.

FIG. 24 illustrates another CMDS 700 that is similar to the CMDS 200 illustrated in FIG. 10 and CMDS 400 illustrated in FIG. 17, except as detailed below. CMDS 700 includes a dispenser 710, a breechplate assembly 712, a magazine (not illustrated), a plurality of expendables (not illustrated), and a sequencer 718. CMDS 700 incorporates the circuitry of the breechplate assembly 212 in the CMDS 200 and the circuitry of the breechplate assembly 412 of the CMDS 400 into the breechplate assembly 712. The CMDS 700 retains the legacy hardware of the sequencer 718, the legacy wiring harnesses provided in a legacy aircraft, such as aircraft 1, legacy dispenser 710, and legacy logic and microprocessor provided in the breechplate assembly 712.

In CMDS 700, the sequencer 718 has a first fire source 718A, a second fire source 718B, a third fire source 718C, and a fourth fire source 718D. Each of the first, second, third, and fourth fire sources 718A, 718B, 718C, 718D is electrically connected to a multiplexer 718F in which each of the first, second, third, and fourth fire sources 718A, 718B, 718C, 718D sends communication to the multiplexer 718F during military operation of the CMDS 700. In addition, an input device 718E is electrically connected to the multiplexer 718F. The input device 718E includes the polling operation source, the interface system (i.e., Smart Stores Communication Interface (SSCI)), and the magazine bank select operation. The input device may send communication to and receive communication from the multiplexer 718F during military operation of the CMDS 700.

The multiplexer 718F is electrically connected to a legacy wiring harness 719 that is included in the legacy aircraft 1 (i.e., Group A wiring harness in an ALE-47 CMDS). The multiplexer 718F includes a first set of firing lines 720A, second set of firing lines 720B, a third set of firing lines 720C, and fourth set of firing lines 720D, and a fifth set of firing lines 720E that are electrically connected to the wiring harness 719. The fifth set of firing lines 720E is being used to select and enable banks of firing pins and passageways in the CMDS 700, which is described in more detail below. The first, second, third, fourth, and fifth sets of firing lines 720A, 720B, 720C, 720D, 720E are then electrically connected to the legacy dispenser 710 through the wiring harness 719 via a connection 726. Moreover, the first, second, third, fourth, and fifth sets of firing lines 720A, 720B, 720C, 720D, 720E are then electrically connected to the breechplate assembly 712. As such, the sequencer 718, the dispenser 710, and the breechplate assembly 712 are able to communicate to one another via the first, second, third, fourth, and fifth sets of firing lines 720A, 720B, 720C, 720D, 720E.

In the breechplate assembly 712, the breechplate includes a sixth set of firing lines 727 that corresponds to the first set of firing lines 720 for selecting and enabling "low" and "high" side firing pins in a first bank of firing pins $\mathbf{712}_{B1}$. The sixth set of firing lines 727 also corresponds to and communicates with the input device 718E to allow for polling of the components that are electrically connected to each of the "low" and "high" side firing pins in the first bank of firing pins $\mathbf{712}_{B1}$, communication to the interface system, and allow for magazine bank selection.

The breechplate assembly 712 also includes a latch circuit 712A that electrically connects a seventh set of firing lines 728, an eighth set of firing lines 729, a ninth set of firing lines 730, and a tenth set of firing lines 731 from the dispenser 710 to the breechplate assembly 712. The latch circuit 712A may collect and store data from the breechplate assembly 712 that may be communicated to the associated electrical components and logic devices found in the CMDS 700. For example, the latch circuit 712A may store the electrical states of the electrical components embedded inside of the breechplate assembly 712. The latch circuit 712A is powered via the second data link 725. In addition, the sixth set of firing lines 727 bypasses the latch circuit 712A.

Each of the seventh, eighth, ninth, and tenth sets of firing lines 728, 729, 730, 731 is electrically connected to a set of "low" side firing pins and a set of "high" side firing pins in first, second, third, and fourth banks of firing pins $712_{B1}$, $712_{B2}$, $712_{B3}$, $712_{B4}$. The seventh set of firing lines 728 is electrically connected to a "low" side of firing pins 728A and a "high" side of firing pins 728B in the first bank of firing pins $712_{B1}$. The eighth set of firing lines 729 is electrically connected to a "low" side of firing pins 729A and a "high" side of firing pins 729B in the second bank of firing pins $712_{B2}$. The ninth set of firing lines 730 is electrically connected to a "low" side of firing pins 730A and a "high" side of firing pins 730B in the third bank of firing pins $712_{B3}$. The tenth set of firing lines 731 is electrically connected to a "low" side of firing pins 731A and a "high" side of firing pins 731B in the fourth bank of firing pins $712_{B4}$. In the illustrated embodiment, each of the sixth, seventh, eighth, ninth, and tenth sets of firing lines 727, 728, 729, 730, 731 includes six "low" side firing pins and six "high" side firing pins to fire a total of forty-eight expendables from the CMDS 700.

The firing of either the "low" side firing pins or the "high" side firing pins in the first, second, third, and fourth banks of firing pins $712_{B1}$, $712_{B2}$, $712_{B3}$, $712_{B4}$ is communicated to the sequencer 718 due to the breechplate assembly 712 and the sequencer 718 being electrically connected through the dispenser 710 (via connections 734, 735, 736) and the wiring harness 719.

In addition, a clock 732 and a bit storage device 733 are electrically connected to the latch circuit 712A. The breechplate assembly 712 also includes a bit loading device 712C that is electrically connected to the first, second, third, and fourth banks of firing pins $712_{B1}$, $712_{B2}$, $712_{B3}$, $712_{B4}$. The bit loading device 712C is also electrically connected to the latch circuit 712A. The bit loading device 712C receives and stores data and information regarding the states and/or statuses of the "low" side firing pins and the "high" side firing pins in each of the first, second, third, and fourth banks of firing pins $712_{B1}$, $712_{B2}$, $712_{B3}$, $712_{B4}$. Such data and information is sent to the latch circuit 712A.

The electrical configuration of CMDS 700 is considered advantageous at least because CMDS 700 utilizes both a bank select configuration and a switched passageway configuration for firing either "low" side firing pins or "high" side firing pins during military operation. In other words, CMDS 700 is utilizing both the electrical circuity in CMDS 200 and 400. The CMDS 700 also utilizes legacy components provided in the legacy aircraft to minimize the need of updating or reconfiguring a CMDS in a legacy aircraft. Moreover, the impulse cartridges are isolated from the fire lines to prevent against inadvertent dispensing, reducing stray voltage, and electrical shorting of firing lines when the magazine is not installed.

Figure 25:
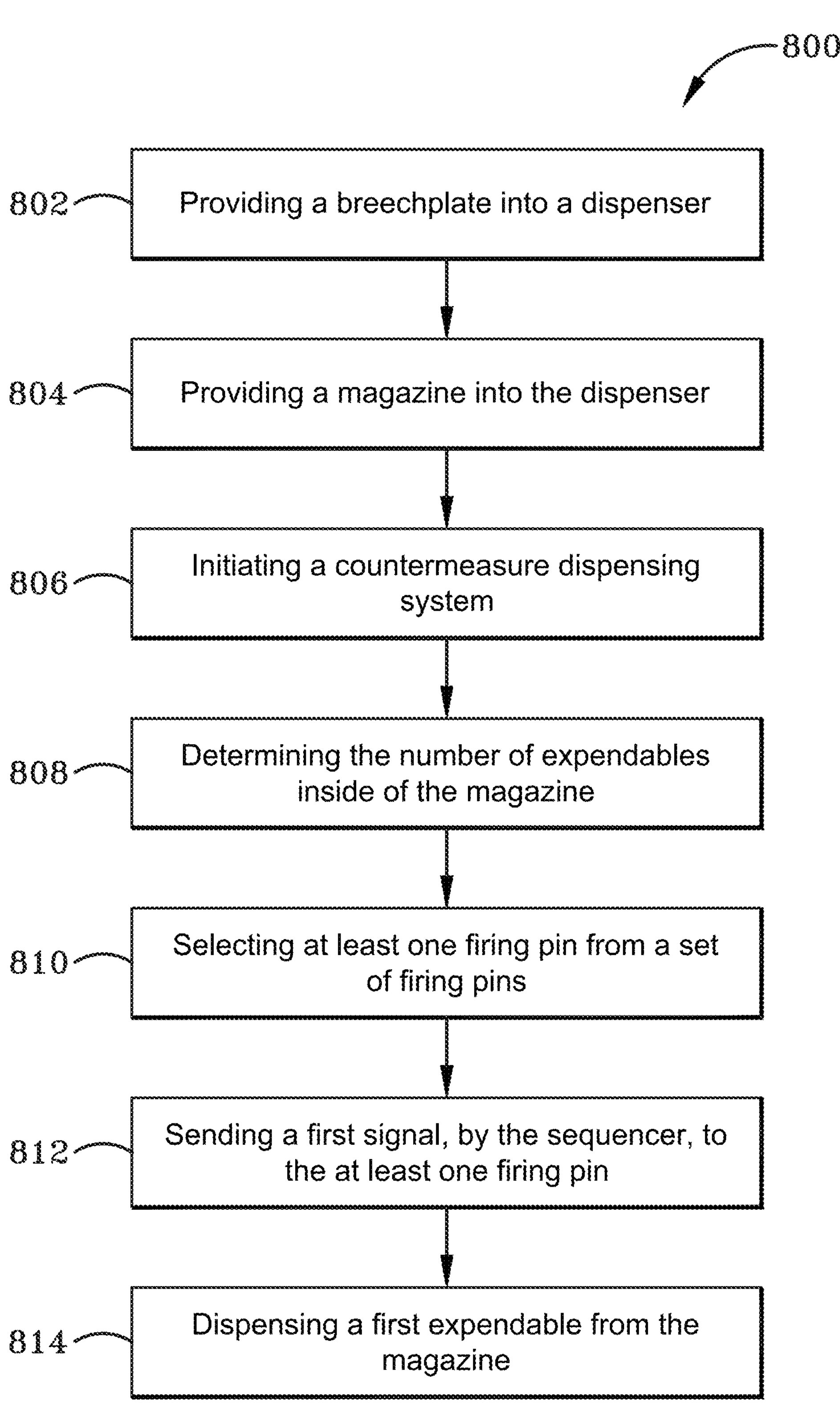
FIG. 25 (FIG. 25) illustrates an exemplary method flow chart for dispensing expendables from a CMDS.

FIG. 25 illustrates a method 800 for dispensing expendables from a CMDS. An initial step 802 comprises providing a breechplate that is operably coupled to a dispenser disposed on a platform. Another step 804 comprises providing a magazine for insertion into the dispenser, the magazine operably engaging the breechplate and housing a plurality of expendables. Another step 806 comprises initiating a countermeasure dispensing system. Another step 808 comprises determining the number of expendables from the plurality of expendables housed inside of the magazine. Another step 810 comprises selecting at least one firing pin from a set of firing pins, wherein the at least one firing pin is one of a pair of firing pins electrically connected to a firing line in the set of firing lines. Another step 812 comprises sending a first signal, by the sequencer, to the at least one firing pin in the pair of firing lines. Another step 814 comprises dispensing a first expendable from the magazine by the at least one firing pin in the pair of firing pins.

The method 800 of dispensing expendables from a CMDS may include optional steps. An optional step may comprise selecting a second firing pin from the set of firing pins, wherein the second firing pin is one of the pair of firing pins electrically connected to the firing line in the set of firing lines; this optional step may be performed after step 814. Another optional step may comprise sending a second signal, by the sequencer, to the second firing pin in the pair of firing lines; and dispensing a second expendable from the magazine by the second firing pin in the pair of firing pins; this optional step may be performed after step 814. Another optional step may comprise providing a first voltage to the first signal that is less than the Zener voltage of a Zener diode that is in series with the sequencer. Another optional step may comprise providing a second voltage to the second signal that is greater than the Zener voltage of the Zener diode that is in series with the sequencer. Another optional step may comprise sending the first signal, via the sequencer, to a field programmable gate array (FPGA); and outputting the first signal, via the FPGA, to the at least one firing pin in the pair of firing pins by enabling a first logic switch to a closed position and a second logic switch to an open position. Another optional step may comprise of sending the second signal, via the sequencer, to the FPGA; and outputting the second signal, via the FPGA, to the second firing pin in the pair of firing pins by enabling the first logic switch to an open position and the second logic switch to a closed position. Another optional step may comprise of enabling the power of the data link, via the sequencer, for polling the set of firing pins prior to dispensing the plurality of expendables; selecting the at least one firing pin in the pair of firing pins via the sequencer; and selecting a second firing pin in the pair of firing pins via the sequencer.

The magazines of each CMDS described and illustrated herein may have any suitable passageway configuration based on the size and/or type of expendable used in a CMDS. In one exemplary embodiment, a magazine may have a passageway configuration for expendables with the dimensions of 1×1×8.1 inches where the magazine may have a total of forty-eight passageways that meet the 1×1×8.1-inch expendable dimension. In this exemplary embodiment, the magazine may also hold between forty-eight passageways up to sixty passageways that meet the 1×1×8.1-inch expendable dimension. In another exemplary embodiment, a magazine may have a passageway configuration for expendables with the dimensions of 1×1×8.1 inches and 1×2×8.1 inches where the magazine may have four passageways that meet the 1×1×8.1-inch expendable dimension and twenty-two passageways that meet the 1×2×8.1-inch expendable dimension. In another exemplary embodiment, a magazine may have a passageway configuration for expendables with the dimensions of 1×1×8.1 inches and 2×2.5×8.1 inches where the magazine may have twenty-eight passageways that meet the 1×1×8.1-inch expendable dimension and four passageways that meet the 2×2.5×8.1-inch expendable dimension. In another exemplary embodiment, a magazine may have a passageway configuration for expendables with the dimensions of 1×1×8.1 inches, 1×2×8.1 inches, and 2×2.5×8.1 inches where the magazine may have ten passageways that meet the 1×1×8.1-inch expendable dimension, nine passageways that meet the 1×2×8.1-inch expendable dimension, and four passageways that meet the 2×2.5×8.1-inch expendable dimension. In another exemplary embodiment, a magazine may have a passageway configuration for expendables with the dimensions of 1×1×8.1 inches, 1×2×8.1 inches, and 2×2.5×8.1 inches where the magazine may have three passageways that meet the 1×1×8.1-inch expendable dimension, twelve passageways that meet the 1×2×8.1-inch expendable dimension, and four passageways that meet the 2×2.5×8.1-inch expendable dimension.

A military platform, such as the aircraft 1, may provide any suitable number of CMDSs that are described and illustrated herein on the military platform. Examples of suitable numbers of CMDS provided on a military platform include one, at least one, two, a plurality, three, four, five, six, and any other suitable number of CMDSs that may be provided on a military platform. In addition, any CMDS described and illustrated herein may be provided on a military platform. In one exemplary embodiment, a military platform may include a single type of CMDS on the military platform, such as CMDS 100, for use during military operation. In another exemplary embodiment, a military platform may include different types of CMDSs on the military platform, such as CMDS 100 and CMDS 500, for use during military operation.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms “program” or “software” or “instructions” are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method comprising:

providing a breechplate operably coupled to a countermeasures dispenser, the breechplate comprising a first set of firing pins and a second set of firing pins both electrically coupled to a sequencer, wherein the first set of firing pins is electrically coupled to a corresponding first set firing lines, and the second set of firing pins are paired firing pins, wherein the paired firing pins are electrically coupled to a corresponding second set firing lines;

providing a magazine for insertion into the dispenser, the magazine operably engaging the breechplate and capable of housing a plurality of expendables;

initiating, during flight, a countermeasure dispensing system, wherein the countermeasure dispensing system performs the following:

determining which of the expendables from a plurality of expendables housed inside the magazine to be dispensed;

selecting at least one firing pin from at least one of the first and second set of firing pins to allow for the determined expendables to be dispensed;

sending a signal from the sequencer to at least one of the second sets of firing pins via the second set of firing lines;

controlling, by a single circuit card, one or more switches that electrically couple at least one of the first and second sets of firing lines to the first and second sets of firing pins, respectively; and dispensing at least one of the determined expendables by at least one firing pin in the paired firing pins.

2. The method of claim 1, further comprising:

sending an additional signal from the sequencer to the second firing pin in the paired firing pins; and dispensing an additional determined expendable.

3. The method of claim 1, further comprising:

providing the signal from the sequencer having a first voltage that is less than a Zener voltage of a Zener diode that is in series with the sequencer.

4. The method of claim 1, further comprising:

providing the signal from the sequencer having a second voltage that is greater than a Zener voltage of a Zener diode that is in series with the sequencer.

5. The method of claim 1, wherein the single circuit card is a field programmable gate array (FPGA) and further comprising:

outputting the signal from the sequencer to the at least one firing pin in the paired firing pins by enabling a first logic switch to a closed position.

6. The method of claim 5, further comprising:

sending an additional signal from the sequencer to the FPGA; and outputting the additional signal to a second firing pin in the paired firing pins by enabling a second logic switch to a closed position.

7. The method of claim 1, further comprising:

polling the second set of firing pins by the sequencer for readiness; and selecting at least one firing pin in the pair of firing pins following the polling.

8. The method of claim 1 further comprising processing information of an incoming threat.

9. The method of claim 8 wherein the initiating of the countermeasure dispensing system is done following processing of the incoming threat.

10. The method of claim 1 wherein the initiating the countermeasure dispensing system is done manually.

11. The method of claim 1 further comprising providing feedback from the selected firing pin.

12. The method of claim 1 wherein the first and second sets of firing pins have a first end and a second end and further comprising defining a shock isolation clearance between the second end of each firing pins and the circuit card.

13. A computer program product including one or more non-transitory machine-readable mediums encoded with instructions that when executed by one or more processors cause a process to be carried out for countermeasures, the process comprising:

initiating, during flight, a countermeasure dispensing system;

determining a number of expendables from a plurality of expendables housed inside a magazine to be dispensed;

selecting at least one selected firing pin from at least one of a first set of firing pins and a second set of firing pins, the first and second sets of firing pins being electrically coupled to a sequencer, with the first set of firing pins being electrically coupled to a corresponding first set firing lines, and wherein the second set of firing pins are paired firing pins, with the paired firing pins being electrically coupled to corresponding second set firing lines;

controlling, by a single circuit card, one or more switches that electrically couple at least one of the first and second sets of firing lines to the first and second sets of firing pins, respectively;

sending a first signal from the sequencer to at least the second set of firing pins; and dispensing at least one of the expendables by the at least one selected firing pin in the pair of firing pins.

14. The computer program product of claim 13, further comprising:

sending a second signal from the sequencer to the second firing pin in the paired firing lines; and dispensing a second expendable by the second firing pin in the paired firing pins.

15. The computer program product of claim 13, further comprising:

providing the signal from the sequencer having a first voltage that is less than a Zener voltage of a Zener diode that is in series with the sequencer.

16. The computer program product of claim 13, further comprising:

providing the signal from the sequencer having a first voltage that is greater than a Zener voltage of a Zener diode that is in series with the sequencer.

17. The computer program product of claim 13, further comprising:

sending the first signal from the sequencer to a field programmable gate array (FPGA); and outputting the first signal, via the FPGA, to at least one firing pin in the paired firing pins by enabling a first logic switch to a closed position and a second logic switch to an open position.

18. The computer program product of claim 17, further comprising:

sending a second signal from the sequencer to the FPGA; and outputting the second signal, via the FPGA, to a second firing pin in the paired firing pins by enabling the first logic switch to an open position and the second logic switch to a closed position.

19. The computer program product of claim 13, further comprising:

polling the second set of firing pins by the sequencer for readiness; and selecting at least one firing pin in the paired firing pins following the polling.

20. The computer program product of claim 13, wherein the first and second sets of firing pins have a first end and a second end and further comprising defining a shock isolation clearance between the second end of the firing pins and the single circuit card.

* * * * *